United States Patent [19]
Katz

[11] Patent Number: 4,792,968
[45] Date of Patent: Dec. 20, 1988

[54] STATISTICAL ANALYSIS SYSTEM FOR USE WITH PUBLIC COMMUNICATION FACILITY

[75] Inventor: Ronald A. Katz, Los Angeles, Calif.

[73] Assignee: FDR Interactive Technologies, New York, N.Y.

[21] Appl. No.: 18,244

[22] Filed: Feb. 24, 1987

Related U.S. Application Data

[63] Continuation-in-part of Ser. No. 753,299, Jul. 10, 1985, abandoned.

[51] Int. Cl.$^4$ ............................................. H04M 11/06
[52] U.S. Cl. .......................................... 379/92; 379/67
[58] Field of Search ...................... 379/91, 67, 92, 110; 235/377, 375

[56] References Cited

U.S. PATENT DOCUMENTS

| | | | |
|---|---|---|---|
| 3,393,272 | 7/1968 | Hanson | 379/67 |
| 3,934,095 | 1/1976 | Mathews et al. | 379/67 |
| 4,017,835 | 4/1977 | Randolph | 235/379 |
| 4,290,141 | 9/1981 | Anderson et al. | 455/2 |
| 4,320,256 | 3/1982 | Freeman | 379/92 |
| 4,345,315 | 8/1982 | Cadotte, et al. | 364/900 |
| 4,355,207 | 10/1982 | Curtin | 379/67 |
| 4,355,372 | 10/1982 | Johnson et al. | 364/900 |
| 4,439,636 | 3/1984 | Newkirk et al. | 379/91 |
| 4,451,700 | 5/1984 | Kempner et al. | 379/88 |
| 4,489,438 | 12/1984 | Hughes | 381/41 |
| 4,521,643 | 6/1985 | DuPuis et al. | 379/92 |
| 4,523,055 | 6/1985 | Hohl et al. | 379/89 |
| 4,539,435 | 9/1985 | Eckmann | 379/93 |
| 4,559,415 | 12/1985 | Bernard et al. | 379/91 |
| 4,566,030 | 1/1986 | Nickerson | 358/84 |
| 4,578,700 | 3/1986 | Roberts et al. | 358/84 |
| 4,584,602 | 4/1986 | Nakagawa | 358/84 |
| 4,587,379 | 12/1986 | Masuda | 379/91 |
| 4,603,232 | 7/1986 | Kurland et al. | 379/92 |
| 4,625,276 | 11/1986 | Benton | 364/408 |
| 4,630,200 | 12/1986 | Ohmae et al. | 364/405 |
| 4,630,201 | 12/1986 | White | 364/408 |
| 4,634,809 | 1/1987 | Paulsson et al. | 379/91 |
| 4,654,482 | 3/1987 | DeAngelis | 379/95 |
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |

FOREIGN PATENT DOCUMENTS

52-17740  2/1977  Japan ..................................... 379/91

OTHER PUBLICATIONS

"Voice Mail", *Sound & Communications*, vol. 28, No. 2, 4/83, pp. 84-85.
J. Svigals, "Low Cost Point-of-Sale Terminal", IBM Technical Disclosure Bulletin, vol. 25, No. 4, Sep. 1982.
Goran Erikson, et al., "Voice and Data Workstations and Services in the ISDN", 1984.
A. Turbat, "Telepayment and Electronic Money, The Smart Card", 1982.
V. Scott Borison, "Transaction—Telephone Gets the Facts at the Point of Sale", Bell Laboratories Record, vol. 53, No. 9, Oct. 1975.
M. Demeautis et al., "The TV 200, A Transactional Telephone".

*Primary Examiner*—Robert Lev
*Attorney, Agent, or Firm*—Nilsson, Robbins, Dalgarn, Berliner, Carson & Wurst

[57] ABSTRACT

For use with a public communication facility C incorporating terminals T1-TN, e.g. a telephone system, a statistical analysis system D interfaces with individual stations where a caller is prompted by voice instructions to provide digital data that is identified for positive association with the caller and is stored for processing. Caller data is confirmed by a look-up table and by a signal-commanded voice generator. Files are created in the analysis system wherein callers are assigned designations which are stored along with statistical and identification data. In one embodiment, callers are identified by calling sequence and assigned designations are provided in the form of an acknowledgment. A break-off circuit enables a caller to terminate the computer interface aborting to a terminal for direct communication with an operator. The stored data is statistically processed and correlated as with established data to isolate a select group or subset of the callers or caller data that can be readily identified and confirmed.

12 Claims, 4 Drawing Sheets

STATISTICAL ANALYSIS SYSTEM FOR USE WITH PUBLIC COMMUNICATION FACILITY

BACKGROUND AND SUMMARY OF THE INVENTION

This is a continuation-in-part of application Ser. No. 753,299 filed July 10, 1985 and entitled "Statistical Analysis System for Use With Public Communication Facility" now abandoned.

Various forms of public polling have come into widespread use. Telecommunications afford a valuable tool for such activity. To some extent, telecommunication polling has been automated, particularly with regard to specific test groups. However, sometimes it is desirable to perform analysis to identify specific selections with respect to very large groups of people who are not preselected for use in an organized calling campaign. For example, it may be desirable to obtain medical data from a large group of people, to correlate such data, then to identify a select subset of the group using some external data. Also, it may be desirable to collect such medical data selectively from people who have purchased a test kit or the like for obtaining data. In any event, a need exists for an effective, economical, and expedient system for performing such analysis and selection.

It has been proposed to use telecommunications systems to interface control systems with individuals who provide digital identification data by actuating a digital mechanism. For example, it has been proposed to interface individuals at telephone calling stations with recorded voice messages prompting the provision of address data by actuating the numeric or alphabetic buttons that are conventionally employed for dialing another telephone station. In general, such techniques have been used to provide specific select information. For example, a caller might actuate dialing buttons to selectively address specific information in a computer of interest to him. In another arrangement, dialing buttons may be actuated to specify a billing designation as for requested services. In the course of such operations, difficulties sometimes arise which are frustrating or confusing to a caller and may ruin the communication. Nevertheless, such techniques offer enhanced possibilities and in general the system of the present invention is based on the recognition of certain of those possibilities.

Telecommunications also have come into widespread use with respect to merchandising. Specifically, for example, most mail-order organizations have telecommunications facilities, some of which may be automated to a limited extent. Television merchandising operations also often involve the supplemental use of the telephone. Accordingly, a need exists to improve telecommunication facilities for such operations with respect to economy, convenience and reliability.

In general, the present invention compiises a system of analysis, selection and data processing for operation in cooperation with a public communication facility, e.g. a telephone system. A voice origination or organization apparatus prompts individual callers to provide select digital data to develop a record for further processing. If appropriate, abort capability allows a caller to interface directly with an operator. A control system may qualify a caller then provide data cells for storing individual data and assigning definitive identifications to such data (and to the caller) and for testing such data, as for the selection of a subset of calless. A variety of memory techniques are used to selectively activate the voice origination apparatus. Accordingly, statistical analysis and selection can be effectively accomplished economically with respect to a substantially unlimited set of callers who are accommodated by a public communication system. In a related aspect, callers can provide data as for merchandising, or various other telecommunications operations involving a large number of persons and a large volume of data.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the present invention is disclosed herein. However, physical communication systems, data formats, and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
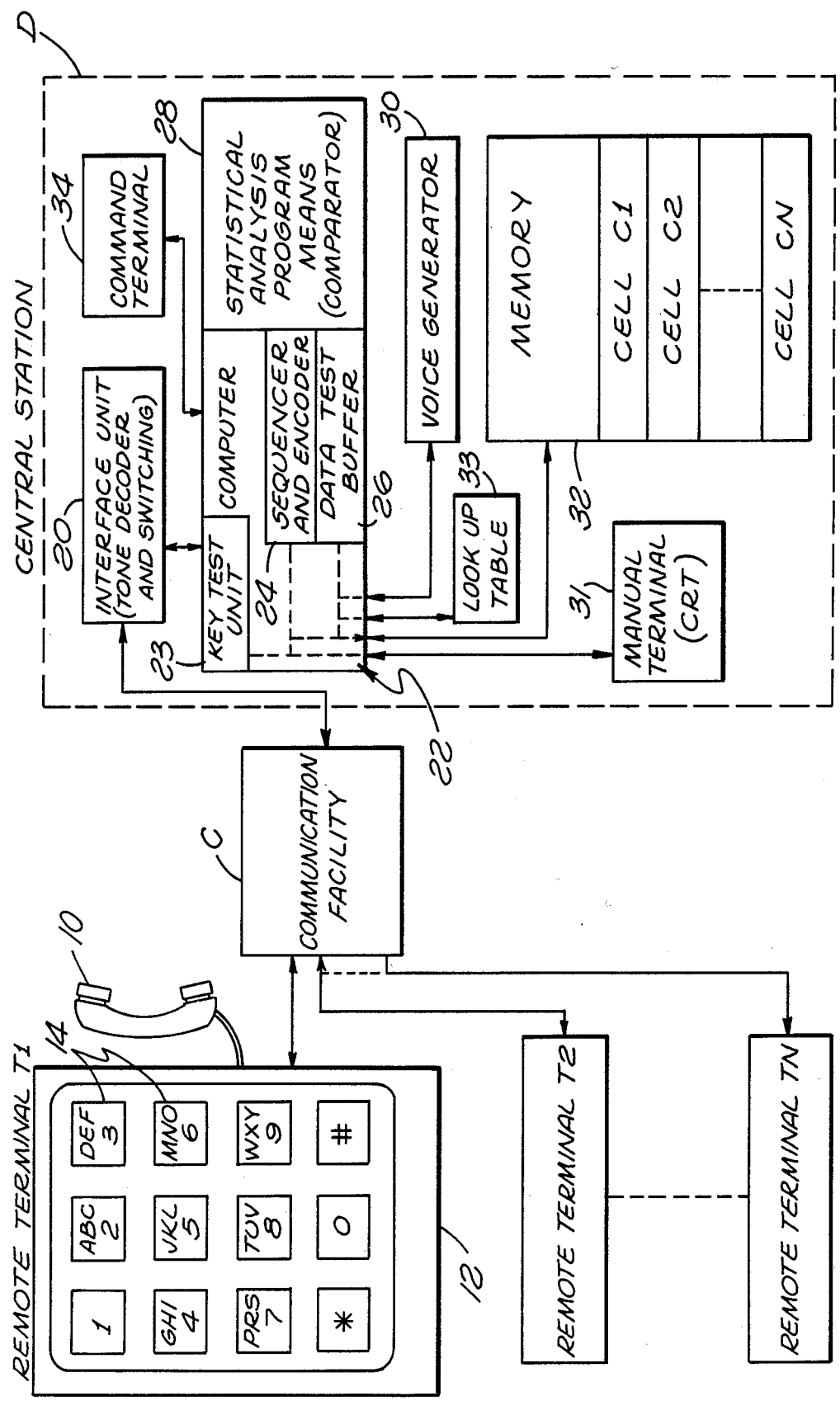
FIG. 1 is a block diagram of a system constructed in accordance with the present invention.

Referring initially to FIG. 1, a series of remote terminals T1 through TN are represented (left). The terminals are generally similar, and accordingly, only the terminal T1 is illustrated in detail. In the disclosed embodiment, the remote terminals T1 through TN comprise various telephone terminals coupled to a communication facility C which may take the form of a comprehensive telephone system for interconnecting any associated terminals. The communication facility C is also coupled to a data development central station D in accordance herewith, an embodiment of which is illustrated in some detail.

Generally in accordance with the present development, individual callers use the individual telephone stations T1 through TN to interface the data development station D through the communication facility C. Also in accordance herewith, the data of individual callers is collected and correlated in the data station D for processing in accordance with external data. As a consequence, various objectives are accomplished. For example, a select subset of the callers may be isolated and specifically identified, or related data may be processed, or transactions may be actuated. The possibilities are substantial and varied as will be apparent from the exemplary functions as described in detail below.

As indicated, several polling, actuating, marketing or informing operations can be accomplished utilizing systems in accordance herewith. For example, the public might be polled with regard to locating the specific purchasers of a defective and dangerous product. The public might be polled with the objective of locating persons susceptible to a specific ailment or disease. In a less serious vein, but one of particular commercial significance, the system also might be employed in various public communication game formats or, where legal and deemed in the public welfare, public lotteries. The system also might be used to automate a mail-order operation, even to the extent of inventory control as detailed below.

Considering the system of FIG. 1 in somewhat greater detail, it is to be understood that the communication facility C has multiplexing capability for individually coupling the terminals T1-TN to the central station C on request. In the illustrative form of the system, the communication facility C comprises a public telephone facility and the individual terminals T1-TN take various forms of existing telephone instruments. In that regard, the telephone terminal T1 is represented in some detail to include a hand piece 10 (microphone and earphone) and a panel 12 provided with a rectangular array of push buttons 14 in the conventional configuration.

In accordance with conventional telephone designations, alphabetic and numeric designations are provided on the buttons 14. For example, several of the buttons 14 carry three letters along with a decimal numeral. Specifically, the button designated with the numeral "2" also carries the letters "A", "B" and "C". In that manner, the buttons 14 encompass the numerals "0-9", two symbols, and the alphabet except for the letters "Q" and "Z". Consequently, the buttons 14 accommodate entry of decimal data along with a wide range of alphabetic data. In that regard, the buttons 14 designated with symbols "*" and "#" as well as the numeral "0" can be used by predetermined assignment to represent the letters "Q" and "Z" or any of a variety of other data or commands. Generally, in accordance herewith, the buttons 14 are employed to formulate digital data at the central station D in various formats determined by the curret specific use and operating format of the system.

Considering the central station D in somewhat greater detail, the communication facility C is coupled to an interface unit 20 which incorporates modems, tone decoders, and switching mechanisms. The interface unit 20 affords couplings to a computer 22 which may take the form of a mini-unit programmed for example in accordance with the functions as set forth below. Generally, the computer 22 performs several distinct and separate operations. Specifically, the computer 22 may initially qualify a caller. In that regard, if a select group of callers are to have access to the system, a portion of the computer 22 designated as a key test unit 23 qualifies individual callers who present a key number. An exemplary detailed embodiment of the key test unit 23 is described below.

With clearance of a caller by the key test unit 23, the system enters a further data acquisition phase with respect to that caller. Specifically, the computer 22 receives detailed data from a caller at any one of the individual stations T1-TN (through the communication facility C) which data is organized, tagged to be identified, and stored. Tests and confirmations may be performed during this phase of operation. Thereafter, during a processing phase, the computer 22 processes the stored data. For example, the processing may involve applying additional data to isolate a select subset of callers. Such data may or may not have been available during all or a portion of the data-gathering period.

Sub-blocks of the computer 22, in addition to the test unit 23, also are illustrated in the block designating other components of the computer 22 actually to represent various internal component operating structures. In formulating the data records to be stored, the computer 22 employs logic operations which are performed by a sequencer and encoder 24. During statistical processing operations, the computer 22 utilizes a data test buffer 26 along with a statistical analysis program means 28. Exemplary operations and formats for these elements are treated below.

The computer 22 is connected to a voice generator 30, a manual terminal 31, a memory 32 and a look-up table 33. Note that these components are illustrated separately from the computer 28 for purposes of simplified explanation. The voice generator 30 functions to selectively provide voice messages through the interface unit 20 and the communication facility C to currently active remote terminals. The manual operating terminal 31, located at the central station D, communicates with the computer 22. In the context of the present invention, the manual terminal 31 is activated at a time when it is desirable to abort automated data processing operation as described in detail below. Finally, in the illustrative embodiment, the computer 22 is coupled to the memory 32 containing a plurality of individual cells C1-CN which are employed to register the data from individual callers at the terminals. During data accumulation phases, the apparatus at the central station D acquires data in the memory 32 utilizing individual cells C1-CN for the individual callers. Subsequently, during the statistical processing operation, the computer 22 receives data through a command terminal 34 which is tested with regard to the acquired data in the cells C1-CN of memory 32 so as to select and identify a subset of the individual callers or define action with respect to callers. Thus, the system is effective for use in statistical polling or merchandising to selectively identify a particular subset of data associated with a subset of individual callers and define associated action. In that regard, often it is important to positively identify the isolated subset of callers and also to enable those callers to verify their identity in association with the data. The system of the present invention accommodates those needs.

An appreciation of the philosophical operation of a system in accordance with the present invention may now be enhanced by considering an exemplary operation of the illustrative embodiment of FIG. 1 to isolate a subset of people who are susceptible to a particular disease or infirmity. The exemplary operation might involve a geographical area, as a large city, in which a particular health problem is somewhat acute. For example, a major population center where coronary artery disease is a significant problem might be polled. Accordingly, persons most susceptible to such disease could be identified for corrective recommendations or measures.

As an alternative example related to health, the system may process the resultant data from test kits. Specifically, test kits might be sold to concerned persons who would use the kit to obtain certain specific health data. For example, a person might purchase a kit containing the apparatus and instructions to perform various non-invasive procedures to obtain data that could indicate a health condition, e.g. pregnancy. The kit containing the apparatus could also include a key number for qualifying the purchaser to access the computer 22. The qualification would be performed by the key test unit 23 (described in detail below) which might simply incorporate a look-up table to check off key numbers as they are used or "consumed". With qualification, a caller could be instructed in detail and statistical data could also be acquired.

Returning to the example of generally polling a population center, people of the metropolitan area could be informed of the availability of a service for statistical health analysis. Accordingly, persons interested in their individual statistical situation would be motivated to utilize the service. Specifically, individual callers would use the remote terminals T1–TN to contact the central station D through the communication facility C and thereby provide personal information which would enable a statistical analysis in relation to existing data so as to isolate and inform those persons statistically most likely to be in need of corrective measures. In such applications, it may be important that the caller's identity be subject to reliable verification. Other applications also may present a critical need for positively verifiable identification to the extent that credit card numbers and/or personal identification numbers may be employed.

Figure 2:
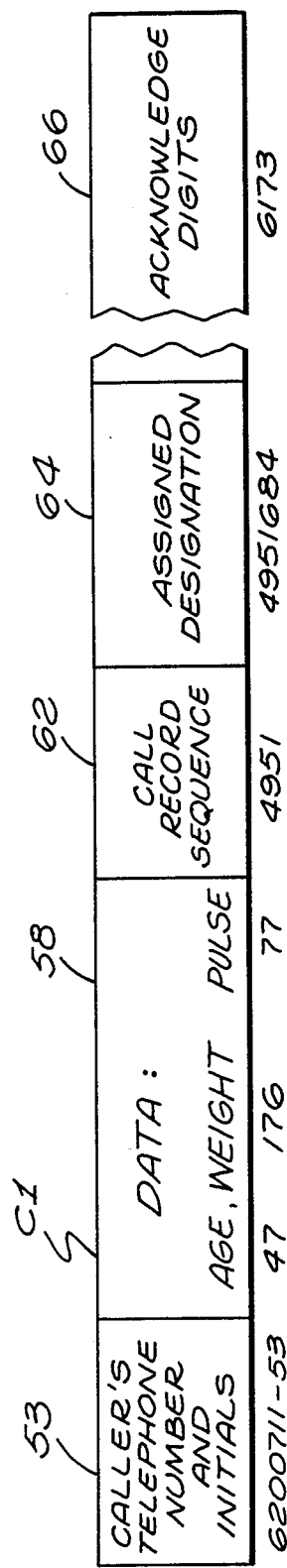
FIG. 2 is a fragmentary diagrammatic representation of a storage cell as may be formatted in the system of FIG. 1.
Figure 3:
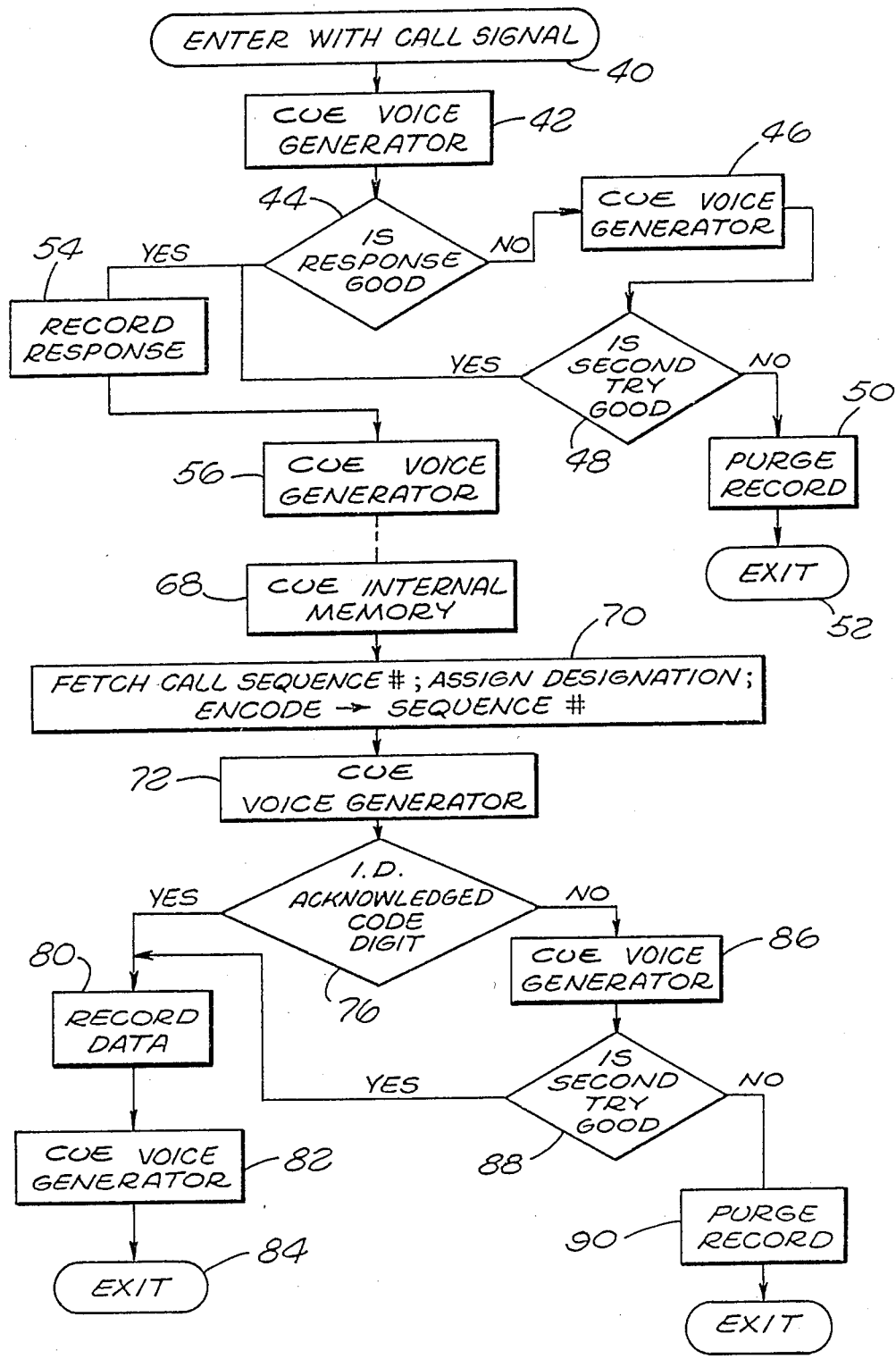
FIG. 3 is a flow diagram of one operating format of the system of FIG. 1.

An exemplary operation of the system, with regard to a specific caller, will now be treated referring somewhat concurrently to FIGS. 1, 2 and 3. As indicated above, FIG. 2 indicates a data storage format and now will be considered with regard to a format in which data is composed for a caller in one of the cells C1–CN of the memory 32.

Pursuing the above example in accordance with the assumptions, further assume the existence of a caller at the remote terminal T1 who wishes to pursue health-related information on the basis of statistical analysis. The caller lifts the hand piece 10 and in accordance with conventional techniques actuates the push buttons 14 to establish communication through the facility C with the central station D. Upon receiving the call signal, the interface unit 20 (central station D, FIG. 1) actuates the computer 22 to cue the voice generator 30. The sequence of operations is represented to be initiated in FIG. 3 by the "enter" block 40 which is accordingly followed by a "cue voice generator" command block 42. Accordingly, the voice generator 30 (FIG. 1) formulates speech, a representative form of which might be: "Thank you for participating in the coronary artery disease statistical analysis. Please give us your telephone number by actuating the call buttons on your telephone instrument."

Acting on the instructions the caller would push the buttons 14 in sequence to indicate his telephone number, e.g. "6200711". This data could be taken directly from the system as it is available in certain telephone apparatus of the facility C. The time of day also could be taken. The resulting data signals are communicated to the interface unit 20 (FIG. 1) then applied to the computer 22 for testing as a valid telephone number. Note that the number can be tested by the look-up table 33 (FIG. 1) as separately illustrated. Essentially, the format of a proper number prompts the look-up table to produce a valid or "good" signal. The test is indicated by the block 44 (FIG. 3). If the response is not valid, for example contains an inappropriate number of digits, the operation of block 46 is initiated again cuing the voice generator 30 (FIG. 1). Accordingly, the voice generator reinstructs the caller, e.g.: "You have not entered a proper telephone number. Please reenter your telephone number by pressing the appropriate call buttons."

The caller is then allotted a predetermined period of time to make a proper entry with the consequence that the system move to a test operation as indicated by the block 48 (FIG. 3). Specifically, block 48 poses the query: "Is the second try good?"

If the caller is again unsuccessful, the system purges the record as indicated by the block 50 and the call is terminated as indicated by the block 52. In an alternative mode, the computer 22 may abort the interface and couple the manual terminal 31 for communication with the caller. The interchange would then proceed, person-to-person.

If the caller responds with a proper telephone number, the operation proceeds. Specifically, the system sequences to record the response of the proper telephone number as indicated by the block 54. That is, the caller's telephone is recorded in a specific cell C1–CN identified with the caller. The format of the cell C1 is indicated in FIG. 2. The first portion, section 53, contains the caller's telephone number, i.e. "6200711". Note that as explained above, if the second attempt to formulate a proper number is successful, as manifest by the block 48 (FIG. 3), the response is recorded at that stage. In either case, exiting from the block 54 (FIG. 3) invokes the next operation of again cuing the voice generator as indicated by the block 56.

As an alternative, if a selective-group polling operation is performed, as mentioned above, the caller is qualified by providing the "one-time" key number included in his package. As indicated above, the unit 23 may incorporate a look-up table for proper key numbers. Proper numbers may be coded using any of a wide variety of techniques. As a simple illustrative example, the key may comprise a precise number of digits that always total a particular numerical value.

The key test unit 23 performs the test as an initial qualification. Next, the unit 23 verifies that the key given by a caller has not been consumed by prior use. Thus, the unit 23 may simply incorporate some arithmetic test capability along with a look-up table as well known in the art.

Returning to the detailed example, the system proceeds after the caller is qualified. Specifically, the cue to the voice generator 30 (FIG. 1) as represented by the block 56 produces a request for further information from the caller. For example, the voice generator might request information by stating: "Please use the telephone buttons to indicate the initials of your first and last names using the asterisk button for the letters Q and Z."

The detailed operation is not represented in FIG. 3 as it is similar to the operation illustrated by the blocks 42 through 54. However, again, a proper response is registered in the storage cell C1 as illustrated in FIG. 2 by the number "53" also registered in the first section 53 of the cell.

The cycle of obtaining digital information from the caller next is repeated with respect to substantial specific health data. For example, as illustrated in FIG. 2, the next section 58 in the cell C1 receives an accumulation of health data, including the caller's age, weight, . . . , pulse rate, and so on. Representative digital numbers are illustrated in FIG. 2.

During the course of the telephonic communication, the computer 22 formulates identification data for the caller specifically including: the chronological sequence of the call, the assigned designation of the call, and a set of acknowledgment digits for the call. Such data identification is registered in the assigned cell C1 in accordance with the format of FIG. 2 being stored in sections 62, 64 and 66. Note that the data may be stored in a coded interrelationship. For example, the acknowledgment digits may be related to the call record sequence. In the illustrative example, the chronological order number of the caller is 4951. The acknowledge digits may be derived from the sequence number. For example, as illustrated, a coded relationship may be established by adding "two" to each of the individual record sequence digits. Considering the example numerically:

$$\begin{array}{r} 4951 \\ \underline{2222} \\ \text{Adding without carries: } 6173 \end{array}$$

According to the example, the call chronological sequence registered for the caller is 4951 as represented in the section 62 while the acknowledge digits are 6173 as registered in the section 66. Additionally, the computer develops an assigned designation number, e.g. designation "4951684", which is registered in the section 64 and an acknowledge code or digits, e.g. 6173, registered in the section 66. These values are formulated in accordance with conventional number techniques during the data acquisition phase. Specifically, with the exemplary numerals formulated, the operation proceeds.

The computer 22 (FIG. 1) cues the internal memory. That operation is indicated by the block 68 (FIG. 3). Thus, the computer 22 fetches the call record sequence number, assigns a designation (if not previously assigned), and encodes the sequence number as the acknowledgment digits (if not previously accomplished). These operations are indicated by the block 70 (FIG. 3). Next, the computer 22 (FIG. 1) cues the voice generator as indicated by the block 72 (FIG. 3) to provide information to the caller. Specifically, for example, the voice generator 30 (FIG. 1) might state: "This transaction has been designated by the number 4951684, and is further identified by the acknowledgment digits 6173. Please make a record of these numbers as they will be repeated. Specifically, the designation number is 4951684. The acknowledgment digits are 6173. Please acknowledge this transaction by pressing your telephone buttons to indicate the acknowledge digits 6173." In various applications as those involving security, the order and acknowledgment of callers may be very important. Therefore, data for confirmation associated with the order is important.

The system next assumes a test mode as indicated by the block 76 (FIG. 3). If the caller provides the correct acknowledgment digits, the data is confirmed in the record as indicated by the block 80 and registered in the cell C1 (FIG. 2). Additionally, the voice generator 30 (FIG. 1) is sequenced as indicated by the block 82 (FIG. 3) to indicate the close of the communication and that the transaction is terminated as represented by the exit block 84.

In the event that the caller cannot confirm his acknowledgment digits, as indicated by the block 76, a repeat operation is performed as indicated respectively by the blocks 86 and 88. Specifically, the voice generator 30 (FIG. 1) is cued for a second instructional message. In the event that the second attempt also fails, the data is purged and the call discounted as indicated by block 90. If the second try is successful (test block 88), as indicated by the block 80, the record is perfected as indicated above.

As a result of the likelihood of a large number of calls, as described above, the data cells C1-CN in the memory 32 (FIG. 1) are developed with specific information indicative of a statistical sampling of the populace of concern. The data of that statistical sampling may be self-generating of specific conclusions with respect to a subset of individuals, and/or supplemental data may clearly manifest a significant subset. For example, the data may indicate a significant departure from an assumed normal characteristic. Such data, accumulated from the polling, may be considered by logic comparisons in the computer 22 to select the subset of persons who should be isolated.

In addition to the self-generating conclusions available from the received data, the system may involve the introduction of external data. In the physical fitness example, such external data might take the form of national statistical data. In any event, the processing operation usually involves comparison tesiing which compares caller data from individual cells C1-CN with test data that is supplied to the statistical analysis program means 28 through the command terminal 34.

As a simplistic example, health data including age, weight, . . . pulse, may be formulated into a composite number reflecting rated values for each of the data elements. Such a composite number may then be placed in the data test buffer 26 for sequential testing against similarly composed numbers formed from the data in the individual cells C1-CN. Based on such comparative testing, a subset of persons may be identified. Presumably those persons will be informed of their circumstances. Note that the command terminal 34 incorporates a display or other output data apparatus as standard in the art for manifesting the subset. Hoeever, it is important that identifications be confirmed as accurate. It is in that sense that the assigned designations as registered in the section 64 (FIG. 2) and the call record sequence, as registered in the block 62, are important. Note that multiple comparative processing operations may be desirable or necessary to isolate and confirm a subset of significant concern.

In the above example, members of the public were simply invited to use the service. A number of alternatives exist which might well impact on the statistical analysis. For example, callers might be restricted to the purchasers of a specific product as a medical apparatus for measuring blood pressures, heart rates, or so on. In such situations, it will be apparent that the statistical data will be somewhat distorted from an average or normal sampling. Clearly, the computer 22 can be programmed to take into account such considerations. In that regard, the computer 22 might also verify identification data proffered by a caller. Such data might take the form of a credit card number or a personal identification number. Various techniques for verification of such numbers using computer techniques are well known and recognized in the prior art.

Figure 4:
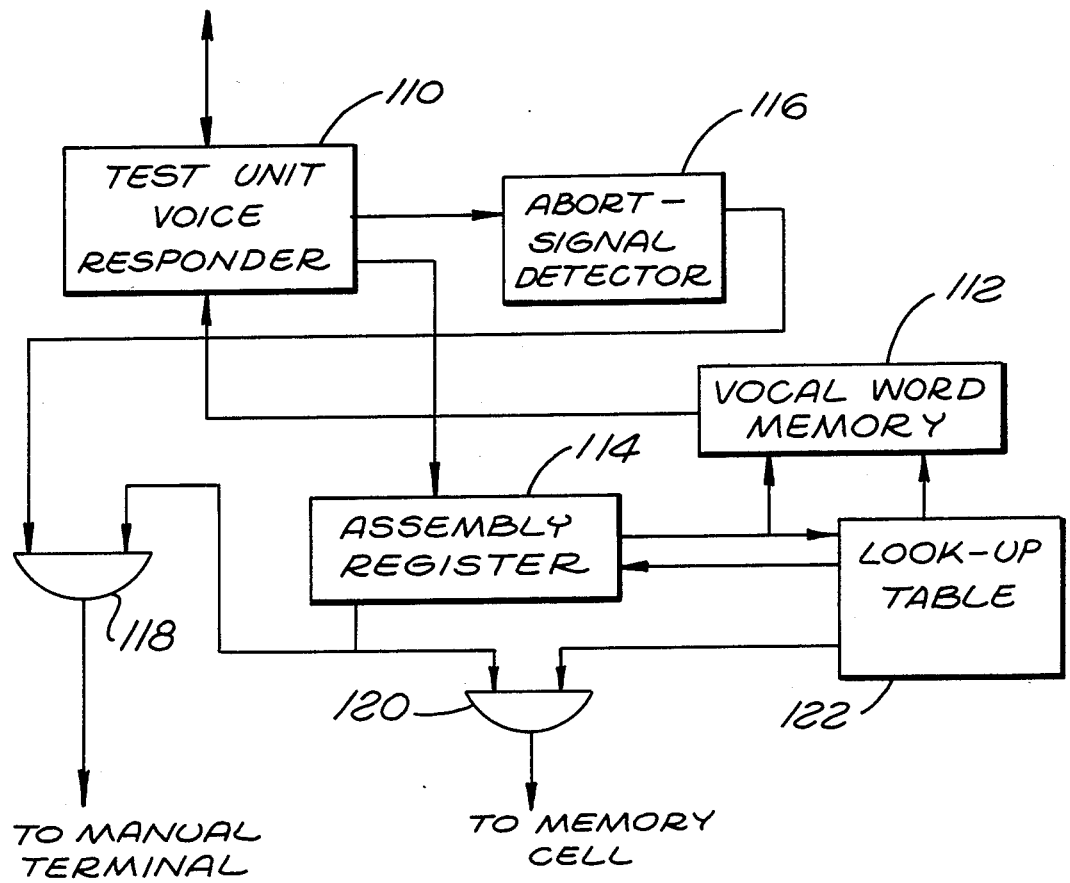
FIG. 4 is a block diagram of a form of key test unit as may be employed in the system of FIG. 1.

As indicated above, the system can be formatted for use in a variety of applications, including the automation of a mail order operation. Preliminary to considering an exemplary form of such an application, a disclosed embodiment of the key test unit 23 will be considered as illustrated in FIG. 4. A test unit voice responder 110 (FIG. 4, upper left) is coupled to the interface unit 20 (FIG. 1). The voice responder 110 may be integrated with the voice generator 30 (FIG. 1), or take the form of a separate unit. In any event, the responder functions as a channel or conduit for signals passing in and out of the unit and on command forms modulated voice signals to enunciate words in accordance with signals from a vocal word memory 112.

As a signal channel, the responder supplies received signals to an assembly register 114 and to an abort signal detector 116. The abort signal detector 116 may simply take the form of a decoder that is actuated to produce an abort signal on receiving a digital signal to manifest a specific binary code, e.g. the code word representative of the asterisk button (*) on the panel 12 (FIG. 1). From the detector 116 (FIG. 4) the abort signal is applied to an "and" gate 118.

As indicated above, signals received by the responder are applied to the assembly register 114. Signal data received by the register 114 is compiled. The data includes the preliminary information for a caller. That information is supplemented with additional data to complete a memory cell word as illustrated in FIG. 5.

The register 114 is connected to supply its contents to the "and" gate 118 as well as a similar "and" gate 120. Functionally, the gates 118 and 120 pass the contents of the assembly register 114 at the time when a qualifying signal is received. The gate 118 is qualified by the abort signal from the detector 116 and the gate 120 is qualified by a signal from a look-up table 122.

Essentially, the look-up table 122 is indexed and addressed by the identification numbers of callers and responds with approval signals for the callers, if appropriate. The look-up table is also connected to supply disapproval signals to the vocal word memory 112. oote that the memory 122 also is coupled to receive addressing signals from the register 114.

Figure 5:
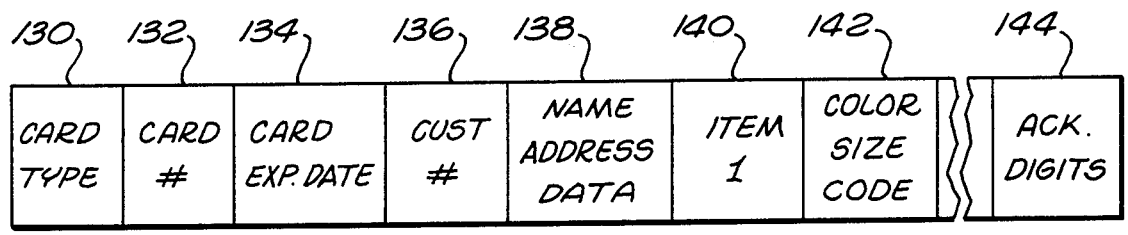
FIG. 5 is a fragmentary diagrammatic representation of another storage cell as may be formatted in the system of FIG. 1.

Consider now the operation of the system of FIG. 1, with the key test unit 23 as illustrated in FIG. 4 and with a system format to automate a mail order operation and assemble data in cells of the memory 32 as illustrated in FIG. 5. Accordingly, assume that a caller establishes communication with the system as explained above.

As an initial preliminary action, the voice responder 110 might be cued to identify the mail order house and indicate that the order will be taken by computer. The caller also might be advised that if he prefers to communicate directly with a person, or needs such contact at any point in the communication, he may accomplish it simply by pushing the asterisk button (*) on his telephone. Alternatively, the customer may be asked by the voice generator 30 to provide (by voice) longer information as name, address, etc. which is recorded for later processing. Such action forms an abort signal that is detected by the detector 116 to qualify the gate 118. As a result, the contents of the register is passed to the manual terminal 31 (FIG. 1) with the command to take over the communication. If preliminary data has been assembled in the register 114, such data will be displayed by a CRT of the terminal 31 to facilitate further communication.

After the preliminary information is supplied to a caller, the data collection phase is initiated. For example, the voice responder 110 might announce: "Please indicate the type of credit card you will use for your purchase by pushing the button number one for Mastercharge, two for . . . "

The caller's response, indicating a specific credit card, is stored in the register 114, specifically in the first data block 130 as illustrated in FIG. 5. The responder next instructs the caller to use the telephone buttons to indicate his credit card number and the expiration date of the card. That data is stored in the register 114, specifically in the blocks 132 and 134 as illustrated in FIG. 5. Similarly, in the disclosed embodiment, the caller is asked for his customer number, as it may appear on his catalog. That number is stored in a block 136 of the register 114. Note that the caller may not be in the files of the mail order house and in that event, the operation may be shifted to a manual operation to be continued through the manual terminal 31 as explained above. For a television initiated mail order transaction, other numerical codes might be employed as to key into broadcast schedules. For example, a code might be used to indicate program times and thereby enable evaluation of the productivity of such program times.

To continue with the explanation of the automated format, assume that the customer has a number and that it is stored in the assembly register 114 along with his credit card number and expiration date. From that location, the data is checked for propriety as part of the initial test operation. The check or test is in two stages. First, the data is verified to be accurately registered by confirming it with the caller. Second, the data is verified as representing valid and proper data formats for the customer's number, the credit card number and expiration date. The test may also include a step of consulting a so-called negative list to assure that the identified card and customer's number have not been cancelled, as for example in the case of credit cards that have been lost or stolen.

To accomplish the first stage of verification, under control of the computer, the vocal word memory 122 is prompted to actuate the responder 110 to announce the registered data including the card number. Specifically for example, the memory 112 is addressed by the digits of the card number as stored in the register 114. Accordingly, the memory 112 supplies mmodulated voice signals to the responder 110. The mechanically stated message might be in a fixed format except for the card number, for example: "Please verify your card number as it will now be repeated. If the number is 2745273845957, please push the one button."

If incorrect numbers are stored in the register 114, a corrective cycle may be sequenced as explained with respect to the first operating format. Also as explained above, with repeat failures, the communication may be terminated or the system may shift to a manual format by activating the terminal 31 (FIG. 1) attended by an operator.

If the customer's number, card number and the expiration date are verified by the caller as correctly recorded in the register 114 (FIG. 4), the operating sequence proceeds. Accordingly, the system proceeds with the next phsse of the test and checks the current propriety of the data in the register 114. Under control of the sequencer 34 (FIG. 1) the card type, number an expiration date, along with the customer's number as contained in the register 114 (FIG. 4) are supplied to the look-up table 122 for approval. A variety of different checks may be implemented in the table, depending on the nature of the system. In a minimal system, the table 122 verifies the propriety of the data simply as to form. In a more complex embodiment, the structure of the table 122 may include a negative list of unacceptable cards and customer's numbers. For still greater control, the structure of the table 122 might incorporate a memory for scoring transactions of individual card holders as with reference to time. Various structures and formats for such operations are well known in the credit verification and approval art.

In the disclosed embodiment, the look-up table 122 carries the full names and addresses of the customers. Accordingly, in response to the customer's number, the look-up table operates through the vocal word memory to activate the voice responder. Specifically for example, the responder might be activated to state: "Please confirm that your full name is John J. Jones by pressing the one button."Similarly, the address and any other pertinent mailing information is confirmed. With confirmation, the data is stored in the register 114. Specifically, a block 138 (FIG. 5) of the register 114 (FIG. 1) receives the name and address data. Of course as explained above, difficulties might prompt either manual interface or termination of the communication.

With the successful completion and verification of all the preliminary data in the register 114, the look-up table qualifies the "and" gate 120 transferring the contents of the register 114 (FIG. 4) to a data cell in the memory 32 (FIG. 1). Essentially, with the caller testing complete, the preliminary phase of operation is concluded and the system next interfaces with the caller to acquire and process data for a specific order of merchandise. That operation is performed by the structural components as illustrated in FIG. 1 to load a cell in the memory 32.

Somewhat as described above in relation to the initial operating embodiment, the voice generator 30 prompts the caller through a series of exchanges that load the memory cell with a merchandise order. For example, the interchange might be as follows. The voice generator might instruct: "Please use the telephone number button to enter the item number of your purchase."

The caller might then enter the number "1124" which would be set in the data test buffer 26 and supplied to address the look-up table 33. In response, the look-up table 33 would cue the voice generator 30 to announce: "That is item number 1124, a small white men's polo slipover cotton shirt at $11.95. If that is correct, please push the button one on your telephone. If it is not correct, push the button two and re-enter the item number."

The caller could confirm or reject the item. As items are confirmed, they are loaded from the buffer 26 to the designated cell in the memory 32. With the registration of an item in the memory 32, the caller is asked to indicate whether or not he wishes to order additional items. Accordingly, the cycle may be repeated. Of course, as explained above, at any stage the customer can abort the mechanical interface and establish personal communication with an operator at the terminal 31. Also, some operating formats might automatically make the shift, as where the callers are all strange to the system and complex data must be registered as names and addresses.

As purchase items are confirmed, representative data is loaded into the assigned cell of the memory 32 as illustrated in FIG. 5. Specifically, a series of storage blocks are loaded as exemplified by the blocks 140 and 142. The interchange continues until the customer indicates he does not wish to order any additional items. The system then operates the voice generator 30 to announce the acknowledgement digits as stored in the block 144 (FIG. 5) of the assigned data cell in the memory 32 (FIG. 1). The acknowledgement digits serve to identify the order both for the caller and the mail order house. Accordingly, tracing is facilitated.

The individual cells of the memory 32 are processed to originate filling orders. In that regard, the statistical analysis program means 28 accumulates totals of specific items which are then utilized for inventory control. Specifically, comparisons can be performed between order totals, objective and existing inventories to generate lists for inventory adjustment. Thus, the system effectively analyzes acquired data to accomplish the desired objectives. To consider such analysis in somewhat greater detail, reference will now be made to the block diagram of FIG. 6.

Figure 6:
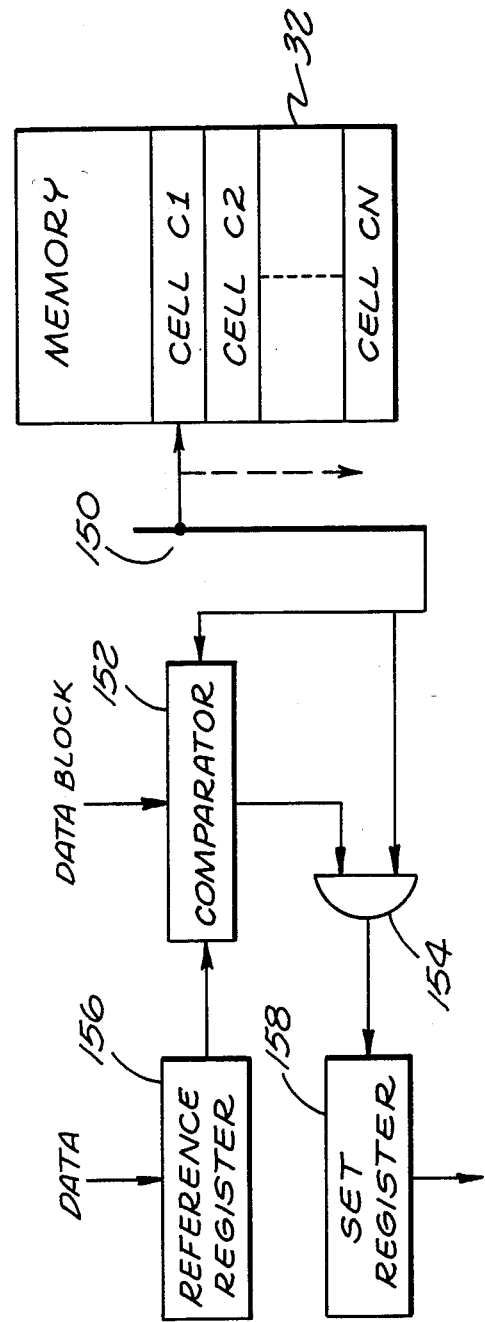
FIG. 6 is a block diagram of a form of analysis means as may be employed in the system of FIG. 1.

FIG. 6 functionally illustrates a component of the analysis means 28 (FIG. 1) specifically for processing data to develop a related set. Generating a data set or subset with respect to any particular polling or data accumulation operation can be very significant. For example, in a polling operation it may be desirable to isolate specific sets or subsets of persons or subjects falling into a specific category as explained above. With respect to merchandising operations, it may be desirable to isolate sets of files either for inventory control purposes, order processing or in the interssts of avoiding fraud. Some examples will illustrate the functions.

In a mail order operation, shipments often can be expedited by providing lists of similar items that are to be shipped. Accordingly, it is desirable to isolate a subset of orders on the basis of the items ordered, for example as specified in block 140 of the storage cell of FIG. 5. The same information is useful for inventory control. For example, after isolating a subset of orders or a specific article, the number of articles may be tallied to indicate inventory depletion.

As indicated above, isolating subsets of order data also may be helpful in avoiding fraud. Consider a likely gang operation. With an intention to defraud, a number of illicit credit cards may be acquired. Specifically, for example, the cards may have recently been stolen with tee consequence that they likely can be used for a short period of time. A potentially profitable use of the cards would be to support the purchase of a large volume of merchandise from a mail order establishment. Normally such an operation would involve readily marketable merchandise.

In the fraudulent use of the illicit cards, data falls into three categories. First, the card itself specifies certain data. Second, certain data involves the order; and third, data is provided to indicate the shipping destination for the merchandise. In a gang operation, a common shipping destination may be employed for a short period. Consequently, a major subset of merchandise order data designating a similar destination for merchandise should prompt suspicion. If the subset further indicates relatively marketable merchandise, further suspicion is aroused. Of course, at some point an investigation is desirable prior to delivering the merchandise. Accordingly, it is important to assemble a data subset wherein the block 138 (FIG. 5) specifies similar data.

Similarly, a sizable subset indicating multiple orders on the same credit card (block 132) may also suggest the need for investigation. Reference will now be made to FIG. 6 indicating a symbolic arrangement for acquiring or defining subsets of data during the course of the processing operation.

As illustrated in FIG. 6, the memory 32 is illustrated in FIG. 6 with the multiplicity of cells. The cells may be sensed by a scanner 150 illustrated for purposes of explanation as a mechanical apparatus. Of course, the system of the analysis means 88 (FIG. 1) would incorporate solid state operation to accomplish the function of the scanner 150. In any event, the scanner 150 sequentially receives the contents of cells C1 through CN for providing representative signals to a comparator 152 and an "and" gate 154. The comparator 152 also receives signals from a reference register 156 which is in turn connected to receive signals from within the computer 22, e.g. from the buffer 26. The comparator 152 also receives a command signal in the form of a specified data block to indicate the portion of cell data units to be compared.

The output of the comparator 152, a binary signal in a high state in the event of a comparison, qualifies the gate 154 to pass the contents of a cell to a set register 158. Consider an exemplary operation.

Assume, for example, that it is desired to test the data in each of the cells C1 through CN with respect to specific health data. The reference health data would be set in the reference register 156 from any of the sources within the computer 22. The comparator 152 would receive a test instruction for the digits in the data block 52 (FIG. 2) reflecting the health data. The system would then be commanded to proced, and data from individual cells C1 through CN would be supplied through the scanner 150 to the comparator 152. Upon the occurrence of a coincidence, the comparator 152 would qualify the "and" gate 154 to pass the data cell contents to the set register 158. At the termination of the operation, the subset of data from the cells C1 through CN having the specified similarity would be contained in the set register 158. Accordingly, such data could be further processed as suggested above within the analysis means 128.

To consider another exemplary operation, assume the system of the present invention is embodied for a mail order facility and concern exists with respect to a volume of orders supported by illicit credit cards and destined for a "drop" address. In such an instance, the contents of the data block 138 (name and address data) as illustrated in FIG. 5 would be of concern. Accordingly, the comparator 152 would be set to test the contents of data block 138. Next, the contents of cells C1 through CN would be sequentially applied to the reference register 158 and the comparator 152. Upon detecting a coincidence between a pair of cells with respect to the data block 138, one of the cells would be held in the reference register 156 to scan through the remainder of the cells C1 through CN and thereby accumulate a subset of data in the register 158 indicating a similar destination address for merchandise. With review, determinations could then be made either within the analysis means 28 or by a manual observation as to whether or not investigation appeared appropriate.

A wide variety of other possibilities, applications and formats in accordance herewith will be apparent to those skilled in the art wherein data is assembled, stored, identified, processed by testing as to isolate a subset or manifest data with sources reliably confirmed. With respect to identification data, it may be an identification such as a credit or ideniification card number, driver's license number, telephone number, etc. Alternatively, identification data may be a combination of identification-related data such as, for example, credit card number, merchant identification, expiration date of credit card and amount of transaction. For example, merchandising, polling, selecting and related operations are practical.

In view of the above explanation of the exemplary system, it will be appreciated that embodiments of the present invention may be employed in many applications to accumulate statistical data, process such data, and define subsets of callers of concern. While certain exemplary operations have been stated herein, and certain detailed structures have been disclosed, the appropriate scope hereof is deemed to be in accordance with the claims as set forth below.

What is claimed is:

1. A statistical analysis process for data from remote sources and for use with a communication facility including remote terminal apparatus for individual callers, wherein said remote terminal apparatus may comprise a conventional telephone instrument including voice communication means and digital input means in the form of an array of alphabetic numeric buttons for providing data, said process including the steps of:

interfacing said communication facility to provide voice signals and recive digital identification and answer signals representative respectively of identification data and answer data developed by said terminal apparatus under control of a caller;

generating voice signals and supplying said voice signals to actuate said terminal apparatus, as to provide vocal operating instructions to a caller;

providing sequence signals representative of sequence data indicating the time sequence of a call with reference to each of the calls from other callers;

initiating files and storing, (1) answer data for specific callers as indicated by said digital answer signals, (2) sequence data as indicated by said sequence signals and (3) identification data as indicated by identification signals identifying callers;

providing external data signals representative of external data distinct from answer data provided from said callers; and comparing said answer data from said callers and analyzing said answer data with said external data in combination to isolate a select subset of said callers.

2. A process according to claim 1 including the further step of generating acknowledgement data for a call and storing said acknowledgement data as further identification data.

3. A process according to claim 2 including the further step of encrypting at lest part of said achknowledgement data prior to storing.

4. A process according to claim 2 including the further step of communicating at lest part of said acknowledgement data to a caller.

5. A process according to claim 1 including the further step of receiving a caller's telephone number as identification data.

6. A process according to claim 1 including the further step of generating further identification data to provide a plurality of distinct data elements for identifying a caller.

7. A process according to claim 1 including the further step of testing identification data of a caller as a condition to storing answer data.

8. A process according to claim 7 including the further step of maintaining a record of callers to restrict the extent of answer data stored for a caller.

9. A process according to claim 8 including the further step of limiting the answer data stored from a caller to a one-time entry from a single call.

10. A process according to claim 7 including the further step of limiting the use of the process to store data from individual callers during a specific interval of time.

11. A process according to claim 1 including the further step of storing a billilng indentification number as at least part of said identification data for a caller.

12. A process according to claim 1 including the further step of aborting the interfacing step on command of a caller by a specific answer signla to provide person-to-person communication.

* * * * *

US004792968C1

(12) EX PARTE REEXAMINATION CERTIFICATE (8452nd)

United States Patent
Katz

(10) Number: US 4,792,968 C1
(45) Certificate Issued: Aug. 9, 2011

(54) STATISTICAL ANALYSIS SYSTEM FOR USE WITH PUBLIC COMMUNICATION FACILITY

(75) Inventor: Ronald A. Katz, Los Angeles, CA (US)

(73) Assignee: General Electric Capital Corporation, Atlanta, GA (US)

Reexamination Request:
No. 90/010,047, Nov. 6, 2007

Reexamination Certificate for:
Patent No.: 4,792,968
Issued: Dec. 20, 1988
Appl. No.: 07/018,244
Filed: Feb. 24, 1987

Related U.S. Application Data

(63) Continuation-in-part of application No. 06/753,299, filed on Jul. 10, 1985, now abandoned.

(51) Int. Cl.
*G07C 15/00* (2006.01)
*G07C 11/00* (2006.01)
*H04Q 3/74* (2006.01)
*H04Q 3/66* (2006.01)
*H04Q 3/00* (2006.01)
*H04Q 3/64* (2006.01)
*H04Q 3/545* (2006.01)
*H04Q 3/72* (2006.01)
*H04M 11/00* (2006.01)
*H04M 3/36* (2006.01)
*H04M 3/46* (2006.01)
*H04M 3/38* (2006.01)
*H04M 3/51* (2006.01)
*H04M 3/493* (2006.01)
*H04M 3/487* (2006.01)
*H04M 3/50* (2006.01)
*H04M 3/42* (2006.01)
*H04M 3/436* (2006.01)
*A63F 3/08* (2006.01)

(52) U.S. Cl. .................................. 379/92.03; 379/88.09

(58) Field of Classification Search .................. None
See application file for complete search history.

(56) References Cited

U.S. PATENT DOCUMENTS

| 2,902,541 | A | 9/1959 | Singleton |
| 2,941,161 | A | 6/1960 | Scantlin |
| 2,998,489 | A | 8/1961 | Riesz |
| 3,022,381 | A | 2/1962 | Pferd |

(Continued)

FOREIGN PATENT DOCUMENTS

| AU | 66113/81 | 7/1981 |
| CA | 1022674 | 12/1977 |
| CA | 1025118 | 1/1978 |

(Continued)

OTHER PUBLICATIONS

Lexis Search Results (Great American Potato–Chip giveaway/Raisin Bran Game/Giants Baseball Trivia—Dial Info): "In The Chips" AdWeek, Jul. 22, 1985.

(Continued)

*Primary Examiner*—James Menefee

(57) ABSTRACT

For use with a public communication facility C incorporating terminals T1-TN, e.g. a telephone system, a statistical analysis system D interfaces with individual stations where a caller is prompted by voice instructions to provide digital data that is identified for positive association with the caller and is stored for processing. Caller data is confirmed by a look-up table and by a signal-commanded voice generator. Files are created in the analysis system wherein callers are assigned designations which are stored along with statistical and identification data. In one embodiment, callers are identified by calling sequence and assigned designations are provided in the form of an acknowledgment. A break-off circuit enables a caller to terminate the computer interface aborting to a terminal for direct communication with an operator. The stored data is statistically processed and correlated as with established data to isolate a select group or subset of the callers or caller data that can be readily identified and confirmed.

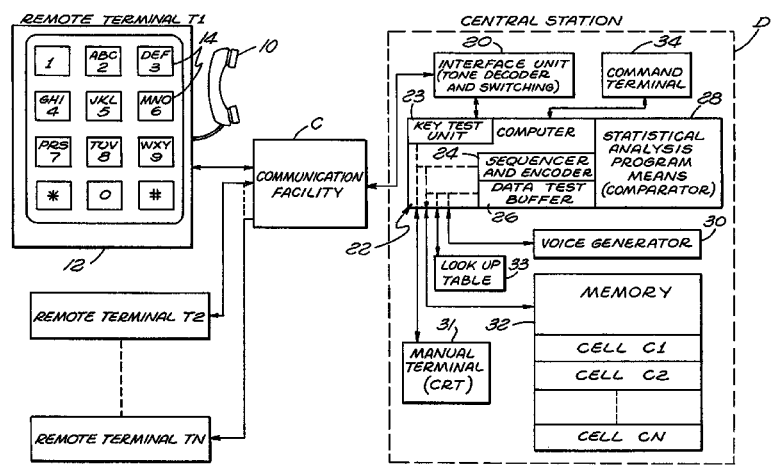

U.S. PATENT DOCUMENTS

| | | |
|---|---|---|
| 3,060,275 A | 10/1962 | Meacham et al. |
| 3,076,059 A | 1/1963 | Meacham et al. |
| 3,082,402 A | 3/1963 | Scantlin |
| 3,128,349 A | 4/1964 | Boesch et al. |
| 3,141,931 A | 7/1964 | Zarouni |
| 3,159,818 A | 12/1964 | Scantlin |
| 3,189,687 A | 6/1965 | Miller |
| 3,194,892 A | 7/1965 | Glenner .................... 179/18 |
| 3,243,514 A | 3/1966 | Moore et al. ............... 179/17 |
| 3,246,082 A | 4/1966 | Levy |
| 3,249,919 A | 5/1966 | Scantlin |
| 3,299,210 A | 1/1967 | Bandy |
| 3,337,847 A | 8/1967 | Olsson et al. |
| 3,347,988 A | 10/1967 | Marill et al. |
| 3,371,162 A | 2/1968 | Scantlin |
| 3,381,276 A | 4/1968 | James |
| 3,393,272 A | 7/1968 | Hanson |
| 3,394,246 A | 7/1968 | Goldman |
| 3,453,389 A | 7/1969 | Shaer |
| 3,482,057 A | 12/1969 | Abbott et al. |
| 3,484,560 A | 12/1969 | Jaeger |
| 3,515,814 A | 6/1970 | Morgan |
| 3,544,769 A | 12/1970 | Hedin |
| 3,553,378 A | 1/1971 | Solomon et al. |
| 3,555,198 A | 1/1971 | Stepan |
| 3,556,530 A | 1/1971 | Barr |
| 3,557,311 A | 1/1971 | Goldstein |
| 3,564,210 A | 2/1971 | Presti |
| 3,568,157 A | 3/1971 | Downing et al. |
| 3,569,939 A | 3/1971 | Doblmaier et al. |
| 3,571,799 A | 3/1971 | Coker, Jr et al. |
| 3,573,747 A | 4/1971 | Adams et al. |
| 3,581,072 A | 5/1971 | Nymeyer |
| 3,594,004 A | 7/1971 | Barr |
| 3,617,638 A | 11/1971 | Jochimsen et al. |
| 3,618,038 A | 11/1971 | Stein |
| 3,622,995 A | 11/1971 | Dilks |
| 3,624,292 A | 11/1971 | Guzak, Jr. |
| 3,644,675 A | 2/1972 | Watlington |
| 3,647,973 A | 3/1972 | James et al. |
| 3,651,480 A | 3/1972 | Downing et al. |
| 3,651,503 A | 3/1972 | Kono ...................... 340/174.1 |
| 3,652,795 A | 3/1972 | Wolf et al. |
| 3,656,113 A | 4/1972 | Lince |
| 3,665,107 A | 5/1972 | Kopec et al. |
| 3,675,513 A | 7/1972 | Flanagan et al. |
| 3,676,597 A | 7/1972 | Peterson |
| 3,688,126 A | 8/1972 | Klein |
| 3,689,703 A | 9/1972 | Allen et al. |
| 3,696,335 A | 10/1972 | Lemelson |
| 3,697,702 A | 10/1972 | Buonsante et al. |
| 3,702,392 A | 11/1972 | St. Jean .................... 235/61.7 |
| 3,725,596 A | 4/1973 | Maxon et al. |
| 3,725,597 A | 4/1973 | Streisand |
| 3,727,186 A | 4/1973 | Stephenson |
| 3,728,486 A | 4/1973 | Kraus |
| 3,752,904 A | 8/1973 | Waterbury |
| 3,769,463 A | 10/1973 | Graham et al. |
| 3,778,553 A | 12/1973 | Rackman ................ 379/93.27 |
| 3,781,810 A | 12/1973 | Downing |
| 3,787,632 A | 1/1974 | Male et al. |
| 3,792,446 A | 2/1974 | McFiggins et al. |
| 3,794,774 A | 2/1974 | Kemmerly et al. |
| 3,798,360 A | 3/1974 | Feistel ........................ 380/37 |
| 3,800,283 A | 3/1974 | Gropper |
| 3,829,628 A | 8/1974 | Tripsas |
| 3,833,885 A | 9/1974 | Gentile et al. ............... 235/379 |
| 3,858,032 A | 12/1974 | Scantlin |
| 3,870,821 A | 3/1975 | Steury |
| 3,870,866 A | 3/1975 | Halpern |
| 3,881,160 A | 4/1975 | Ross |
| 3,889,050 A | 6/1975 | Thompson |
| 3,909,553 A | 9/1975 | Marshall |
| 3,912,874 A | 10/1975 | Botterell et al. |
| 3,914,747 A | 10/1975 | Barnes et al. |
| 3,918,174 A | 11/1975 | Miller et al. |
| 3,920,908 A | 11/1975 | Kraus |
| 3,928,724 A | 12/1975 | Byram et al. |
| 3,929,278 A | 12/1975 | Balavoine et al. |
| 3,934,095 A | 1/1976 | Matthews et al. |
| 3,938,091 A | 2/1976 | Atalla et al. |
| 3,940,569 A | 2/1976 | Schonbrun |
| 3,947,972 A | 4/1976 | Freeman |
| 3,950,618 A | 4/1976 | Bloisi |
| 3,959,603 A | 5/1976 | Nilssen et al. ................ 377/42 |
| 3,974,338 A | 8/1976 | Luzier et al. |
| 3,982,103 A | 9/1976 | Goldman |
| 3,985,998 A | 10/1976 | Crafton |
| 3,987,252 A | 10/1976 | Vicari |
| 3,989,899 A | 11/1976 | Norwich |
| 3,991,406 A | 11/1976 | Downing et al. |
| 3,998,465 A | 12/1976 | Mascola |
| 4,007,336 A | 2/1977 | Hutton, Sr. .................. 179/18 |
| 4,009,342 A | 2/1977 | Fahrenschon et al. |
| 4,012,599 A | 3/1977 | Meyer |
| 4,017,835 A | 4/1977 | Randolph |
| 4,024,345 A | 5/1977 | Kochem |
| 4,028,494 A | 6/1977 | Zarouni |
| 4,031,324 A | 6/1977 | Dudonis |
| 4,054,756 A | 10/1977 | Comella et al. |
| 4,068,099 A | 1/1978 | Mikkola |
| 4,071,698 A | 1/1978 | Barger, Jr. et al. |
| 4,078,316 A | 3/1978 | Freeman |
| 4,087,638 A | 5/1978 | Hayes et al. |
| 4,088,838 A | 5/1978 | Nakata et al. |
| 4,090,034 A | 5/1978 | Moylan |
| 4,090,038 A | 5/1978 | Biggs |
| 4,097,923 A | 6/1978 | Eckert, Jr. |
| 4,108,361 A | 8/1978 | Krause |
| 4,117,278 A | 9/1978 | Ehrlich et al. |
| 4,121,052 A | 10/1978 | Richard |
| 4,122,308 A | 10/1978 | Weinberger et al. |
| 4,139,739 A | 2/1979 | von Meister |
| 4,145,578 A | 3/1979 | Orriss |
| 4,149,042 A | 4/1979 | Balzer et al. |
| 4,150,255 A | 4/1979 | Theis et al. |
| 4,152,547 A | 5/1979 | Theis |
| 4,160,125 A | 7/1979 | Bower et al. |
| 4,160,129 A | 7/1979 | Peyser et al. |
| 4,162,377 A | 7/1979 | Mearns |
| 4,187,498 A | 2/1980 | Creekmore |
| 4,191,376 A | 3/1980 | Goldman |
| 4,191,860 A | 3/1980 | Weber |
| 4,192,972 A | 3/1980 | Bertoglio et al. |
| 4,194,089 A | 3/1980 | Hashimoto |
| 4,197,430 A | 4/1980 | Dowden |
| 4,200,770 A | 4/1980 | Hellman et al. |
| 4,201,887 A | 5/1980 | Burns |
| 4,204,113 A | 5/1980 | Giraud et al. |
| 4,221,933 A | 9/1980 | Cornell et al. |
| 4,223,183 A | 9/1980 | Peters, Jr. |
| 4,232,199 A | 11/1980 | Boatwright et al. |
| 4,241,942 A | 12/1980 | Bachman |
| 4,242,539 A | 12/1980 | Hashimoto |
| 4,243,844 A | 1/1981 | Waldman |
| 4,255,618 A | 3/1981 | Danner et al. |
| 4,255,619 A | 3/1981 | Saito |
| 4,256,928 A | 3/1981 | Lesea |
| RE30,580 E | 4/1981 | Goldman et al. |
| 4,260,854 A | 4/1981 | Kolodny et al. |
| 4,264,924 A | 4/1981 | Freeman |

| Patent | Date | Inventor | Patent | Date | Inventor |
|---|---|---|---|---|---|
| 4,264,925 A | 4/1981 | Freeman et al. | 4,555,594 A | 11/1985 | Friedes et al. |
| 4,270,024 A | 5/1981 | Theis et al. | 4,556,970 A | 12/1985 | Flanagin et al. ............... 370/58 |
| 4,277,649 A | 7/1981 | Sheinbein | 4,559,415 A | 12/1985 | Bernard et al. |
| 4,290,141 A | 9/1981 | Anderson et al. | 4,559,416 A | 12/1985 | Theis et al. |
| 4,299,637 A | 11/1981 | Oberdeck et al. | 4,562,342 A | 12/1985 | Solo |
| 4,302,632 A | 11/1981 | Vicari | 4,565,903 A | 1/1986 | Riley |
| 4,302,810 A | 11/1981 | Bouricius et al. | 4,566,030 A | 1/1986 | Nickerson et al. |
| RE30,821 E | 12/1981 | Goldman | 4,567,323 A | 1/1986 | Lottes |
| 4,303,804 A | 12/1981 | Johnson et al. | 4,567,359 A | 1/1986 | Lockwood |
| 4,307,266 A | 12/1981 | Messina | 4,570,930 A | 2/1986 | Matheson |
| 4,310,727 A | 1/1982 | Lawser | 4,577,062 A | 3/1986 | Hilleary et al. |
| 4,313,035 A | 1/1982 | Jordan et al. | 4,577,067 A | 3/1986 | Levy et al. |
| 4,314,103 A | 2/1982 | Wilson | 4,578,700 A | 3/1986 | Roberts et al. |
| 4,317,961 A | 3/1982 | Johnson | 4,580,011 A | 4/1986 | Glaser |
| 4,320,256 A | 3/1982 | Freeman | 4,580,012 A | 4/1986 | Matthews et al. |
| 4,323,770 A | 4/1982 | Dieulot et al. | 4,581,486 A | 4/1986 | Matthews et al. |
| 4,328,396 A | 5/1982 | Theis | 4,582,956 A | 4/1986 | Doughty |
| 4,338,494 A | 7/1982 | Theis | 4,584,602 A | 4/1986 | Nakagawa |
| 4,339,798 A | 7/1982 | Hedges et al. | 4,585,903 A | 4/1986 | Schiller et al. |
| 4,345,315 A | 8/1982 | Cadotte et al. | 4,585,906 A | 4/1986 | Matthews et al. |
| 4,348,554 A | 9/1982 | Asmuth | 4,586,707 A | 5/1986 | McNeight et al. |
| 4,355,207 A | 10/1982 | Curtin | 4,587,379 A | 5/1986 | Masuda |
| 4,355,372 A | 10/1982 | Johnson et al. | 4,591,190 A | 5/1986 | Clark |
| 4,360,827 A | 11/1982 | Braun | 4,591,664 A | 5/1986 | Freeman |
| 4,360,875 A | 11/1982 | Behnke | 4,591,665 A | 5/1986 | Foster et al. |
| 4,367,402 A | 1/1983 | Giraud et al. | 4,592,546 A | 6/1986 | Fascenda et al. |
| 4,371,752 A | 2/1983 | Matthews et al. | 4,594,476 A | 6/1986 | Freeman |
| 4,376,875 A | 3/1983 | Beirne | 4,595,983 A | 6/1986 | Gehalo et al. |
| 4,389,546 A | 6/1983 | Glisson et al. | 4,598,367 A | 7/1986 | DeFrancesco et al. |
| 4,393,277 A | 7/1983 | Besen et al. | 4,599,493 A | 7/1986 | Cave |
| 4,398,708 A | 8/1983 | Goldman et al. | 4,600,809 A | 7/1986 | Tatsumi et al. |
| 4,400,587 A | 8/1983 | Taylor | 4,603,232 A | 7/1986 | Kurland et al. |
| 4,401,856 A | 8/1983 | Curtin et al. | 4,611,094 A | 9/1986 | Asmuth et al. |
| 4,405,829 A | 9/1983 | Rivest et al. | 4,611,096 A | 9/1986 | Asmuth et al. |
| 4,410,765 A | 10/1983 | Hestad et al. | 4,612,416 A | 9/1986 | Emerson et al. |
| 4,420,656 A | 12/1983 | Freeman | 4,614,367 A | 9/1986 | Breen |
| 4,427,848 A | 1/1984 | Tsakanikas | 4,616,852 A | 10/1986 | Cash |
| 4,428,296 A | 1/1984 | Scheuchzer et al. | 4,625,079 A | 11/1986 | Castro et al. |
| 4,429,187 A | 1/1984 | Butcher | 4,625,081 A | 11/1986 | Lotito et al. |
| 4,438,824 A | 3/1984 | Mueller-Schloer | 4,625,276 A | 11/1986 | Benton et al. |
| 4,439,635 A | 3/1984 | Theis et al. | 4,630,200 A | 12/1986 | Ohmae et al. |
| 4,439,636 A | 3/1984 | Newkirk et al. | 4,630,201 A | 12/1986 | White |
| 4,445,001 A | 4/1984 | Bertoglio | 4,634,809 A | 1/1987 | Paulsson et al. |
| 4,449,040 A | 5/1984 | Matsuoka et al. | 4,635,251 A | 1/1987 | Stanley et al. |
| 4,451,087 A | 5/1984 | Tamamushi | 4,640,991 A | 2/1987 | Matthews et al. |
| 4,451,700 A | 5/1984 | Kempner et al. | 4,645,873 A | 2/1987 | Chomet |
| 4,467,424 A | 8/1984 | Hedges et al. | 4,649,563 A | 3/1987 | Riskin |
| 4,468,528 A | 8/1984 | Reece et al. | 4,652,998 A | 3/1987 | Koza et al. |
| 4,468,529 A | 8/1984 | Samuel et al. | 4,654,482 A | 3/1987 | DeAngelis |
| 4,475,189 A | 10/1984 | Herr et al. | 4,656,623 A | 4/1987 | Dalby |
| 4,484,031 A | 11/1984 | Gray et al. | 4,656,624 A | 4/1987 | Collins et al. |
| 4,489,438 A | 12/1984 | Hughes | 4,658,417 A | 4/1987 | Hashimoto et al. |
| 4,490,583 A | 12/1984 | Bednarz et al. | 4,663,777 A | 5/1987 | Szeto |
| 4,494,197 A | 1/1985 | Troy et al. | 4,665,502 A | 5/1987 | Kreisner |
| 4,501,958 A | 2/1985 | Glize et al. | 4,669,730 A | 6/1987 | Small |
| 4,511,764 A | 4/1985 | Nakayama et al. | 4,671,512 A | 6/1987 | Bachman et al. |
| 4,513,175 A | 4/1985 | Smith | 4,672,660 A | 6/1987 | Curtin |
| 4,517,410 A | 5/1985 | Williams et al. | 4,673,802 A | 6/1987 | Ohmae et al. |
| 4,517,412 A | 5/1985 | Newkirk et al. | 4,674,044 A | 6/1987 | Kalmus et al. |
| 4,518,824 A | 5/1985 | Mondardini | 4,677,552 A | 6/1987 | Sibley, Jr. |
| 4,518,827 A | 5/1985 | Sagara | 4,677,553 A | 6/1987 | Roberts et al. |
| 4,521,643 A | 6/1985 | Dupuis et al. | 4,677,609 A | 6/1987 | Pierath |
| 4,523,055 A | 6/1985 | Hohl et al. | 4,680,785 A | 7/1987 | Akiyama et al. |
| 4,531,023 A | 7/1985 | Levine | 4,685,123 A | 8/1987 | Hsia et al. |
| 4,532,378 A | 7/1985 | Nakayama et al. | 4,685,127 A | 8/1987 | Miller et al. |
| 4,539,435 A | 9/1985 | Eckmann | 4,688,170 A | 8/1987 | Waite et al. |
| 4,539,436 A | 9/1985 | Theis | 4,689,742 A | 8/1987 | Troy et al. |
| 4,544,804 A | 10/1985 | Herr et al. | 4,692,817 A | 9/1987 | Theis |
| 4,547,851 A | 10/1985 | Kurland | 4,694,490 A | 9/1987 | Harvey et al. |
| 4,549,047 A | 10/1985 | Brian et al. | 4,696,028 A | 9/1987 | Morganstein et al. |
| 4,549,291 A | 10/1985 | Renoulin | 4,696,029 A | 9/1987 | Cohen |

| Patent No. | Date | Name |
|---|---|---|
| 4,697,282 A | 9/1987 | Winter et al. |
| 4,704,725 A | 11/1987 | Harvey et al. |
| 4,706,275 A | 11/1987 | Kamil |
| 4,710,955 A | 12/1987 | Kauffman |
| 4,715,061 A | 12/1987 | Norwich |
| 4,716,583 A | 12/1987 | Groner et al. |
| 4,719,647 A | 1/1988 | Theis et al. |
| 4,722,526 A | 2/1988 | Tovar et al. |
| 4,726,056 A | 2/1988 | An |
| 4,734,858 A | 3/1988 | Schlafly |
| 4,737,983 A | 4/1988 | Frauenthal et al. |
| 4,745,468 A | 5/1988 | Von Kohorn |
| 4,747,124 A | 5/1988 | Ladd |
| 4,748,668 A | 5/1988 | Shamir et al. |
| 4,750,199 A | 6/1988 | Norwich |
| 4,755,872 A | 7/1988 | Bestler et al. |
| 4,756,020 A | 7/1988 | Fodale |
| 4,757,267 A | 7/1988 | Riskin |
| 4,759,056 A | 7/1988 | Akiyama |
| 4,761,684 A | 8/1988 | Clark et al. |
| 4,761,807 A | 8/1988 | Matthews et al. |
| 4,761,808 A | 8/1988 | Howard |
| 4,763,191 A | 8/1988 | Gordon et al. |
| 4,763,353 A | 8/1988 | Canale et al. |
| 4,764,666 A | 8/1988 | Bergeron |
| 4,766,604 A | 8/1988 | Axberg |
| 4,768,222 A | 8/1988 | Kalfon |
| 4,768,223 A | 8/1988 | Kinoshita et al. |
| 4,769,834 A | 9/1988 | Billinger et al. |
| 4,774,655 A | 9/1988 | Kollin et al. |
| 4,776,004 A | 10/1988 | Bauer |
| 4,781,377 A | 11/1988 | McVean et al. |
| 4,782,508 A | 11/1988 | Borchering et al. |
| 4,782,510 A | 11/1988 | Szlam |
| 4,782,519 A | 11/1988 | Patel et al. |
| 4,783,796 A | 11/1988 | Ladd |
| 4,783,800 A | 11/1988 | Levine |
| 4,785,408 A | 11/1988 | Britton et al. |
| 4,785,473 A | 11/1988 | Pfeiffer et al. |
| 4,788,682 A | 11/1988 | Vij et al. |
| 4,788,715 A | 11/1988 | Lee |
| 4,788,716 A | 11/1988 | Zebe |
| 4,788,718 A | 11/1988 | McNabb et al. |
| 4,789,928 A | 12/1988 | Fujisaki |
| 4,791,640 A | 12/1988 | Sand |
| 4,791,664 A | 12/1988 | Lutz et al. |
| 4,791,666 A | 12/1988 | Cobb et al. |
| 4,792,973 A | 12/1988 | Gilhousen et al. |
| 4,796,293 A | 1/1989 | Blinken et al. |
| 4,797,818 A | 1/1989 | Cotter |
| 4,797,910 A | 1/1989 | Daudelin |
| 4,797,911 A | 1/1989 | Szlam et al. |
| 4,797,913 A | 1/1989 | Kaplan et al. |
| 4,797,915 A | 1/1989 | Bowker et al. ......... 379/216.01 |
| 4,799,156 A | 1/1989 | Shavit et al. |
| 4,799,255 A | 1/1989 | Billinger et al. |
| 4,800,583 A | 1/1989 | Theis |
| 4,805,207 A | 2/1989 | McNutt et al. |
| 4,805,209 A | 2/1989 | Baker, Jr. et al. |
| 4,812,843 A | 3/1989 | Champion, III et al. |
| 4,815,031 A | 3/1989 | Furukawa |
| 4,815,121 A | 3/1989 | Yoshida |
| 4,815,741 A | 3/1989 | Small |
| 4,827,500 A | 5/1989 | Binkerd et al. |
| 4,829,563 A | 5/1989 | Crockett et al. |
| 4,832,341 A | 5/1989 | Muller |
| 4,835,630 A | 5/1989 | Freer |
| 4,842,278 A | 6/1989 | Markowicz |
| 4,845,739 A | 7/1989 | Katz |
| 4,847,890 A | 7/1989 | Solomon et al. |
| 4,850,007 A | 7/1989 | Marino et al. |
| 4,852,154 A | 7/1989 | Lewis et al. |
| 4,853,882 A | 8/1989 | Marshall |
| 4,856,050 A | 8/1989 | Theis et al. |
| 4,856,066 A | 8/1989 | Lemelson |
| 4,858,123 A | 8/1989 | Alexoff |
| 4,866,756 A | 9/1989 | Crane et al. |
| 4,870,679 A | 9/1989 | Hanna et al. |
| 4,876,592 A | 10/1989 | Von Kohorn |
| 4,876,717 A | 10/1989 | Barron et al. |
| 4,878,240 A | 10/1989 | Lin et al. |
| 4,879,744 A | 11/1989 | Tasaki et al. |
| 4,881,261 A | 11/1989 | Oliphant et al. |
| 4,882,473 A | 11/1989 | Bergeron et al. |
| 4,893,325 A | 1/1990 | Pankonen et al. |
| 4,893,328 A | 1/1990 | Peacock |
| 4,893,330 A | 1/1990 | Franco |
| 4,894,857 A | 1/1990 | Szlam et al. |
| 4,896,345 A | 1/1990 | Thorne |
| 4,896,346 A | 1/1990 | Belfield et al. |
| 4,897,867 A | 1/1990 | Foster et al. |
| 4,897,870 A | 1/1990 | Golden |
| 4,899,373 A | 2/1990 | Lee et al. |
| 4,899,375 A | 2/1990 | Bauer et al. |
| 4,907,079 A | 3/1990 | Turner et al. |
| 4,908,761 A | 3/1990 | Tai |
| 4,908,850 A | 3/1990 | Masson et al. |
| 4,908,852 A | 3/1990 | Hird et al. |
| 4,916,726 A | 4/1990 | Morley, Jr. et al. |
| 4,918,719 A | 4/1990 | Daudelin |
| 4,922,519 A | 5/1990 | Daudelin |
| 4,922,520 A | 5/1990 | Bernard et al. |
| 4,922,522 A | 5/1990 | Scanlon |
| 4,926,462 A | 5/1990 | Ladd et al. |
| 4,926,996 A | 5/1990 | Eglise et al. |
| 4,932,021 A | 6/1990 | Moody |
| 4,932,042 A | 6/1990 | Baral et al. |
| 4,933,965 A | 6/1990 | Hird |
| 4,933,967 A | 6/1990 | Lo |
| 4,935,954 A | 6/1990 | Thompson |
| 4,937,853 A | 6/1990 | Brule et al. |
| 4,942,598 A | 7/1990 | Davis |
| 4,942,599 A | 7/1990 | Gordon et al. |
| 4,942,616 A | 7/1990 | Linstroth et al. |
| 4,943,995 A | 7/1990 | Daudelin et al. |
| 4,951,307 A | 8/1990 | Willard |
| 4,951,310 A | 8/1990 | Honda et al. |
| 4,955,047 A | 9/1990 | Morganstein et al. |
| 4,955,054 A | 9/1990 | Boyd, Jr. |
| 4,959,783 A | 9/1990 | Scott et al. |
| 4,959,855 A | 9/1990 | Daudelin |
| 4,961,217 A | 10/1990 | Akiyama |
| 4,964,157 A | 10/1990 | Aoshima |
| 4,965,825 A | 10/1990 | Harvey et al. |
| 4,969,183 A | 11/1990 | Reese |
| 4,969,185 A | 11/1990 | Dorst et al. |
| 4,972,461 A | 11/1990 | Brown et al. |
| 4,972,462 A | 11/1990 | Shibata |
| 4,974,252 A | 11/1990 | Osborne |
| 4,975,945 A | 12/1990 | Carbullido |
| 4,985,913 A | 1/1991 | Shalom et al. |
| 4,989,233 A | 1/1991 | Schakowsky et al. |
| 4,989,234 A | 1/1991 | Schakowsky et al. |
| 4,992,940 A | 2/1991 | Dworkin |
| 4,996,704 A | 2/1991 | Brunson |
| 4,996,705 A | 2/1991 | Entenmann et al. |
| 5,000,486 A | 3/1991 | Rua, Jr. et al. |
| 5,001,710 A | 3/1991 | Gawrys et al. |
| 5,003,574 A | 3/1991 | Denq et al. |
| 5,003,585 A | 3/1991 | Richer |
| 5,003,595 A | 3/1991 | Collins et al. |
| 5,014,298 A | 5/1991 | Katz |

| | | | | | |
|---|---|---|---|---|---|
| 5,017,917 A | 5/1991 | Fisher et al. | 5,790,636 A | 8/1998 | Marshall |
| 5,018,736 A | 5/1991 | Pearson et al. | 5,815,551 A | 9/1998 | Katz |
| 5,023,904 A | 6/1991 | Kaplan et al. | 5,835,576 A | 11/1998 | Katz |
| 5,027,384 A | 6/1991 | Morgenstein | 5,841,837 A | 11/1998 | Fuller et al. |
| 5,029,196 A | 7/1991 | Morganstein | 5,898,762 A | 4/1999 | Katz |
| 5,029,199 A | 7/1991 | Jones | 5,917,893 A | 6/1999 | Katz |
| 5,033,076 A | 7/1991 | Jones et al. | | | |
| 5,033,088 A | 7/1991 | Shipman | FOREIGN PATENT DOCUMENTS | | |
| 5,036,535 A | 7/1991 | Gechter et al. | | | |
| 5,043,889 A | 8/1991 | Lucey | CA | 1056500 | 6/1979 |
| 5,046,183 A | 9/1991 | Dorst et al. | CA | 1059621 | 7/1979 |
| 5,048,075 A | 9/1991 | Katz ........................ 379/92.03 | CA | 1143494 | 1/1980 |
| 5,054,059 A | 10/1991 | Stern et al. | CA | 1162336 | 2/1984 |
| 5,068,891 A | 11/1991 | Marshall | CA | 1225759 | 8/1987 |
| 5,083,272 A | 1/1992 | Walker et al. | CA | 2009937-2 | 8/1990 |
| 5,092,598 A | 3/1992 | Kamille | DE | 2351949 A1 | 4/1975 |
| 5,097,528 A | 3/1992 | Gursahaney et al. | DE | 2903450 A1 | 8/1980 |
| 5,103,449 A | 4/1992 | Jolissaint | DE | 2903479 A1 | 8/1980 |
| 5,109,414 A | 4/1992 | Harvey et al. | DE | OS 2929416 | 2/1981 |
| 5,125,024 A | 6/1992 | Gokcen et al. | DE | 3406615 A1 | 8/1984 |
| 5,127,003 A | 6/1992 | Doll, Jr. et al. | DE | OS 3726366 | 2/1988 |
| 5,128,984 A | 7/1992 | Katz | DE | 4005365 A1 | 8/1990 |
| 5,146,491 A | 9/1992 | Silver et al. | EP | 0009684 A1 | 8/1979 |
| 5,148,474 A | 9/1992 | Haralambopoulos et al. | EP | 0015120 A1 | 2/1980 |
| 5,153,906 A | 10/1992 | Akiyama | EP | 0041261 A1 | 6/1981 |
| 5,164,981 A | 11/1992 | Mitchell et al. | EP | 0060643 A2 | 3/1982 |
| 5,168,548 A | 12/1992 | Kaufman et al. | EP | 0066823 A1 | 5/1982 |
| 5,179,585 A | 1/1993 | MacMillan, Jr. et al. | EP | 0088639 A2 | 3/1983 |
| 5,181,236 A | 1/1993 | LaVallee et al. | EP | 0 217 308 A2 | 4/1987 |
| 5,181,238 A | 1/1993 | Medamana et al. | EP | 0 229 170 A | 7/1987 |
| 5,186,471 A | 2/1993 | Vancraeynest | EP | 0249575 | 12/1987 |
| 5,199,062 A | 3/1993 | Von Meister et al. | EP | 0295837 | 12/1988 |
| 5,214,689 A | 5/1993 | O'Sullivan | EP | 0342295 | 11/1989 |
| 5,222,120 A | 6/1993 | McLeod et al. | EP | 0434181 | 6/1991 |
| 5,233,654 A | 8/1993 | Harvey et al. | EP | 0 451 693 A2 | 10/1991 |
| 5,236,199 A | 8/1993 | Thompson, Jr. | EP | 0 451 695 A2 | 10/1991 |
| 5,243,643 A | 9/1993 | Sattar et al. | EP | 0 453 831 A2 | 10/1991 |
| 5,251,252 A | 10/1993 | Katz | EP | 0 454 363 A2 | 10/1991 |
| 5,255,183 A | 10/1993 | Katz | EP | 0 568 114 A | 11/1993 |
| 5,263,723 A | 11/1993 | Pearson et al. | EP | 0 620 669 A | 10/1994 |
| 5,289,531 A | 2/1994 | Levine | EP | 0 438 860 B1 | 9/1996 |
| 5,299,260 A | 3/1994 | Shaio | EP | 0 382 670 B1 | 4/1997 |
| RE34,587 E | 4/1994 | Crane et al. | EP | 0 382 212 B1 | 7/1998 |
| 5,303,298 A | 4/1994 | Morganstein | EP | 0 917 335 A2 | 5/1999 |
| 5,303,299 A | 4/1994 | Hunt et al. | FR | 9002131 | 8/1990 |
| 5,327,554 A | 7/1994 | Palazzi, III et al. | GB | 1162484 | 4/1967 |
| 5,333,185 A | 7/1994 | Burke et al. | GB | 1124945 | 9/1968 |
| 5,335,277 A | 8/1994 | Harvey et al. | GB | 1352600 | 5/1974 |
| 5,351,276 A | 9/1994 | Doll, Jr. et al. | GB | 1400654 | 7/1975 |
| 5,351,285 A | 9/1994 | Katz | GB | 1442883 | 7/1976 |
| 5,353,335 A | 10/1994 | D'Urso et al. | GB | 1505718 | 3/1978 |
| 5,354,069 A | 10/1994 | Guttman et al. | GB | 1520529 | 8/1978 |
| 5,361,295 A | 11/1994 | Solomon et al. | GB | 1544542 | 4/1979 |
| 5,365,575 A | 11/1994 | Katz ........................ 379/93.13 | GB | 2046556 B | 11/1980 |
| 5,369,685 A | 11/1994 | Kero | GB | 2057740 | 4/1981 |
| 5,402,472 A | 3/1995 | MeLampy et al. | GB | 2065353 A | 6/1981 |
| 5,403,999 A | 4/1995 | Entenmann et al. | GB | 2118341 A | 10/1983 |
| 5,415,416 A | 5/1995 | Scagnelli et al. | GB | 2120507 | 11/1983 |
| 5,416,830 A | 5/1995 | MacMillan, Jr. et al. | GB | 2141309 A | 12/1984 |
| 5,418,844 A | 5/1995 | Morrisey et al. | GB | 2184327 A | 6/1987 |
| 5,475,205 A | 12/1995 | Behm et al. | GB | 2 230 403 A | 10/1990 |
| 5,490,207 A | 2/1996 | Schorr | GB | 2 252 270 B | 8/1992 |
| 5,511,112 A | 4/1996 | Szlam | GB | 2253542 | 9/1992 |
| 5,537,143 A | 7/1996 | Steingold et al. | IL | 74048 | 1/1985 |
| 5,561,710 A | 10/1996 | Helms | IL | 76993 | 12/1995 |
| 5,599,046 A | 2/1997 | Behm et al. | JP | 52-016941 | 2/1977 |
| 5,623,536 A | 4/1997 | Solomon et al. | JP | 52-021738 | 2/1977 |
| 5,651,048 A | 7/1997 | Leeuw | JP | 52-17740 | 9/1977 |
| 5,709,603 A | 1/1998 | Kaye | JP | 53-039808 | 4/1978 |
| 5,768,348 A | 6/1998 | Solomon et al. | JP | 53-115109 | 10/1978 |
| 5,787,156 A | 7/1998 | Katz | JP | 54-061807 | 5/1979 |
| | | | JP | 55-010246 | 1/1980 |

| JP | 55-107375 | 8/1980 |
| JP | 56-004969 | 1/1981 |
| JP | 56-020371 | 2/1981 |
| JP | 56-044958 | 4/1981 |
| JP | 56-098966 | 8/1981 |
| JP | 57-045767 | 3/1982 |
| JP | 57-073471 | 5/1982 |
| JP | 57-125567 | 8/1982 |
| JP | 57-125569 | 8/1982 |
| JP | 57-125570 | 8/1982 |
| JP | 57-127903 | 8/1982 |
| JP | 57-162867 | 10/1982 |
| JP | 58-003367 | 1/1983 |
| JP | 58-165473 | 9/1983 |
| JP | 58-221559 | 12/1983 |
| JP | 59-016068 | 1/1984 |
| JP | 59-108446 | 6/1984 |
| JP | 59-190771 | 10/1984 |
| JP | 59-208973 | 11/1984 |
| JP | 60-010868 | 1/1985 |
| JP | 60-035868 | 2/1985 |
| JP | 60-220655 | 11/1985 |
| JP | 61-210754 | 9/1986 |
| JP | 62-038933 | 2/1987 |
| JP | 500138/88 | 1/1988 |
| JP | 01-098362 | 4/1989 |
| JP | 298158/90 | 12/1990 |
| JP | 41855/91 | 2/1991 |
| WO | WO 08101664 A1 | 6/1981 |
| WO | WO 82/02132 | 6/1982 |
| WO | WO 08401073 A1 | 3/1984 |
| WO | 00370/87 | 1/1987 |
| WO | WO 87/00375 | 1/1987 |
| WO | WO 08702208 A1 | 4/1987 |
| WO | WO88/02966 | 4/1988 |
| WO | WO88/05985 | 8/1988 |
| WO | WO89/02139 | 3/1989 |
| WO | WO89/09530 | 10/1989 |
| WO | WO 89/11768 | 11/1989 |
| WO | WO 90/10989 | 9/1990 |
| WO | WO 90/11661 | 10/1990 |
| WO | WO 91/15818 | 10/1991 |
| WO | WO 92/06548 | 4/1992 |
| WO | WO 92/09164 | 5/1992 |
| WO | WO 92/15166 | 9/1992 |
| WO | WO93/05483 | 3/1993 |

OTHER PUBLICATIONS

"San–Fran–Police–League", Business Wire, Aug. 2, 1985.
"Similar Campaigns", DM News, Dec. 15, 1985.
"Phone Offers Action At Push Of Button", Advertising Age, Feb. 6, 1986.
Winckelmann, W.A., "Automatic Service", *Bell Laboratories Record*, May 1968, vol. 46, No. 5, pp. 138–143—(Article).
"Proposed Agreement Between National Enterprises Board (N.E.B.) and Delphi", Jan. 30, 1979.
"Appraisal Of The Fair Market Value Of Delphi Communications", Apr. 30, 1980—(Study) Delphi Communications—(Charts and Exhibits).
"Voice–Response System Improves Order Entry, Inventory Control", *Communication News*, Aug. 1976—(Article).
Rabin, Jeff, "Minorities Seek 30% Share of All Lottery Operations", *Sacramento Bee*, Apr. 12, 1985—(Article).
Advertisements (Dial Giants Baseball Trivia Game): *San Francisco Chronicle*, Jul. 3, 1984.
Curtis, Cathy, "976 numbers let you dial–a–whatever", *San Francisco Business Journal*, Nov. 26, 1984—(Article).
Ferrell, Jane, "Three Tittle numbers for instant information", *San Francisco Chronicle*, Aug. 15, 1984—(Article).
"Dallas Telephone Call–in Game Uses Computer Voice Interface", Sep. 24, 1984—(Press Release).
Rivest, R. L., et al., "A Method for Obtaining Digital Signatures and Public–Key Cryptosystems", *Communications of the ACM*, Feb. 1978, vol. 21, No. 2, pp. 120–126—(Article).
Finnigan, Paul F. "Audiotex: The telephone as data–access equipment", *Data Communications*, 1987, pp. 155–161 (Article).
Ozawa, Y., et al., "Voice Response System and Its Applications", *Hitachi Review*, Dec. 1979, vol. 28, No. 6, pp. 301–305—(Article).
"AT&T 2: Reaches agreement with Rockwell (ROK)", Aug. 26, 1986—(Press Release).
"AT&T: Expands Computer speech system product line", Apr. 14, 1986—(Press Release).
Adams, Cynthia, "Conversing With Computers", *Computerworld on Communications*, May 18, 1983, vol. 17, No. 20A, pp. 36–44—(Article).
Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).
Davidson, Leon, "A Pushbutton Telephone For Alphanumeric Input", *Datamation*, Apr. 1966, pp. 27–30—(Article).
Advertisement: Cuervo Gold Beach Chair, VoiceMail Int'l, '83.
"Get The Message. . . !" "New VoiceMail Features", *Voicemail International, Inc.*, Oct. 1984—(Article).
Brochures (TWA Crew Scheduling/PSA's Reservation System/Universal Studios Program/Dow Phone): "AVIAR The communication system that keeps you flying", VoiceMail Int'l, —(Brochure)(Undated).
"TWA VOICEMAIL, Flight Attendants Users Guide" Aug. 1986—(Brochure).
Holtzman, Henry, "Voice Mail Soars At TWA", *Modern Office Technology*(Reprint), Mar. 1986,—(Article).
"Bid Results via VOICEMAIL—Flight Deck Crew Members", May 1, 1985 (Script).
Borden W.S., "Flight Attendant Self Input Of Monthly Bids Via Touch Tone Telephone", *In–Flight Services Bulletin*, Sep. 15, 1985—(Memo).
"Look Ma, no operators! Automatic voice system does many airline jobs", *Air Transport World*, Oct. 1986—(Article).
"1,000,000 Shares Common Stock" *Voicemail International, Inc.*, Jan. 10, 1984—(Public Offering Summary).
Levinson, S.E., et al., "A Conversational–Mode Airline Information and Reservation System Using Speech Input and Output", *The Bell System Technical Journal*, Jan. 1980, vol. 59, No. 1, pp. 119–137.
Emerson, S.T., "Voice Response Systems—Technology to the Rescue for Business Users", *Speech Technology*, Jan./Feb. '83, pp. 99–103—(Article).
Moslow, Jim, "Emergency reporting system for small communities", *Telephony*, Feb. 11, 1985, pp. 30–32, 34—(Article).
Rabiner, L.R., et al., "Digital Techniques for Computer Voice Response: Implementation and Applications", *Proceedings Of The IEEE*, Apr. 1976, vol. 64, No. 4, pp. 416–432—(Article).
Moosemiller, J.P., "AT&T's CONVERSANT™ I Voice System" *Speech Technology*, Mar/Apr. 1986, pp. 88–93—(Article).

Frank, R.J., et al., "No. 4 ESS: Mass Announcement Capability", *The Bell System Technical Journal*, Jul/Aug. 1981, vol. 60, No. 6, Part 2, pp. 1049–1081—(Chapter from a Book).
"Chapter 1 General Description" *D.I.A.L. PRM/Release 3—Version 2* Mar. 1987 (Product Reference Manual).
"Announcing Release 3.3" *D–A–S–H–D.I.A.L. Application and Support Hints*, Jan/Feb. Mar. 1987, vol. 3, No. 1—(Brochure).
"D.I.A.L. Software Release 4" *OPCOM*, Jan. 1988, Version 1—(Product Reference Manual).
Brady, R.L., et al., "Telephone Identifier Interface", *IBM Technical Disclosure Bulletin*, Oct. 1976, vol. 19, No. 5, 1569–1571—(Article).
Corbett, A.J., "Telephone Enquiry System Using Synthetic Speech", *University of Essex*, Dec. 1974, (Thesis).
Sagawa, S., et al., "Automatic Seat Reservation By Touch–Tone Telephone", *Second USA Japan Computer Conference*, 1975, vol. 2, pp. 290–294—(Article).
Smith, S.L., "Computer–Generated Speech and Man–Computer Interaction", *Human Factors*, 1970, 12(2), pp. 215–223—(Article).
Mullen, R.W., "Telephone—home's 'friendliest' Computer", *Inside Telephone Engineer And Management*, May 15, 1985, vol. 89, No. 10, —(Article).
"Telephone Computing Entering Service Bureau Business", *American Banker*, Jul. 5, 1979—(Article).
Kutler, Jeffrey, "Technology, System Sharing Improve Phone Banking Outlook", *American Banker*, Dec. 7, 1979, vol. CXLIV, No. 237—(Article).
Kutler, Jeffrey, "Phone Bill Paying Accessed by Pioneer", *American Banker*, Dec. 7, 1979, vol. CXLIV, No. 237—(Article).
"Audiotex Information From Dow Jones", *The Computer Review*, Nov. 1984, vol. 2, No. 1—(Article).
"Dow Phone Adds Innovest Systems' Technical Analysis Reports" *IDP Report*, Jan. 3, 1986—(Report).
Perdue, R.J., et al., "Conversant 1 Voice System: Architecture and Applications", *AT&T Technical Journal*, Sep/Oct. 1986—(Article).
Kalselman, D.B., "The Role Of Audio Response In Data Collection Systems", *Proceedings of the Technical Sessions*, Palais des Expositions, Geneva, Switzerland, Jun. 17–19, 1980, pp. 247–251—(Article).
Boles, S.J., et al., "User Interface for Audio Communication System", *IBM Technical Disclosure Bulletin*, Dec. 1982, vol. 25, No. 7A, pp. 3371–3377—(Article).
Kramer, J.J., "Human Factors Problems in the Use of Pushbutton Telephones for Data Entry", *Bell Telephone Laboratories*, Holmdel, N.J., Apr. 74, pp. 241–258—(Paper).
Cox, Jr., Floyd, "Flora Fax", Jan. 22, 1986—(Letter and Advertisements).
Isayama, Tetsuya, "Automatic Response Processing Equipment as a Multi–media Communication Node", *Japan Telecommunications Review*, 1987, vol. 29, No. 1, pp. 29–36—(Article).
Imai, Y., et al., "Shared Audio Information System Using New Audio Response Unit" *Japan Telecommunications Review*, Oct. 1981, vol. 23, No. 4, pp. 383–390—(Article).
"Automatic Call Distributor/Management Information System: Interface between 1/1AESS™ Switch Central Office and Customer Premises Equipment", *Bell Communications Research*, Dec. 1986, Technical Reference TR–TSY–000306, Issue 1—(Artice).

"Comparison Of ACD Systems", *Connection*, Feb. 1990—(Chart).
"ACD Comparison", *Aspect*, Feb. 2, 1990—(Final Report).
Lanzeter, Ygal, "Automatic Number Identification System For Step–By–Step Exchanges", *The Ninth Convention of Electrical and Electronics Engineers In Israel*, Apr. 1975—(Paper).
"Bell Atlantic's Bolger Wants To Be Free", *Telephony*, Jul. 14, 1986—(Article).
"Advanced New Cable TV Technology Developed For Impulse–Pay–Per–View", Jun. 3, 1985—(Search).
Meade, Jim, Dec. 29, 1992—(Letter).
"All About Voice Response", *Datapro Research Corporation*, Delran, N.J., Mar. 1972 and Sep. 1974—(Article).
"Voice Response in Banking Applications", *Datapro Research Corporation*, Delran, N.J., Oct. 1974 and Feb. 1983—(Article).
Schiller, T.R., "Field Craft Technician Communication With A Host Computer Synthesized Voice", *Proceedings AVIOS '86 Voice I/O Systems Applications Conference*, Sep. 16–18, 1986.
Rabin, Richard, "Telephone Access Applications: The Growth Market For Voice Processing", *Proceedings AVIOS '86 Voice I/O Systems Applications Conference*, Oct. 6–8, 1987.
Schuster, E.R., "B.R.U.T.U.S. Better Registration Using Touch–Tone phones for University Students", *Proceedings AVIOS '86 Voice I/O Systems Applications Conference*, Oct. 4–6, 1988.
"Exxon's Next Prey. IBM and XEROX", *BusinessWeek*, Apr. 28, 1980, pp. 92–96 and 103—(Article).
Weinstein, S.B., "Emerging Telecommunications Needs of the Card Industry", *IEEE Communications Magazine*, Jul. 1984, vol. 22, No. 7, pp. 26–31—(Article).
"Riding Gain", *Broadcasting*, Mar. 7, 1983—(Article).
Pickup, Mike, "Bank from home, by screen or by phone", *Building Society Gazette*, Jul. 1988—Article).
Pickup, Mike, "Voice Response", *Computer Systems*, Sep. 1986—(Article).
Rabiner, L.R., et al., "Isolated and Connected Word Recognition—Theory and Selected Applications", *IEEE Transaction Communications*, May 1981, Com. 29, No. 5, pp. 621, 622, 633, 644–646 655–659—(Article).
Pagones, M.J., et al., "New services follow increased digitization on the long–haul transmission network", *AT&T Bell Laboratories Record*, 1983, vol. 61, pp. 25–33—(Article).
"New phone service tells customer who's calling", *Bell Laboratories Record*, 1984, vol. 62, p. 9—(Article).
Hirschman, C.B., et al., "LASS: Putting the telephone customer in charge", *Bell Laboratories Record*, 1985, vol. 63, pp. 10–16—(Article).
"AT&T building communications network for Defense Department" and "AT&T inaugurates pay–per–view TV", *Bell Laboratories Record*, 1986, vol. 64, p. 2—(Article).
"Representative Customer List For Interface Technology's Total Entry System", "Toes Solutions—Pharmaceutical Manufacturer", "The Voice Response Solution For Answering Customer/Sales Calls", "Toes Solutions—Orthopedic Equipment" and "Toes Solutions—Convenience Store"—(Articles).
Flanagan, J.L., et al., "Synthetic voices for computers", *IEEE Spectrum*, Oct. 1970, vol. 10, pp. 22–45—(Article).

Rabiner, L.R., et al., "Computer Synthesis of Speech by Concatenation of Formant–Coded Words", *The Bell System Technical Journal*, May/Jun. 1971, pp. 1541–1558—(Chapter from a Book).

Flanagan, J.L., et al., "Wiring Telephone Apparatus from Computer–Generated Speech", *The Bell System Technical Journal*, Feb. 1972, pp. 391–397—(Chapter from a Book).

Hornsby, Jr., Thomas G., "Voice Response Systems", *Modern Data*, Nov. 1972, pp. 46–50—(Article).

Diffie, W., et al., "New Directions in Cryptography", *IEEE Transactions On Information Theory*, Nov. 1976, vol. IT–22, No. 6, pp. 644–654—(Article).

Rosenthal, L.H., et al., "Automatic voice response: interfacing man with machine", *IEEE Spectrum*, Jul. 1974, vol. 11, No. 7—(Article).

Rosenthal, L.H., et al., "A Multiline Computer Voice Response System Utilizing ADPCM Coded Speech", *IEEE Transactions on Acoustics, Speech, and Signal Processing*, Oct. 1974, vol. ASSP–22, No. 5, pp. 339–352—(Article).

Flanagan, James L., "Computers that Talk and Listen: Man–Machine Communication by Voice", *Proceedings for the IEEE*, Apr. 1976, vol. 64, No. 4, pp. 405–415—(Article).

Maisel, Ivan, "To Put Your Baseball Savvy On The Line, Pick Up The Phone And Call", *Sports Illustrated*, Sep. 3, 1984—(Script).

Brown, Merrill, "Hollywood Saga: Who Bought J.R.?", *The Washington Post*, Final Edition, Oct. 14, 1984—(Script).

"SPECIAL–OLYMPICS; Teams with baseball trivia expert Brad Curtis", *Business Wire*, Sep. 30, 1985—(Script).

Lucas, W.A., et al., "The Spartanburg Interactive Cable Experiments In Home Education", *Rand Corp.*, U.S. Department of Commerce, National Technical Information Service, Feb. 1979—(Publication).

Gawrys, G.W., "Ushering In The Era Of ISDN", *AT&T Technology*, 1986, vol. 1, No. 1, pp. 2–9—(Article).

Cummings, J.L., et al., "AT&T Network Architecture Evolution", *AT&T Technical Journal*, May/Jun. 1987, vol. 66, Issue 3, pp. 2–12—(Article).

Yates, C.E., "Telemarketing And Technology: Perfect Business Partners", *AT&T Technology*, 1987, vol. 1, No. 3, pp. 48–55—(Article).

Herr, T.J., "ISDN Applications In Public Switched Networks", *AT&T Technology*, 1987, vol. 2, No. 3, p. 56–65—(Article).

Aldefeld, B., et al., "Automated Directory Listing Retreival System Based on Isolated Word Recognition", *Proceedings of the IEEE*, Nov. 1980, vol. 68, No. 11, pp. 1364–1379—(Article).

Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477—(Chapter from a Book).

Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592—(Chapter from a Book).

"The Voicestar Series By Periphonics", *Periphonics*, Jan. 1986—(Publication).

Schulman, Roger, "TeleLearning: The Computer Brings the Classroom Home", *Family Computing*, Sep. 1984, pp. 50–53—(Article).

"ICS launches new ?–home interactive video service package", *Cable Vision*, Sep. 3, 1984, pp. 71/73—(Article).

"The Remarketing of Prestel", *Which Computer?*, Aug. 1984, pp. 106, 107 and ?—(Article).

"Four–Line TeleClerk Calls, Answers, Stores, Surveys", *Hardcopy*, Jan. 1985, vol. 14, No. 1—(Article).

"Peripheral Speaks On Phone", *Hardcopy*, Dec. 1984—(Article).

Page from *What's new in Computing*, Apr. 1985—(Article).

Page from *Today*, A Compuserve Publication, Jun. 1985—(Article).

Page from *Computer Communications*, Feb. 1984, vol. 7, No. 1—(Article).

Gits, Victoria, "Interactive device doesn't Interrupt telephone calls", *Cable Vision*, Jun. 17, 1985, p. 20—(Article).

Cuilwik, Tony, "Reach Out & Touch The Unix System", *Unix Review*, Jun. 1985, pp. 50, 52, 53, 56—(Article).

Applebaum, Simon, "Two–way television", *Cable Vision*, Aug. 8, 1983, p. 66—(Article).

Morrill, C.S., et al., "User Input Mode and Computer–Aided Instruction", *Human Factors*, 1968, 10(3), pp. 225–232—(Chapter from a Book).

Results of Lexis Search Request for "Dial Info or Dialinfo", Date of Search Apr. 13, 1992, pp. 1–38.

Results of Lexis Search Request for "Phone Programs or International Information Network", Date of Search Apr. 15, 1992, pp. 1–35.

Van Gieson, Jr. W.D., et al., "Machine–Generated Speech For Use With Computers, and the problem of fitting a spoken word into one half second", *Computers and Automation*, Nov. 1968, pp. 31–34—(Article).

Patel, Jay, "Utility of voice response system depends on its flexibility", *Bank Systems & Equipment*, Dec. 1988, pp. 101/103—(Article).

Buron, R.H., "Generation of a 1000–Word Vocabulary for a Pulse–Excited Vocoder OPerating as an Audio Response Unit", *IEEE Transactions On Audio And Electroacoustics*, Mar. 1986, vol. AU–16, No. 1, pp. 21–25—(Article).

Gaines, B.R., et al., "Some Experience in Interactive System Development and Application", *Proceedings of the IEEE*, Jun. 1975, vol. 63, No. 6, pp. 894–911—(Article).

Dudley, Homer, "The Vocoder", Circuit Research Department, Dec. 1939, pp. 122–128—(Chapter from a Book).

"Vendor Index", *Audiotex Directory & Buyer's Guide*, Fall/Winter 1989/90, pp. 114–156.

Francas, M., et al., "Input Devices For Public Videotex Services", *Human–Computer Interaction—INTERACT '84*, 1985, pp. 171–175—(Paper).

Labrador, C., et al., "Experiments In Speech Interaction With Conventional Data Services", *Human–Computer Interaction—INTERACT '84*, 1985, pp. 225–229—(Paper).

Long, J., et al., "Transaction Processing Using Videotex or: Shopping on Prestel", *Human–Computer Interaction–INTERACT '84*, 1985, pp. 251–255—(Paper).

*Electrical Communication*, 1981, vol. 56, Nos. 1–4, pp. 1–110—(Paper).

Conway, R.W., et al., "Tele–CUPL: A Telephone Time Sharing System", *Communication of the ACM*, Sep. 1967, vol. 10, No. 9, pp. 538–542—(Article).

Marill, T., et al., "DATA–DIAL: Two–Way Communication with Computers From Ordinary Dial Telephones", *Communications of the ACM*, Oct. 1963, vol. 6, No. 10, pp. 622–624—(Article).

"Call–It–Co. Hangs Up On Dial–It Four Markets", *The 976 Exchange*, 1984, vol. 2, pp. 1–6 (Article).

"VTK 81 Voice Computer", *Voicetek*, 1987 (Brochure).

"How a Computerized "Voice" Answers Customers' Inquiries", *Bank Automation Newsletter*, Feb. 1985, vol. 19, No. 2 (Article).
Rickman, J., et al., "Speech Synthesizers—Communications Interface—Implementing A Touch Tone Telephone Talker With DECtalk", *The DEC Professional*, May 1985, pp. 38, 39, 42–44 (Article).
"Product safety", *DECWORLD*, Apr. 1985, vol. 9, No. 2, pp. 1, 3, 5, 6–8—(Article).
"DECtalk: A New Text–to–Speech Product" *Digital Guideline*, Mar. 1984, vol. 8, No. 3, pp. 1–8—(Article).
??evens, W.?., "Computer Helps Children to Add", *The New York Times*, Apr. 20, 1970.
Harvey, R.W., *Times*, The Kiplinger Magazine.
"A Computerized System???", Nov. 23, 1970, p. 14, (unidentifiable Article).
"Hardware for the 'cashless society'", *Electronic Design 3*, Feb. 4, 1971, p. 26.
Tennant, R.P., "Advanced credit system smooths operation and hastens payout", *Data Processing Magazine*, Jun. 1971, vol. 13, No. 6, pp. 34–35.
Smith, Gene, "Chatting Via Computer", *New York Times*, Sep. 12, 1971.
"Did Anybody Here Call a Computer", *Data Management*, Feb. 196?.
Skala, Martin, "Straight talk from a computer", *Christian Science Monitor*, Jun. 14, 1973.
"Computer for Watergate Probe", *Science*, Jun. 15, 1973.
"Tapping AT&T for a $50–million refund", *Business Week*, Jun. 9, 1973.
Scherer, Ron, "Chitchat with a computer", *Christian Science Monitor*, Apr. 16, 1975, p. 2.
"Trying Out the Pay–by–Phone Service", *Technology Review*, Mar./Apr. 1976, p. 15.
"Pentagon seeks more control", *Electronics*, Apr. 5, 1976, p. 39.
"Everyman's Computer Terminal", *Industrial Research*, Mar./Apr. 1976, p. 14.
"Talking computer speeds Ford parts", Apr. 25, 1976.
"Customers of Ten Banks Paying Bills by Phone", *Computer World*, 1976, p. 12.
"FAA to test computerized voice response to queries from pilots", *Electronics*, Nov. 25, 1976, p. 43.
Miller, F.W., "Voice Response Comes to Life with Order Entry", *Infosystems*, Oct. 1981, pp. 62/64.
Suppes, Patrick, "University–Level Computer–Assisted Instruction At Stanford: 1968–1980", *Institute for Mathematical Studies In The Social Sciences Stanford University*, 1981, pp. 589–716.
Lerner, E.J., "Products that talk", *IEEE spectrum* Jul. 1982, pp. 32–37.
Carlsen, Clifford, "Megaphone plans to blare message on national scale", *Times*, Mar. 2, 1987.
Michelson, Marlene, "All kinds of information at your fingertips by phone", *Business Times*, Sep. 8, 1986, vol. 3, No. 19.
Lacter, Mark, "At Megaphone, It's Always Show Time", *San Francisco Chronicle*, Jun. 9, 1986.
Lacter, Mark, "Narrating Fantasy Messages—It's No Dream Job", *San Francisco Chronicle*, Jun. 9, 1986.
"Megaphone Serves High–Tech Showbiz", *San Francisco Chronicle*, Jun. 9, 1986.
"Megaphone Reaches Unique Market", *San Francisco Chronicle*, Jun. 9, 1986, Feuer, Jack, "Asher/Gould: Megaphone Dials–a–Shop", *Adweek*, May 12, 1986.
Symanovich, Steve, "Novelty over for phone porn vendors", and continuation "Big firms breathing down necks of small phone porn outfits" *San Francisco Business Journal*, May 5, 1986.
Ketcham, D.E., "Dial–a–You–Name–It", *San Francisco Chronicle*, 1986.
Carter, Alan, "What? You didn't know Erica was engaged again?", *Daily News*, Mar. 12, 1986.
"Firm plugs into sales with time, temp lines", *Crain's New York Business*, Mar. 3, 1986, vol. 11, No. 9.
Pitts, Gail, "Phone–in–trivia games ring up profits", *The Denver Post*, Feb. 3, 1986.
Nelson, David, "From dating to soap operas, 976 numbers come on line", *San Jose Business Journal Magazine*, Jan. 27, 1986.
Greengard, Samuel, "Dial–A–Deluge", *Business*, Nov. 1985.
"Numbers, please", *Business*, Nov. 1985.
"The 976 Telelease Co.", *Business Opportunities Journal*, Dec. 1985.
"One–time refund for '976' charges", *San Francisco Examiner*, Nov. 7, 1985.
Kent, Debra, "Interactive phone network stretches for calls", *Advertising Age*, Oct. 17, 198?.
"Making Your Phone Talk To Computers", *U.S. News*, Sep. 23, 1985.
Moorhead, Derrol, "Humor, romance: just a call away", *Rocky Mountain Collegian*, Sep. 19, 1985, vol. 94, Iss. 32.
Keppel, Bruce, "Move Under Way to Curb Abuse of Popular Dial–It–Service", *Los Angeles Times*, Sep. 1, 1985.
"Dial–a–stock", *Forbes*, 1985.
Sowa, Tom, "Games people play now include phone trivia", *Spokesman–Review*, Jul. 1985.
Dougherty, P.H., "Advertising Telephone Is Growing As Medium", *The New York Times*, Jul. 17, 1985.
Larson, Judy, "976 numbers entice adults–and kids", *Fremont Argas*, Jul. 8, 1985.
Barbieri, Richard, "Prime Time for the Telephone", *Channels*, May/Jun. 1985, pp. 54–55.
"Bank Provides Financial Fuel To Fast Track Company", *The Financial Center Bank*, First Quarter 1985, vol. II, No. 1.
"Don't Phone Santa", *San Francisco Chronicle*, Letters to the Editior, Mar. 29, 1985.
Carvalho, Deborah, "Will Hillary find happiness with Bob?", *Contra Costa Times*, Mar. 15, 1985.
Murphy, Win, "Dial–a–romance", Mar. 13–19, 1985.
?, Martha, "Love, laughs, luck: Just a phone call away", *Burlington County Times*, Feb. 17, 1985.
Robinett, Stephen, "Blood From A Rock", *Venture*, Jan. 1985, pp. 38–41, 44–45.
Du Brow, Rick, "Lates hot lines for instant trivia pursuit", *Los Angeles Herald Examiner*, Dec. 6, 1984.
"Keep up with your favorite soap operas", *Contra Costa Times*, Nov. 30, 1984.
Behr, Debra, "'Victory' makes and wries its own on–the–road news", and "Whose calling? Michael fans most likely. . . ", *Los Angeles Times*, Nov. 29, 1984.
"Newcomer MEGAPHONE Has Magnanimous Goals", *The 976 Exchange*, Fall 1984, vol. 2.
"Phone Santa", *Vecaville Reporter*, Nov. 10, 1984.
"Dial 976 for Profits", *Time*, Sep. 3, 1984.

Pendleton, Mike "For A Fee Your Phone Can Inform", *Burrelle's*, Jul. 19, 1984.
"Phone numbers to get details about soaps'", *Burrelle's*, Jul. 18, 1984.
Gansberg, A.L., "976 phone prefix as new entertainment fad", *Hollywood Reporter*, Jun. 21, 1984.
Carvalho, Deborah, "Another 'GH' actor discontented with the soap", *Contra Costa Times*, May 26, 1984, p. 4.
Du Brow, Rick, "'Dial–a–soap' service offers daily TV summaries", *Los Angeles Herald Examiner*, Apr. 26, 1984.
News briefs, Feb. 1966.
Martin, J., et al., "The Computerized Society—An apprisal of the impact of computers on society over the next fifteen years", Chapter 10, pp. 211–226—(Chapter from a Book).
New products, *Datamation*, Jul. 1966, vol. 12, No. 7, pp. 7/89—(Article).
Meacham, L.A., et al., "Tone Ringing and Pushbutton Calling", *The Bell System Technical Journal*, 1958, pp. 339–360—(Book).
Suppes, Patrick, "The Uses of Computers in Education", *Scientific American*, Sep. 1966, vol. 215, No. 3, pp. —(Article).
Bruckert, E., et al., "Three–tiered software and VLSI aid developmental system to read text aloud", *Electronics*, Apr. 21, 1983, pp. 133–138 —(Article).
Hochman, David, "Implementing Automatic Number Identification", *Telecommunications*, Dec. 1978, vol. 12, No. 12—(Article).
Takahashi, T., et al., "SR–2000 Voice Processor and Its Application", *NEC Research and Development*, 1984, No. 73, pp. 98–105—(Paper).
"Concept Diagram Voicemail International System".
"Voicemail Instruction Manual", *Televoice International*, Jun. 1981, Index.
Eckhouse, John, "Voice mail spells relief for phone frustration", *San Francisco Examiner*, Feb. 7, 1982—(Article).
Meade, Jim, "Throw away those pink Call–back slips", *InterOffice*, Jan./Feb. 1984, vol. 3, No. 1—(Article).
Welsh, Jack, "Everybody's Talking About Talking Bouquets", *Design for Profit*, Spring 1986, pp. 7–10—(Article).
Robinson, G., "Touch–Tone" Teletext A Combined Teletext–Viewdata System *IEEE Transactions on Consumer Electronics*, Jul. 1979, vol. CE–25, No. 3, pp. 298–303—(Article).
Voice News, Mar. 1982.
Voice News, Jun. 1982, *William W. Creitz*.
Voice News, Oct. 1982, p. 5.
Voice News, Nov./Dec. 1983.
"Consultant Report 28?", *AIS American Bell Advanced Information Systems*, Apr. 1983, pp. 27, 118–119, 123–124—(Report).
"Machine Operation Manual", May 12, 1978, Issue 1, pp. 1–3, 9–10—(Manual).
Gutcho, Lynette, "DECtalk—A Year Later", *Speech Technology*, Aug./Sep. 1985, pp. 98–102—(Article).
Daniels, Richard, "Automating Customer Service", *Insurance Software Review*, Aug./Sep. 1989, pp. 60–62—(Article).
Golbey, S.B., "Fingertip Flight Service", Oct. 1985—(Article).
"ARO Goes Pushbutton", *Newsletter*, Nov. 1985, p. 9—(Article).
"ROLM Centralized Attendant Service", *ROLM Corporation*, 1979.

"AIS, Versatile Efficient Information Service", *Fujitsu Limited*, 1972, pp. 153–162—(Brochure).
Smith, S.L., et al., "Alphabetic Data Entry Via the Touch–Tone Pad: A Comment", *Human Factors*, 1971, 13(2), pp. 189–190—(Book).
Holtzman, Henry, "Still an Infant Technology Voice Mail", *Modern Office Technology*, Jun. 1985, pp. 78–80, 82, 84, 90—(Article).
Leander, Monica, "Voice Response—A Technology for Solving Management Problems", *Speech Technology*, Mar./Apr. 1986, pp. 50–52—(Article).
Stolker, Bud, "CompuCorder speech storage and output device, (evaluation)", *Creative Computing*, Jul. 1983, pp. 1–7.
Witten, I.H., et al., "The Telephone Enquiry Service: a man–machine system using synthetic speech", *Int. J. Man–Machine Studies*, Jul. 1977, 9, pp. 449–464—(Book).
Gould, R.L., "Fidelity's Automated Voice Response System", *Telecommunications*, Jan. 1981, pp. 27–28—(Article)
"Fidelity Automated Service Telephone", *Fidelity Group*, 4 pages—(Manual).
"Data Set 407 Interface Specification", *Manager—Data Systems & Operations*, Jun. 1975, Issue 2, pp. 1–69 plus Table of Contents—(Manual).
Fitzwilliam, J.W., et al., "Transaction Network, Telephones, and Terminals", *The Bell System Technical Journal*, Dec. 1978, vol. 57, No. 10, pp. 3325–3537—(Book).
*Inbound Outbound*, May 1988, complete issue.
General Description Installation and Operation Manual for Direct Inward Dial (DID) Trunk Interface Unit, *Exacom Telecommunication Systems*, Nov. 21, 1989, Issue 3—(Manual).
General Description Installation and Operation Manual for Answering Service Monitor System, *Concord Design Services Inc.*, Dec. 19, 1986, Issue 1—Manual.
"Voice '92 Spring Conference & Exposition", 1992, pp. 1–24—(Brochure).
"Telecom Developers '92", Jan. 1992—(Advertisement).
Newton, Henry, "The Sheer Thrill Of It All", *Teleconnect*, May 1991.
"AFIPS Conference Proceedings", 1987 National Computer Conference, Jun. 15–18, 1987, Chicago, Illinois "Dynamic Network Allocation".
"Calling your computer is as easy as calling your broker, says AT&T", *Record*, 1985.
Sullivan, Kathleen, "Paper firm relies on voice–based inventory system", *IDG Communications, Inc.*, Sep. 10, 1984—(Script).
"VoiceStor Systems Integration Guide", *Voicetek Corporation*, May 2, 1983—(Manual).
"VTK 60 Voice Computer—Technical Description", *Voicetek Corporation*, Oct. 1986—(Manual).
"Voicetek VS–50 Telephone Interface System", Apr. 25, 1984, System Integration Guide—(Manual).
"VTK81 Voice Computer—Technical Description", *Voicetek Corporation*, Oct. 1986—(Manual).
"VTK Voice System—VTK/CE Guide", *Voicetek*, Jul. 6, 1987—(Manual).
Newton, Harry, "Newton's Telecom dictionary", *Telecom Library Inc.*, 1991—(Advertisement).
"1987 Buyers Guide", *Teleconnect*, Jul. 1987, pp. 194, 197–210—(Brochure).
Guncheon, M.C., "The Incredible Dial–A–Message Directory", *Contemporary Books, Inc.*, 1985—(Directory).

"Voice Box Mainteance Manual", *Periphonics*, 1986—(Manual).

"Voicepac Maintenance Manual", *Periphonics*, 1984—(Manual).

Dyer, Ellen, "Wichita Firm Sells 25% Share", Dec. 14, 1987, and "Spectrum Carving Role In Volatile Business", Jul. 7, 1986, Search Results.

"Don't Miss The Unique Gift Idea Of The Year", *Yam Educational Software*, 1987—(Advertisement).

"Welcome to the future of advertising.", *Teleline, Inc.*, 1990—(Presentation).

"Greeting Card Project", *Teleline, Inc.*, Nov. 7, 1988—(Flow Chart).

Sharkey Betsy, "Dialing for Dollars and Data", *Adweek*, Nov. 16, 1987, pp. 6–8—(Article).

Gay, Verne, "CBS may tie rates to buying p?", 1988—(Article).

Flanagan, J.L., et al., "Synthetic Voices For Computers", *IEEE International Conference on Communications*, 1970, pp. 45–9–45–10—(Conference Record).

Rabiner, L.R., et al., "Computer Voice Response Using Low Bit Rate Synthetic Speech", *Digest IEEE 71 International Convention*, Mar. 22–25, 1971, p. 1–2, Fig. 1–2—(Paper).

"DT1000 DIGITALKER Speech Synthesis Evaluation Board", *National Semiconductor Corp.*, Oct. 1980—(Manual).

"Data Set 407C Interface Specifications Nov. 1977", *Bell System Technical Reference*, Nov. 1977, pp. 1–50—(Paper).

Broomfield, R.A., et al., "Making a data terminal out of the Touch–Tone telephone", *Electronics*, Jul. 3, 1980, pp. 124–129—(Paper).

"Industry Marketing Bulletin", *Honeywell EDP Wellesley Hills*, Aug. 9, 1967.

"Burroughs Audio Response System", Reference Information for Sales Representatives, pp. 1–6 "New Product Announcement", *Burroughs Corporation*, Feb. 5, 1968.

"Stand–Alone Lockbox Application Voice Response (Slave) Communication System Functional Specification Specification", *Cognitronics Corporation*, Feb. 19, 1982, p. 21.

Slutsker, Gary, "Relationship marketing", *Forbes*, Apr. 3, 1989—(Article).

Finnigan, P.F., "To Our Shareholders", Jun. 1985, Apr. 7, 1986, Apr. 10, 1987—(Letters).

Finnigan, P.F., "Our guest", *Radio–Schweiz AG Telekommunikation und Flugsicherung*, Jan. 1983, pp. 12–14—(Bulletin) "International Programs" (Voicemail).

Finnigan, P.F., "Voice mail", *1983 National Computer Conference*, May 16–19, 1983, Anaheim, CA, pp. 375–377 and Abstract.

"Conversations in Your Mailbox", *Software News*, Jan. 1985—(Article).

Fredric, Paul, "Voicemail Int'l Radio Page America To Offer A 'Pocket News Network'", *Communications Week*, Jul. 8, 1985—(Article).

"Corporate Performance—Companies To Watch", *Fortune*, Sep. 30, 1985—(Article).

"Dream Weaver", *Jon Lindy*, Aug. 1986, pp. 32–35, 37—(Article).

"Newsline", *Voicemail International Inc.*, Oct. 1984 and Nov. 1984, "Voiceletter No. 1", *Voicemail International, Inc.*, Dec. 1985.

"Voicemail Instruction Manual B–85", *Televoice International*, Nov. 1980—(Manual).

"Voicemail Instruction Maual C–25", *Televoice International*, Jun. 1981—(Manual).

"You Can Use Voicemail To Send And Receive Messages At Anytime Anywhere In The World", *Voicemail International, Inc.*, 1981—(Brochure).

"Welcome To Dowphone", *Dowphone*, Jan. 1986—(Manual).

"Telephone 1–800 Check–PDR", *Officers of Medical Economics Company, Inc.*, 1986—(Circulation/Brochure).

"Turn your Telephone into an efficient electronic "mailbox"", *Western Union*, Jan. 1984,—(Brochure).

"Western Union Voice Message Servies User's Guide", *Western Union*, Jul. 1984—(Brochure).

"To Better Serve Your Business, We're On Call Days, Nights and Weekends.", *Maryland Business Assistance Center*—(Brochure).

"Voice Response: Breaks Trough Call Blockage.", *Business Week*, Aug. 26, 1985—(Advertisement for Preception Technology Corporation).

"Tools for heavy hitters", *Forbes*, May 6, 1985.

"All You Need To Go Get The Stock Quotes And News You Want." *Dowphone*, 1984—(Advertisement).

Borison, V.S., "Transaction—telephone gets the fact at the point of sale", *Bell Laboratories Record*, Oct. 1975, pp. 377–383—(Acticle).

Demeautis, M., et al., "The TV 200 A Transactional Telephone", *Commutation & Transmission n 5*, 1985, pp. 71–82—(Article).

Eriksson, G., et al., "Voice and Data Workstations and Services in the ISDN", *Ericsson Review.*, May 1984, pp. 14–19—(Article).

Schrage, Michael, "A Game Von Meister in Pursuit of Profits", *Washington Post*, Sep. 23, 1985—(Article).

Svigals, J., "Low Cost Point–Of–Sale Terminal", *IBM Technical Disclosure Bulletin*, Sep. 1982, vol. 25, No. 4, p. 1835.

Turbat, A., "Telepayment And Electronic Money The Smart Card", *Commutation & Transmission n 5*, 1982, pp. 11–20—(Article).

"Voice mail", *Sound & Communications*, Apr. 1983, vol. 28, No. 12, pp. 84–85—(Article).

Aso, Satoshi, "Trends and Applications of Voice Output Devices", *2209 J.E.E. Journal of Electronic Engineering*, Feb. 1982, vol. 19, No. 182, pp. 102–107—(Article).

C.R. Newson, "Merlin Voice Mail VM600," British Telecommunications Engineering, vol. 4, Apr. 1985, pp. 32–35.

A.S. Yatagai, "Telephonic Voice Synthesis Systems," Telecommunications, Aug. 1985, pp. 56h–I, 68.

A.J. Waite, "Getting Personal With New Technologies For Telemarketers," DM News, Feb. 15, 1987 at 50.

"Shopping via a network is no longer just talk," Data Communications, Aug. 1981 at 43.

"Growth–Oriented Systems," Restaurant Technology, Nation's Restaurant News Newspaper, Jul. 1, 1985 at 51.

"Let your fingers do the tapping . . . and the computer the talking," Modern Office Tech., May 1984 at 80.

"American Software unveils systems for IBM mainframes," Computerworld, Mar. 26, 1984 at 59.

"Business Units Get Order Entry," Computerworld, Jul. 12, 1982 at 36.

Svigals, J., "Security Method For Remote Telephone Banking," IBM Technical Disclosure Bulletin, vol. 23, No. 12, May 1981, pp. 5306–5307 (pb424).

AT&T Conversant Voice Response Systems Historical Overview, Jan. 1988 (FD 023585–FD023596).

"All About Automated Attendant Systems," Datapro Research Corporation, Mar. 1987 (SM 1000682–SM 1000691).

"New Product—Dytel's Automated Switchboard Attendant," reprinted from Business Communications Review, Mar.–Apr. 1984, pp. 39–41 (SM10006976–SM1000699).

Arbogast, James G. et al., "Home Diabetes Monitoring Through Touch–Tone Computer Data Entry and Voice Synthesizer Response," Annual Symposium on Computer Applications in Medical Care 8th Care Proceedings—Eighth Annual Symposium on Computer Applications in Medical Care, 1984 (MMI 020731).

Perdue, Robert J., et al., "AT&T Voice Processing System Architectures," AT&T Technical Journal, Sep./Oct. 1990, pp. 52–60 (MMI 024142–MMI 024151).

Sable, E.G., et al., "AT&T Network Services Architecture Capabilities, Administration and Performance," AT&T Technical Papers, International Switching Symposium–ISS '87, AT&T Network Systems, Mar. 15, 1987.

"The Stored Program Controlled Network" The Bell System Technical Journal, Sep. 1982.

The World's Telephones, a Statistical Compilation as of Jan. 1980, AT&T Long Lines, 1981 (Book).

Engineering and Operations in the Bell System, AT&T Bell Laboratories, 1983 (Book).

Joel, A.E., "A History of Engineering and Science in the Bell System, Switching Technology (1925–1975)," Bell Telephone Laboratories, 1992 (Book).

"ISDN—Proceedings of the conference held in San Francisco, Nov. 1986," OnLine, New York: London.

Raack, G.A., et al., "Customer Control of Network Services," IEEE Communications Magazine, Oct. 1984 (A21717089) also ISS 84, Florence Italy, May 1984.

Soderberg, J.H., "Machines at your Fingertips," Bell Laboratories Record, Jul. 1969 (A21717175).

Gawrys, G.W. et al., "A New Protocol for Call Handling Functions for the SPC Network," Globecrom '82 Conference Record, Nov./Dec. 1982.

Buss, C.M., "Tuning the Human/Machine Interface for AT&T Advanced 800 Service," IEEE, Jul. 1985.

Asmuth, R.L., et al., "Transaction Capabilities for Network Services," Globecom '85 IEEE Global Telecommunications Conference, New Orleans, Dec. 1985.

Mahood, Gerald K., "Human Factors in Touch–Tone Data Systems," Bell Laboratories Record, Dec. 1971 (A21717170).

"4 ESS System Evolution," Bell System Technical Journal, Aug. 1981.

Basinger, R. G., et al., "Calling Card Service—Overall Description and Operational Characteristics", The Bell System Technical Journal, Sep. 1982.

Confalone, D. E., et al, "Calling Card Service—TSPS Hardware, Software, and Signaling Implementation", The Bell System Technical Journal, Sep. 1982.

Eigen, D.J., et al., "Calling Card Service—Human Factors Studies", The Bell Technical Journal, Sep. 1982.

Lexis Search, Nov. 1, 1984, re: System 85 Computer Process.

Lexis Search, Jan. 28, 1985, re: Rolm Releases Four–Channel Phonemail Voice Message Unit.

A Page (p. 4) from an annual report dated Mar. 1, 1989, though the actual date on which the report was distributed to the public is unknown.

An early brochure based on a Mar. 1989, survey by Charles Schwab & Co., Inc.

A trademark scan (U.S. Federal) indicating a first date of use for Telebroker in Jun. 18, 1988.

Bulfer, Andrew F., "AT&T's Pay–Per–View Television Trial", published in AT&T Technical Journal, May/Jun. 1987.

Friends, A., et al., "ISDN opportunities for large business—800 service customers," IEEE International Conference on Communications '86, Jun. 22–25, 19086, vol. 1, pp. 28–32.

Allyn, Mark R. et al., "Planning for people: Human factors in the design of a new service," Bell Laboratories Record, May 1980, pp. 155–161.

Hanson, Bruce L., et al., "No. 1A VSS New custom calling services," Bell Laboratories Record, Jun. 1980, pp. 174–180.

Aarons, D., "The Voice of the 80's," PC Magazine, vol. 4, No. 5, Mar. 5, 1985, p. 114.

"ACD 'Magic' from AT&T's Merlin," Telecommunications Product Review, vol. 13, No. 4, Apr. 1986.

"Actor Promotes Phone Services," Hammond Louisiana Star, Aug. 23, 1984.

Allerbeck, M., "Experience with the Voice Mail System EMS 2000 Info—Results of an Acceptance Study," ISS '84 Florence, May 1984, Session 14 A, Paper 6, p. 1.

Allyn, Mark R., et al., "Human Factors in the Design of a New Service," Bell Laboratories Record, vol. 58, No. 8, May 1980.

Amano, Fumio, et al., "Imagephonell: Integrated Voice/Data Terminal With Hand–Drawing Man–Machine Interface," IEEE, 1985.

Ambrosio, Johanna, "Electronic and Voice Mail; They're No Match for Each Other–Yet," Computerworld, May 19, 1986, p. 53.

"American–Network: Files Complaint Against Pacific Northwest Bell," Business Wire, Jun. 4, 1986.

"American–Network: Signs Letter of Intent to Merge L D Communications Long Distance Service into the Company," Business Wire, Aug. 14, 1984.

Andrews, Edmund L., "Patents: Computer System Lets TV Audience Join Show," The New York Times, Dec. 24, 1988.

Arnst, Catherine, Press Release, Reuters, Sep. 16, 1984.

"AT&T Announces Major Additions to Telemarketing Products and Services," Telephone News, Dec. 14, 1987.

"AT&T; AT&T Announces New Software Enhancements," Business Wire, Feb. 10, 1987.

"AT&T Announces New Software Enhancements for its PBX," PR Newswire, Feb. 10, 1987.

"AT&T Computer System will be Produced Here," The Columbus Dispatch, Sep. 9, 1985.

"AT&T Inaugurates Pay–Per–View TV," Bell Laboratories Record, Jan. 1986.

"AT&T's Digital Merlin," Telecommunications Product Review, vol. 13, No. 7, Jul. 1987.

"AT&T's Flagship System 75: A Comprehensive Analysis of the System 85's 'Little Cousin,'" Telecommunications Product Review, vol. 11, No. 7, Jul. 1984.

"AT&T Forms Unit to Sell Synthetic Speech Systems," Wall Street Journal, Sep. 10, 1985.

"AT&T Plans Computer Unit," The New York Times, Sep. 10, 1985.

"AT&T; Showtime's Viewer's Choice, Viacom Cable and AT&T to Test Pay–Per–View Ordering System," Business Wire, Dec. 5, 1985.

"AT&T Sports Service," PR Newswire, Sep. 24, 1980.

"The AT&T System 25," Telecommunications Product Review, vol. 13, No, 8, Aug. 1986.
Press Release, PR Newswire, Nov. 1, 1984.
AT&T Technical Journal—The 5ESS Switching System, vol. 64, No. 6, Part 2, Jul.–Aug. 1985.
Excerpt from AT&T Technical Journal, Sep.–Oct. 1990, pp. 53–60.
"Automated Switchboard Attendant Helps Insurance Company Control Net Expenses," Communications News, Jul. 1985.
Aversano, Nina, "The Telephone as Computer," Review of Business, Fall 1989, p. 5.
Ayres, Paul, "Voice Response Pay–By–Phone Matures," Computerworld, Nov. 9, 1979, p. 47.
Baker, Janet M., "Voice–Store–And–Forward: The Voice Message Medium," Speech Technology, Aug.–Sep. 1984.
Bakke, Bruce B., "Electronic Voice Mailbox: Potential for Fast Growth," BC Cycle, Jun. 29, 1984.
Bakke, Bruce, B., "GTE's 'Voice Mailboxes' Page the World," U.P.I., Apr. 11, 1983.
Barbetta, Frank, "AT&T Offers Digital PBX Enhancements," Electronic News, vol. 30,, Nov. 5, 1984, p. 69.
Barkauskas, B. J., et al., "Network Services Complex: A Generalized Customer Interface to the Telephone Network," IEEE International Conference on Communications, Conference Record, vol. 2, Jun. 1983, p. 805.
Barlin, David, "Switch–Hitter: A Data Man's Guide to the World of Voice," Data Communications, Oct. 1984, p. 114.
Basso, Richard J., et al., "Expanding the Capabilities of the ? Traffic Service Position System," Bell Laboratories Record, Feb. 1983, pp. 22–27.
Belcher, Jerry, "Earthquakes in Mexico; U. S. Relief Includes Hardware, Experts; Cash Aid Suggested," Los Angeles Times, Sep. 22, 1985.
Bell Laboratories Record, Aug. 1984, Cover Page and Table of Contents.
The Bell System Technical Journal, May–Jun. 1982.
Excerpt from The Bell System Technical Journal, Oct. 1980, pp. 1384–1395.
Bertoglio, O., et al., "An Interactive Procedure for Voice Messaging Services in a Traditional Network," CSELT Technical Reports, vol. 12, Supplement 10, No. 3, Jun. 1984.
Bingham, Sanford, "Groceries By Phone," Inbound/Outbound, Aug. 1988.
"Some Tips on Integration," Inbound/Outbound, Aug. 1988.
Black, Philip, "How ISDN Services Could Make or Break the Big Network," Data Communications, Jun. 1984, p. 247.
"'Blast' from Data Systems Runs Under DG's AOS/VS," Computerworld, May 3, 1982, p. 38.
Booker, Ellis, "How to Save Big Bucks on Phone Calls," Computer Decisions, vol. 16, Nov. 15, 1984, p. 16.
Borchering, J. W., et al., "Customized Switching Systems," ISS '84 Florence, May 1984, Session 14 A, Paper 4, pp. 1–5.
Bowling, Tom, "Pay TV: A Pay–Per–Minute System Prototype," Television: Journal of the Royal Television Society, Mar.–Apr. 1984, pp. 79–83.
Brooke, Jill, "A Hi–Tech Interactive TV Service is Planned," New York Post, Jan. 20, 1989.
Brown, Jim, "Contracts; Rolm Wins College Bid," Network World, Mar. 9, 1987, p. 4.
Brown, Jim, et al., "ICA Preview; AT&T May Steal Show," Network World, May 26, 1986, p. 1.
Brown, Jim, "PBX Market; Rolm Beefs up CBX Line Capacity," Network World, Feb. 9, 1987, p. 4.
Brown, Jim, "VMX 5000 Series; Voice Messager Debuts," Network World, Oct. 13, 1986, p. 6.
Brown, Jim, "Voice Mail; Rolm to Accounce New Low–Cost Phonemail," Network World, Feb. 2, 1987.
Buckhout, Wayne, "Columbus–Born AT&T Computer Listens, Talks and Shows Promise," Article Source Unknown, Sep. 10, 1985.
Bulfer, Andrew F., et al., "A Trial of a National Pay–Per–View Ordering and Billing System," NCTA, 1986.
Burstyn, H. Paris, "Phone Features: The Next Wave," High Technology, Jun. 1986.
Capital Cities/ABC Video Enterprises, Inc. Teams with FDR Interactive Technologies to Explore Applications for New Telephone Technology, Capital Cities/ABC, Inc. Broadcast Group, Jan. 19, 1989.
Carlson, Rolf, et al., "Text–To–Speech conversion in Telecommunications," Proceedings of the Tenth International Symposium on Human Factors in Telecommunications, Jun. 1983, pp. 239–245.
Press Release, PR Newswire, Dec. 5, 1985.
Charlish, Geoffrey, "Telephone Message that Failed to Get Across to the U. K.," Financial Times, Jan. 16, 1986.
Collins, Francis R., "Reality of Equal Access: Implementation Problems," Telephone Engineer & Management, vol. 88, Sep. 1, 1984, p. 128.
"Company News: Phone Service to be Tested," The New York Times, Jan. 20, 1989.
"Components," Electronic News, 1984.
Connolly, James, "Republican Convention Set to Test Telecommunications," Computerworld, Jul. 9, 1984, p. 17.
"Corporate Preoccupation with Costs Spurs Telephone Management Sales," Computerworld Focus, May 14, 1986, p. 13.
Cox, John D., "Talk Into Telephone, Command a Computer," The Sacramento Bee, Sep. 10, 2985.
"CPU, PBX Vendors Drawing Alliances," Computerworld, Apr. 23, 1984, p. 15.
Crawford, K. E., et al., "4A Toll Crossbar Application," The Bell System Technical Journal, vol. 57, No. 2, Feb. 1978, pp. 283–323.
Croxall, L. M., et al., "Operational Experience with the 5ESS™ Switch," ISS Florence, Session 42 A, Paper 4, May 1984.
Cummings, Steve, "Voice–Mail Systems Attract Tentative Interest," PC Week, vol. 3, No. 49, Dec. 9, 1986, p. 140.
Curtis, Janice, "At a Turning Point, VMX Makes Moves to Boost Voice Messaging Business," Dallas Business Courier, vol. 2, No. 13, Section 1, Jul. 14, 1986, p. 19.
Daniel, Heidi C., "Inventor Battles Computer Giants," South Florida Business Journal, Aug. 12, 1985.
Press Release, Communications Daily, vol. 4, No. 177, Sep. 11, 1984, p. 7.
Danner, Patrick, "Dial Info Charges Electronics Giant Disconnected Deal," San Francisco Business Times, vol. 2, No. 33, Apr. 18, 1988.
Excerpt from Data Communications, Sep. 1985, pp. 399–410.
"Definity Announcement Includes Other New Products," Telecommunications Product Review, vol. 16, No. 3, Mar. 1989.
DeLessio, N. X., et al., "An Integrated Operator Services Capability for the 5ESS System," ISS '84 Florence, May 1984, Session 22 C, Paper 3, p. 1–5.

Desmond, Paul, "Patented Call–Routing Tool Boon for Retail Industry; Instalink Will Use ISDN for Automatic Number ID," Network World, Aug. 1, 1988.
"Dial–A–Drill," The New York Times, Jan. 20, 1969.
"Dialing for Pennies," California Living Magazine, Aug. 12, 1984.
"Distributed Data Processing and Messaging Systems," Data Communications, May 1986, p. 105.
Dix, John, "AT&T Breathes New Life into its Switch–and–Wire Beast," Network World, Oct. 27, 1986, p. 1.
Dix, John, "AT&T Tries Difference Tack," Computerworld, Nov. 25, 1985, p. 19.
Dix, John, "AT&T Unleashes 'Gazelle,'" Computerworld, Apr. 30, 1984, p. 2.
Dix, John, "Enhancements Out for AT&T's High–End PBX," Computerworld, Nov. 12, 1984, p. 99.
Brown, Jim, "VMX 5000 Series: Voice Messager Debuts," Network World, Oct. 13, 1986, p. 6.
Dix, John, "Ford Motor Co.; Driving Down Costs with Voice Mailboxes," Network World, Jul. 14, 1986, p. 32.
Dix, John, "Hello, This is a Voice Mail Recording.," Network World, Jul. 14, 1986, p. 1.
Dix, John, "Rolm; Long–Awaited Redwood to Debut at ICA Today," Network World, Jun. 2, 1986, p. 4.
Dix, John, "Switch Management: DEC Tools Debut at ICA," Network World, Jun. 9, 1986, p. 8.
Dix, John, "Unified Messaging; AT&T Reveals New Message Blueprint," Network World, Sep. 22, 1986, p. 1.
Dix, John, "Voice/Data PBXs: More than Today's Users Need?," Computerworld, Apr. 23, 1984, p. 14.
"Dollars from Dialing," Fortune, Mar. 16, 1987, p. 10.
Dorros, Irwin, "Evolving Capabilities of the Public Switched Telecommunications Network," Business Communications Review, Jan.–Feb. 1981.
Dowd, Ann Reilly, et al., "Dollars from Dialing," Fortune, Mar. 16, 1987, p. 10.
Drinkwater, Larry, "Voice Processing: An Emerging Computer ? Technology," Speech Technology, Aug.–Sep. 1984, pp. 50–54.
Edwards, M., "Digital PBXs Zero in on the Key Role as Hub of Office," Communications News, vol. 21, No. 12, Dec. 1984, p. 44.
Egly, Diana G., et al., "Mnemonic Aids for Telephone–Based Interfaces," Proceedings of the Eleventh International Symposium on Human Factors in Telecommunications, Sep. 1985.
Eichenwald, Kurt, "Just a Phone Call Away: More Dial–It Services," The New York Times, Apr. 16, 1988.
Excerpt from Electrical Communication Facilities (in Japanese), vol. 33, No. 9, 1981.
"Electronic Switching: Digital Central Office Systems of the World," Edited by Amos E. Joel, Jr., IEEE Press, 1982.
"Electronic Voice Mail Revolutionizing Communications," Tulsa Business Chronicle, vol. 5, No. 26, Jun. 30, 1986.
Press Release, PR Newswire, Mar. 20, 1984.
Elliot, Thomas R., "A Voice in the Wilderness," Computerworld, Jun. 13, 1984, p. 76.
Emerson, Jim, "Catalog Business," DM News, Dec. 15, 1985.
Emerson, Jim, "Eliminating Live Operators," DM News, Dec. 15, 1985.
Engelbardt, Robert M., "Island Paradise Gets System Update," Telephone Engineer & Management, vol. 88, Sep. 15, 1984, p. 104.

Exacom Model AM–200 Answering Service Monitor System, General Description Installation and Operation Manual, Issue 1, Dec. 19, 1986.
Fantel, Hans, "Video: Movies Hot Off the Tube," The New York Times, Mar. 29, 1987.
"The Father of Voice Messaging," Network World, Nov. 1984, p. 57.
Feldman, Robert, "New AT&T Packages Designed to Spuce up Systems 75/85," MIS Week, Jun. 2, 1986, p. 30.
"Firm Created After Patent Suit Against First Data," Reuters, Oct. 17, 1994.
Fischell, David R., et al., "Interactive Voice Technology Applications," AT&T Technical Journal, Sep.–Oct. 1990.
Foster, Robin Harris, "In the Forefront with Integrated Call Centers," AT&T Technology, vol. 7, No. 4, 1992.
Froehlich, F. E., et al., "The Switched Network Transaction Telephone System," The Bell System Technical Journal, vol. 57, No. 10, Dec. 1978, pp. 3475–3485.
Froehlich, Leopold, "Are Smart Buildings a Dumb Idea? If They're Going to Prosper, Shared Service Providers Will Have to Move from Telephony into Office Automation," Datamation, vol. 31, Oct. 1, 1985, p. 101.
Gates, G. W., et al., "Software," The Bell System Technical Journal, vol. 61, No. 5, May–Jun. 1985, pp. 863–883.
Gawron, L. J., et al., "Scanned–Image Technologies Bring New Ways to Conduct Business," AT&T Technology, vol. 6, No. 4, 1991.
Gawronski, Jane Donnelly, et al., "Audio Response System to Practice Mental Computation Skills," Proceedings of the Digital Equipment Computer Users Society, vol. 1, No. 2, Fall 1974, pp. 633–636.
Gawrys, G. W., "ISDN: Integrated Network/Premises Solutions for Customer Needs," IEEE, 1986, pp. 1.1.1–1.1.5.
Gaylord, D. M., "Better Health for Hospitals with Dimension 2000 PBX," Bell Laboratories Record, Jul.–Aug. 1981, pp. 170–173.
Gibson, Stanley, "Audix Upgrades Include Messaging, Billing, Management," Computerworld, Dec. 15, 1986, p. 29.
Gibson, Stanley, "Octel Links Voice Mail System to Rolm PBX," Computerworld, Dec. 8, 1986, p. 42.
Gillon, A. C., et al., "Voice Power Gives You Voice Messaging—And Then Some," AT&T Technology, vol. 4, No. 2, 1989.
Gitten, L. J., et al., "5ESS System Evolution," ISS Florence, Session 41 A, Paper 1, May 1984.
Goecke, D., et al., "A Software Engineering Approach Applied to the Complete Design and Production Process of Large Communication Systems Software," ISS '84 Florence, Session 13 C, Paper 1, May 1984.
Goldstein, Mark L., "Send A Message. Now! New Digital Networks Can Give Companies a Competitive Edge," Industry Week, Jul. 21, 1986, p. 43.
"Gotcha!," Edited by John A. Conway, Forbes, Mar. 10, 1986, p. 9.
Gottlieb, Dan, "Does the Bell Toll for Voice/Data Independents?," Purchasing, Dec. 13, 1984, pp. 103–108.
Grau, Jeff, "IBM Hints at Entering Voice Response Market in 1992," Article Source Unknown, Dec. 11, 1990.
Greene, James E., et al., "Voice Response System Sticks to the Script and Saves Time, Money and Tempers for University Students and Administrators," Communication Age, Jan. 1986.

Grumhaus, Audrey, "What's New in Telephone Service: Some Bad News for Nuisance Callers," The New York Times, Nov. 16, 1986.
Grunbaum, Rami, "Genesis Electronics Heeds the Voice Mail Calling," The Business Journal—Sacramento, vol. 2, No. 49, Mar. 10, 1986.
Gunderson, Gary W., "Computer Consoles; Can Your Community Save Lives when Seconds Count?," Business Wire, Feb. 11, 1987.
Hafner, Katherine, "Hello Voice Mail, Goodbye Message Slips," Business Week, Jun. 16, 1986.
Hafner, Katherine, "System 85 Targets Leading–Edge Users: NBI," Computerworld, Sep. 5, 1983, p. 53.
Hafner Katherine, "Temporary Telephones," Network World, May 2, 1984.
Hafner, Katherine, "The Venture Capital Adventure," Network World, Aug. 1, 1984.
Hamel, Bob, "Voice Messaging; VMX Gives Firms Edge," Network World, Mar. 16, 1987.
Hanson, Robert J., "The DSC–2000 VoiceServer System," Speech Technology, Aug.–Sep. 1984, pp. 55–65.
Herits, E., et al., "A New Look for the White Pages," Bell Laboratories Record, Jun. 1980.
Hardy, James O., et al., "Handling Coin Toll Calls—Automatically," Bell Laboratories Record, Sep. 1980, pp. 256–262.
Harrar, George, "Interview: Ed Landry; Making Office Connections at John Hancock," Computerworld, Apr. 14, 1986, p. 63.
Hasui, Kouya, et al., "Man–Machine Interfaces in Office Communication Systems," IEEE Communications Magazine, vol. 24, No. 7, Jul. 1986, pp. 18–23.
Coover, Edwin R., "Voice–Data Integration in the Office: A PBX Approach," IEEE Communications Magazine, vol. 24, No. 7, Jul. 1986, pp. 24–29.
Haszto, E. D., et al., "Alliance Teleconferencing Services Boost Business Efficiency," AT&T Technology, vol. 3, No. 1, 1988.
Heberle, W., "Accumulation of the Signals when Using the Pushbutton Telephone for Data Entry," Proceedings of the 5$^{th}$ International Symposium on Human Factors in Telecommunications, Sep. 1970.
Heffron, W. G., et al., "Transaction Network Service," The Bell System Technical Journal, vol. 57, No. 10, Dec. 1978, pp. 3331–3347.
Henricks, Mark, "DSC Makes Japanese Connection," Dallas–Fort Worth Business Journal, vol. 9, No. 30, Mar. 17, 1986.
Hillhouse, Joseph, "PABX, the Hub: Keeping Communications on Track," Computer Decisions, vol. 16, Nov. 15, 1984, p. 84.
Hindlin, Eric, "PBXs Becoming Practical Alternative to LANs," PC Week, vol. 4, Mar. 17, 1987, p. C16.
Hird, E.V., "Party Line Cost Cutters," Telephone Engineer & Management, vol. 90, May 1, 1986, p. 51.
Hollitz, John, "Giving Information without Human Intervention," The Business Journal—Sacramento, vol. 3, No. 26, Section 1, Sep. 29, 1986, p. 25.
"Home Shopping Network Halts Talks," The Washington Post, Feb. 19, 1987.
"The Horizon Call Management System Tackles High Call Volume Demands," Telecommunications Product Review, Jan. 1983.
Horton, L. A., et al., "AT&T Systems Link the University of Maryland," AT&T Technology, vol. 7, No. 2, 1992.
Horwitt, Elisabeth, "AT&T Enhancements Fill Gaps in System 75 Digital PBX," Computerworld, Jun. 16, 1986.
Horwitt, Elisabeth, "Rolm to Unveil Low–End PBX: Digital System Bucks Feature–Rich Trend," Computerworld, Jun. 2, 1986, p. 8.
Howitt, Doran, "Boom For Voice Mail Systems," InfoWorld, Oct. 29, 1984, pp. 37–38.
Hubbard, Thomas Leo, "Richardson: High–Tech Prosperity," Dallas Magazine, vol. 66, No. 2, Feb. 1987.
Huber, K. M., et al., "Getting the Message with UMS," AT&T Technology, vol. 1, No. 1, 1986.
Swann, L., "Universal Operations Systems—Integrated Building Blocks," AT&T Technology, vol. 1, No. 1, 1986.
Hunter, John J., "Telephone Tag Alternative: Voice Messaging Unshackles Users from Traditional Telephone Limitations," Network World, Jul. 13, 1987.
Hutchins, Dexter, "The Legal Battles Over Voice Messaging," Fortune, Oct. 28, 1985 p. 104.
"IBM Gives Voice to PS/2, RS/5000 Platforms," Voice Processing Newsletter, vol. 10, No. 22, Aug. 1, 1991.
"IBM, Inventor Reach Patent Agreement," The Washington Post, Aug. 30, 1985.
"IBM Reaches Patent Agreement with Inventor," U.P.I., Aug. 29, 1985.
"IBM–Rolm Eye CBX–SNA Link," Computerworld, Jan. 5, 1987.
"ICA Slates Huge Meeting, Exhibit: Includes Program and List of Exhibitors," Telephone Engineer & Management, vol. 88, Apr. 15, 1984, p. 96.
IEEE Transactions on Consumer Electronics, vol. CE–25, No. 3, Jul. 1979.
"Index to Theses," Edited by Geoffrey M. Paterson, et al., vol. XXVI, Part 1, 1977.
"Industry Leaders License Katz Interactive Technology Patents," PR Newswire, Sep. 25, 1995.
Press Release, Communications Daily, vol. 5, No. 126, Jun. 28, 1985, p. 5.
"Inside an Internetworking Voice–Mail Processor," Data Communications, Oct. 1986, p. 158.
"Integratec's Niche is Collecting on Delinquent Bank Card Accounts," American Banker, Aug. 10, 1988, p. 22.
"Card Titan Sees Gold in Electronic Commerce," Financial Service Online, Jul. 1996, p. 8.
"International Communications Network Service Installed by Commercial cable," The Magazine of Bank Management, Jun. 1984, p. 126.
"International Information Network Acquisition," PR Newswire, Nov. 7, 1985.
"International Information Network Agreement," PR Newswire, Dec. 16, 1985.
"International Information Network Announces Agreements," PR Newswire, Feb. 12, 1986.
International Information Network Contract, Article Source Unknown, Feb. 25, 1986.
"International Information Network Earnings," PR Newswire, Dec. 9, 1985.
"International Information Sets Financing Program," PR Newswire, Oct. 22, 1985.
Press Release, Communications Daily, vol. 6, No. 41, Mar. 3, 1986, p. 11.
"Megaphone Intl Wins Calif. Lottery Contract," PR Newswire, Aug. 4, 1986.

"Introducing Voice Quote," The Washington Post, Oct. 9, 1986.

Press Release, Communications Daily, vol. 6, No. 189, Sep. 30, 1986, p. 7.

Press Release, Communications Daily, vol. 6, No. 189, Sep. 30, 1986.

Jenkins, Avery, "Iowa State Lauching Campus Wide Network," PC Week, vol. 4, Feb. 3, 1987, p. C14.

Jerman, Max, et al., "A CAI Program for the Home," Educational Technology, Dec. 1971, p. 49.

Johnson, Eric, "Analysts Say that Voice–Massage Will Talk up $1 Billion," Data Communications, Jan. 1984, p. 50.

Johnson, J.W., et al., "Integrated Digital Services on the 5ESS™ System," ISS '84 Florence, May 1984, Session 14 A, Paper 3, pp. 1–8.

Johnston, David, "'Pay Radio' Tunes in Charities, Turns off Some Consumer Groups," Los Angeles Times, Part 6, Aug. 24, 1986, p. 1.

Kaplan, Jeffrey M., "$4^{th}$ Generation Lacking," Network World, Oct. 6, 1986, p. 38.

Kaplan, Jeff, "The Uncertain Future of Centrex," Network World, Mar. 14, 1984, p. 17.

Karpinski, Richard, "IBM Offers Voice Processing Line," Telephony, Aug. 5, 1991.

Katzel, Jeanine, "Selecting and Installing a Plant System," Plant PBX Engineering, vol. 37, Mar. 3, 1983.

Kawakami, Tokuhiro, et al., "Speaker Independent Speech Recognition and Audio Response System and Facsimile Response System," NEC Technical Journal, vol. 39, No. 7, 1986, pp. 54–79.

Kelleher, Joanne, "Users; Mastering DEC," Computerworld Extra!, Sep. 24, 1986, p. 61.

Kemezis, Paul, "The Shared Tenant–Services Debacle and Lessons from it" Data Communications, Sep. 1986, p. 94.

Koike, H., et al., "An Office–Use Voice Storage System with Elaborate User's Operativity," Proceedings of the Tenth International Symposium on Human Factors in Telecommunications, Jun. 1983, pp. 197–203.

"Kokusai Voicemail to Start International Voicemail Service," COMLINE Daily News Telecommunications, Mar. 10, 1987.

Kolodziej, Stan, "Where is the Electronic Messaging Explosion?," Computer World, Oct. 16, 1985, p. 21.

Korzeniowski, Paul, "Voice Messaging; ETS Demise Hits Rolm, Octel Users," Network World, Aug. 4, 1986, p. 1.

Kylin, J. C. et al., "Benefits of Integrating Data Bases into the SPC Network," ICC '79 Conference Record, vol. 1, Jun. 1979.

Lawson, Michael, "AT&T Leaves 'Super–PBX' money on the table for Northern Telecom," Data Communications, Sep. 1987.

Lazarus, George, "Pepsi Also Won the Super Bowl," Chicago Tribune, Jan. 30, 1987.

Lee, Linda, et al., "Meridian SL Information Services," Telesis, 1985, pp. 13–19.

Leibowitz, Ed, "The Wonder Years: Intriguing ACD Trends for the 1990s," Teleconnect, vol. 8, No. 4, Apr. 1990, Apr. 1990, p. 84.

Levin, David, "Private Branch Exchanges: The Best Time to Shop Might Be Right Now," Data Communications, Aug. 1987, p. 100.

Lineback, J. Robert, "VMX Girds for a Fight in Market it Pioneered," Electronics, May 12, 1986 pp. 55–56.

Lukeson, David R., "Class: The Smart Local Telephone Network," Proceedings of the International Congress on Technology and Technology Exchange, Oct. 1984; pp. 100–103.

"The LUMA Visual Telephone," Telecommunications Product Review, vol. 13, No. 7, Jul. 1986.

Lyman, Guy C., III, "Voice Messaging Comes of Ages," Speech Technology, Aug.–Sep. 1984, pp. 45–49.

Mankin, Eric, "Playing TV Telephone: New System Opens Door for Audience Participation," Electronic Media, Apr. 24, 1989.

Marino, P. J., et al., "AT&T Communications ISDN Plans," IEEE, 1985, pp. 247–251.

"Marubeni to Install Voice–Box–Mail System," Japan Economic Journal, Mar. 13, 1984, p. 9.

Mason, G. C. W., "Use of Recorded Announcements for Guidance of Users of Telecommunications Networks," Proceedings of the Eighth International Symposium on Human Factors in Telecommunications, Sep. 1977, pp. 257–262.

Massey, David K., "Voicetek Hears Sweet Success with Market Strategy," Boston Business Journal, vol. 7, No. 21, Section 1, Jul. 20, 1987, p. 6.

"The Master of Trivia," The Sporting News, Aug. 19, 1985.

Matheson, David, "ISDN: The Technology has Discovered its Purpose," Telemarketing, May 1990.

Maxemchuk, N. F., "An Experimental Speech Storage and Editing Facility," The Bell System Technical Journal, vol. 59, No. 8, Oct. 1980.

Mearns, Allison B., et al., "Caling Card—Don't Tell It–Dial It," Bell Laboratories Record, May–Jun. 1982, pp. 117–119.

Michaelson, Marlene, "Business, Services Use 'Dial A' Formats," Contra Costa Times, Sep. 8, 1986.

Mier, Edwin E., "A Big Bonanza in Little Switches," Data Communications, Jun. 1984, p. 68.

Miles, J.B., "AT&T System Upstages its FTS Rivals at Shows; The FTS 2000 Telecommunications Contract," Government Computer News, vol. 6, No. 4, Feb. 27, 1987, p. 1.

Miles, J. B., "Bypass Starts to Soar; More Businesses are Avoiding the Public Phone Network as New Technologies Surface and Telecomm Costs Rise," Computer Desicions, vol. 17, Nov. 5, 1985, p. 82.

Miles, J. B., "Network Control Under Control; Corporations Seeking Unified Network Management Systems May Find Hope in Several New Offerings," Computer Desitions, vol. 18, Jul. 15, 1986, p. 70.

Excerpt from Modern Office Technology, Jul. 1986.

Moore, Steve, "Project Management; Anatomy of a Cutover, Part 1" Network World, Aug. 25, 1986, p. 26.

Moore, Steve, "Project Management; Anatomy of a Cutover, Part 2" Network World, Sep. 1, 1986, p. 35.

Press Release, Data Communications, Aug. 1984, p. 58.

"MTV–Networks Signs with American Express Affiliate FDR Interactive Technologies," Business Wire, Mar. 28, 1989.

"NAB in the 'Big D.,'" Broadcasting, vol. 112, Mar. 30, 1987, p. 83.

"National Railways' Seat Reservation System by Touch Tone Telephone," Electrical Communication Facilities, vol. 38, No. 339, 1975.

"Newly Formed company Assigned Several Interactive Technology Patents Following the Settlement of Multimillion Dollar Patent Lawsuit," Business Wire, Oct. 17, 1994.

"New AT&T Device Made in Columbus," Columbus Citizen Journal, Sep. 7, 1985.

"New Products Telecommunications," Sound & Communications, vol. 28, No. 12, Apr. 1983, pp. 84–85.

"New System Stem Losses from Credit Card Debt; Technology Streamlines Phone Contacts," American Banker, Aug. 10, 1988.

Newton, Harry, "AT&T Information Systems One Year Later," Office Administration and Automation, vol. 45, Jan. 1984, p. 37.

Newton, Harry, "Dumb Smart Switches," Teleconnect, May 1991, pp. 14–18.

Newton, Harry, et al., "Send Us Your Pre–1989 Brochures," Computer Telephony, Oct. 1996, pp. 16–26.

Nishikado, Iwamasa, et al., "Voice Storage System for Centralized Extension System," Review of the Electrical Communication Laboratories, vol. 32, No. 6, 1984, pp. 1010–1018.

Press Release, The American Banker, Oct. 20, 1986, p. 13.

"Northern–Telecom–2; (NT) Northern Telecom Announces Software Feature Package," Business Wire, Feb. 18, 1987.

"No. Telecom Upgrades Digital PBX," Electronic News, vol. 30, Apr. 30, 1984, p. 63.

Nowogrocki, Jim, "City, County Spend About $ 1 Million on 911," St. Louis Business Journal, vol. 6, No. 43, Section 3, Aug. 4, 1986, p. 1C.

"Office Automation Advances 'White Collar' Productivity," Dun's Business Month, vol. 126, Mar. 1986, p. 59.

The Official Proceedings of Speech Tech '85, Media Dimensions, Inc., Apr. 1985, Cover and General Information Pages.

Press Release, PR Newswire, May 9, 1986.

Paznik, Megan Jill, "Voice Mail: Pitfalls and Promises," Administrative Management, vol. 48, Mar. 1987, p. 16.

"The PBX Marketplace; Private Branch Exchanges," Administrative Management, vol. 47, Jan. 1986, p. 45.

Pelline, Jeff, "AT&T System Links Voice to Computer," San Francisco Chronicle, Sep. 10, 1985.

"Perception Technology; (PCEP) Perception Technology Announces ANI, DID Enhancements," Business Wire, Feb. 27, 1987.

Petit J. C., et al., "Galaxie: Toward Adaptive Distributed Control Systems," ISS '84 Florence, May 1984, Session 41 A, Paper 3.

Petrosky, Mary, "Interactive Speech System From AT&T's Business Unit," Infoworld, vol. 7, Issue 38, Sep. 23, 1986.

Pfister, George M., "The PBX: What Matters, What Doesn't," Datamation, vol. 30, Aug. 1, 1984, p. 121.

Plakias, Mark, "The Katz that Ate the Canary," Telemedia News and Views, vol. 2, No. 11, Nov. 1994.

Pollack, Andrew, "Audiotex: Data By Telephone," The New York Times, Jan. 5, 1984.

Portantiere, Nick, "AT&T Introduces System 25 Digital PBX," Electronic News, Jul. 7, 1986, p. 34.

USPA 5,109,404 Inventor Ronald A. Katz.

Power of Attorney for USPA 5,109,404 Inventor Ronald A. Katz.

Prell, E. M., et al., "The Changing Role of the Operator," International Switching Symposium, May 1979, pp. 697–703.

Prince, Terry, et al., "A Telephone for the 'Checkless' Society," Bell Laboratories Record, Sep. 1972, pp. 249–253.

"Profit from Impulse Pay–Per–View," Advertisement for Science Dynamics Corporation, Telephony, Jul. 14, 1986.

"Prudential Insurance Mortgage by Phone Program," PR Newswire, Feb. 19, 1986.

Pulford, Jack, "Aurora System is Built to Grow," Telephone Engineer & Management, vol. 88, Aug. 1, 1984, p. 78.

Putnam, Jane, "Winners," Contra Costa Sun, Aug. 14, 1985.

"Putting an End to Telephone Tag," ABA Banking Journal, Feb. 1987.

Raack, G. A., et al., "Customer Control of Network Features," ISS '84 Florence, May 1984, Session 14 A, Paper 2.

Raimondi, Donna, "AT&T Debuts Primary Rate for System 85," Computerworld, Feb. 23, 1987, p. 41.

Rappaport, David M., "Voice Mail: Key Tool or Costly Toy," Data Communications, Oct. 1986, p. 153.

"Redwood by Rolm," Telecommunications Products Review, vol. 13, No. 6, Jun. 1986.

Rees, Norm, "Flexible Voice Response Software Speeds Development for Resellers," Speech Technology, Mar.–Apr. 1988, pp. 46–49.

Results of Lexis Search Request for "Call Interactive," Date of search Aug. 5, 1996.

Rice,Valerie, "AT&T Enters Speech–Processing Business, Names First Customers," Investor's Daily, Sep. 10, 1985.

Riederer, S. A., "Conversant VIS Means Business," AT&T Technology, vol. 5, No. 4.

Rangnekar, S., et al., "AT&T Voice Mail Service," AT&T Technology, vol. 5, No. 4.

"Ring System; Provides District of Columbia with Automatic Number and Location Identification to Aid in Emergency Services Response," Business Wire, Aug. 7, 1986.

Press Release, PR Newswire, Mar. 3, 1986.

Rippeteau, Jane, "'Smart' Way to Get Message Across," Financial Times, Jun. 12, 1986.

Rogers, Thomas, et al., "Scouting—A Worthwhile Trivial Pursuit," The New York Times, Aug. 9, 1985.

"Rolm–Corp; Appoints Harvey and Zalisk as Vice President," Business Wire, May 21, 1986.

"Rolm–corp; Introduces Redwood for Branch Offices and Small Businesses," Business Wire, Jun. 2, 1986.

"Rolm; Links PhoneMail to IBM VM Host," Business Wire, May 5, 1986.

"Rolm Releases Four–Channel Phonemail Voice Message Unit," Computerworld, Jan. 28, 1985.

"Rolm; Rolm Announces PhoneMail Network," Business Wire, Feb. 9, 1987.

"Rolm; Rolm Awarded Major contract by Columbia University," Business Wire, Mar. 2, 1987.

"Rolm; Rolm CBX II 9000AE Offers Abundant System Power for Applications Growth," Business Wire, Feb. 3, 1987.

"Rolm; 15–Node Rolm System to be Installed at University of Rochester," Business Wire, Nov. 11, 1985.

Roman, David R., "Building Up Your Personal Computer; Part II: Data–Input Devices," Computer Decisions, vol. 16, Mar. 1984, p. 110.

Rosenbaum, Art, "This 'Maniac' Spreads His Loot Around," San Francisco Chronicle, Jul. 24, 1986.

Sanger, David E., "A Driving Force Leaves Rolm," The New York Times, Jan. 15, 1986.

Press Release, PR Newswire, Sep. 17, 1985.

Schindler, Paul E., Jr., "AT&T Talking up Conversant 1 Unit," Information Week, Sep. 16, 1985.

Schinke, David, "Speaker Independent Recognition Applied to Telephone Access to Telephone Access Information Systems," Speech–Tech '86, 1986.

Schulman, Henry, "AT&T Device: Talk to Computer By Phone," The Oakland Tribune, Sep. 10, 1985.

Schumaker, Robert M., Jr., "Phone–Based Interfaces: Research and Guidelines," Proceedings of the Human Factors Society 36$^{th}$ Annual Meeting, 1992, pp. 1051–1055.

Schwartz, P., et al., "JISTEL 500—Time Division Exchange Including Voice and Data with Voice Messaging," ISS '84 Florence, May 1984, Session 21 A, Paper 6, pp. 1–4.

Scully, Sharon, "Product News; Saturn PBX Revamped," Network World, May 19, 1986, p. 4.

Seaman, John, "Voice Mail: Is Anybody Listening?," Computer Decisions, vol. 16, May 1984, p. 174.

"Select List of Telecommunications Providers," The Magazine of Bank Management, Aug. 1986, p. 32.

Semilof, Margie, "High–End Voice/Data PBXs: Voicing Doubts about Data," Network World, Mar. 31, 1986, p. 65.

"Senate Panel Meets Today; C&P Objects to House Decision Awarding Telephone Contract to AT&T–IS," Communications Daily, vol. 5, No. 238, Dec. 10, 1985, p. 4.

Session No. 13—Contemporary Developments in Addressability and Pay–Per–View, Pay–Per–View Conference, Apr. 28, 1985, p. 21.

Sharma, Ranjana, "PBX Users Benefit from Vitality of ACD Market," Network World, Oct. 17, 1988.

Shaw, Peter, "The Need for BT's Managed Information Services," British Telecommunications Engineering, vol. 11, Apr. 1992, pp. 2–6.

Shepherd, John, et al., "Managed Recorded Information Services—An Overview," British Telecommunications Engineering, vol. 11, Apr. 1992, pp. 7–13.

Shimizu, Hiroshi, "Advanced Credit Call Service," Japan Telecommunications Review, Oct. 1986, pp. 247–250.

Press Release, PR Newswire, Dec. 5, 1985.

Siragusa, Gail, "Voice Mail Takes Off: Send and Receive Messages by Phone," Administrative Management, vol. 47, Apr. 1986, p. 43.

"Small Company Initial Public Offerings: Dec. 1983," Goldhirsch Group, Inc., Mar. 1984, p. 138.

Smith, Tom, "Production Use of ISDN Lives up to Expectations," Network World, Feb. 26, 1990.

Snow, Stephen A., "Consumers Show Strong Preference for Automated Telephone Call Processing," Business Wire, Oct. 19, 1988.

"AT&T to Offer New Service," Reuter Newswire, Nov. 21, 1988.

"Soap Opera Updates Now Available in Area," Contra Costa Times/TV, May 28, 1984, p. 4.

"Something for Everyone at NAB's Equipment Exhibition," Broadcasting, vol. 112, Mar. 23, 1987, p. 63.

Song, D, et al., "System 12 Line and Trunk Testing," ISS Florence, May 1984, Session 32 A, Paper 5, p. 1.

"Special Information Tones Provide Computer with Vital Call Data," Bell Laboratories Record, Nov. 1981.

Staehler, R. E., "Toward a More Automated Network—TSPS Enhancements Lead the Way," Telephony, Feb. 8, 1982, pp. 45–48.

Stern, Aimee, "Cable Operators Fight Back; Pay–Per–View TV," Dun's Business Month, vol. 129, Feb. 1987.

Stewart, Alan, "Signaling Changes for Interconnects; NATA 86 Trade Show," Telephone Engineer and Management, vol. 90, Dec. 15, 1986, p. 72.

Stix, Gary, "Many Bands = Light Work," Computer Decisions, vol. 17, Sep. 10, 1985, p. 92.

Press Release, Communications Daily, vol. 5, No. 148, Jul. 31, 1985, p. 7.

"International Information Network Earnings," PR Newswire, Sep. 30, 1985.

"International Information Sets Financing Program," PR Newswire, Oct. 22, 1985.

Stoffels, Bob, "REA Takes its Show on the Road: Engineering and Management Seminars," Telephone Engineer & Management, vol. 88, May 15, 1984, p. 129.

"Strike Three," Progress, Aug. 7, 1985.

Strom, David, "Telephone or MIS Managers: Who Flips the PBX Switch; Management and Use of New Communications Technology; Connectivity—Focus on LANs," PC Week, vol. 4, Feb. 17, 1987, p. C1.

Sullivan, Linda, "Ameritech Services Signs Leading National Information Provider as a Master Dealer," Business Wire, Sep. 25, 1989.

Susca, Paul, "Telemarketing Reach Out and Sell Someone," Network World, May 4, 1987.

"System 85 Voice Messaging Due in '85," Data Communications, Dec. 1984, p. 204.

Tagg, Ed, "Automating Operator–Assisted Calls Using Voice Recognition," Speech Technology, Mar.–Apr. 1988, pp. 22–25.

Takahashi, Y., "Technique to Use Chinese Letters for the On–Line System in Marketing Business," Packaging Technology, vol. 19, No. 11, 1981.

Talmadge, Candace, "MetroCal Dumps Richards for K–C," Adweek, Jan. 5, 1987.

"Tech Deals," Phillips Business Information, vol. 7, No. 120, Jun. 25, 1996.

Telecommunication Technology, vol. 4, No. 4, Apr. 1986, p. 68.

"'Teleguide' Network Gives Tourists the Answers," ComputerData, Apr. 1983.

"Telephone Service Offers the Latest News on the Soaps," Augusta, GA Chronicle–Herald, Jul. 28, 1984.

Telephony, Sep. 29, 1980.

Tetschner, Walt, "PC–Based Voice Processing Software Tools," Speech Technology, Mar.–Apr. 1988, pp. 42–45.

Tetschner, Walt, "The Voicetek VTK 90 Voice Computer," Speech Technology, Mar.–Apr. 1987, pp. 102–106.

"They've Got Your Number in AT&T's first Primary–Rate Test," Data Communications, Feb. 1988, p. 15.

"Toshiba Telecom Introduces Universal Instrumentation for Entire Line of Key and PBX Systems," Telecommunications Product Review, vol. 11, No. 2, Feb. 1984.

"Tracking the Trucks," Network World, Sep. 5, 1984, p. 55.

"Trivial Tickets," The fort Wayne Journal–Gazette, Aug. 11, 1985.

"Two Firms Introduce FMS Products," Energy User News, vol. 9, Aug. 6, 1984, p. 12.

Tyson, David O., "Voice Mail Technology Streamlines Bank Telephone Messaging Services," The American Banker, Oct. 15, 1986, p. 13.

Upton, Molly, "No Clear Winner in War of Mails," Computerworld, May 19, 1986, p. 60.

Vanandel, M. A., "While You're Away, AUDIX Will Answer," AT&T Technology, vol. 3, No. 3, 1988.

"Vendor Support Eases GOP Costs," Computerworld, Aug. 27, 1984.

"View from Silicon Valley: Silicon Valley Companies Battle for Advantage, Compatibility," Communications Daily, vol. 4, No. 90, May 8, 1984, p. 1.

Virzi, Robert A., "Skip and Scan Telephone Menus: User Performance as a Function of Experience," Proceedings of the Human Factors Society 36$^{th}$ Annual Meeting–1992, p. 211–215.

Vizcarrondo, John, et al., "HOBIS: New Designs on Hotel Billing," Bell Laboratories Record, Jan. 1980.

"VMX Announces InfoLink: New capability in Voice Messaging Arena," Business Wire, Jun. 16, 1987.

"VMX/Honneywell; (VMXI) (HON) Take Voice Messaging 'Down Under' After Signing Distribution/OEM Agreement for Australia and Pacific Basin," Business Wire, Sep. 3, 1986.

"VMX, Inc. Adds Internal Revenue Service to Voice Message (SM) Users," Southwest Newswire, Feb. 8, 1984.

"VMX, Inc. Announces Another Good Quarter," Southwest Newswire, Aug. 1, 1984.

"VMX, Inc. Announces First Quarter Results," Southwest Newswire, Oct. 18, 1985.

"VMX, Inc. Announces Landmark Approval of first Voice Message System in Japan," Southwest Newswire, Jun. 1, 1984.

"VMX; (VMXI) AT&T Tops List of Seven License Agreements Granted in Third Quarter," Business Wire, Sep. 9, 1986.

"VMX–Inc; (VMXI) Hosts First International Networking Seminar," Business Wire, Jul. 18, 1986.

"VMX, Inc. Provides First Voice Message (SM) Systems to Three Bell Operating Companies," Southwest Newswire, Dec. 11, 1984.

"VMX, Inc. Releases Audited Fiscal 1984 Financials—It was a Very Good Year," Southwest Newswire, Aug. 7, 1984.

"VMX; (VMXI) Voice Messaging Leader VMX, Inc. Launches New Generation Technology with VMX(R) 5000 Series," Business Wire, Oct. 7, 1986.

"VMX; (VMXI) Voice Messaging Patent–Holder VMX Inc. Moves into France after Signing Distribution Agreement with Jeumont–Schneider," Business Wire, Sep. 15, 1986.

"VMX; (VMXI) VMX 5000 Series Voice Messaging System Scores High Sales During First Quarter," Business Wire, Mar. 10, 1987.

Press Release, Communications Daily, vol. 4, No. 209, Oct. 26, 1984, p. 6.

Press Release, Computerworld, Oct. 7, 1985, p. 68.

Press Release, PR Newswire, Jan. 18, 1984.

Press Release, PR Newswire, Apr. 10, 1984.

Press Release, PR Newswire, Oct. 16, 1984.

Press Release, PR Newswire, Jan. 24, 1986.

Voice Mail User Instructions, Voicemail International, 1991.

"Voice Messaging Capability from VMX," The Magazine of Bank Management, Oct. 1985, p. 86.

Voice Processing International Conference Program, Jul. 1986.

Voice Processing—The New Revolution, Proceedings of the International Conference, Jul. 1986.

"Voice System Tunes up Automakers's Communications," Computerworld, Nov. 12, 1984, p. 35.

"Voice '92," Conference Information and Program, 1992.

Press Release, Communications Daily, vol. 4, No. 110, Jun. 6, 1984, p. 9.

"Votrax Announces Centrum 9000, Model 5," Source Unknown, Oct. 16, 1987.

Waite, Andrew J., "Applying IVR Systems," Inbound/Outbound, Sep. 1988, pp. 30–39.

Walker, Murt, "CCS7 Offers New Paths to Revenue Generating Services," AT&T Technology, vol. 6, No. 2, 1991, pp. 8–19.

Wallace, Bob, "All Voice Systems Are Not Alike," Network World, Sep. 14, 1987.

Wallace, Bob, "Comnet '87; AT&T Announces ISDN Interface for System 85," Feb. 16, 1987.

Walters, R. E., et al., "Voice Processing Systems in British Telecom," British Telecommunications Engineering, vol. 9, Jul. 1990, pp. 88–97.

Warner, Edward, "Bank's Speech Synthesizers Greet Financiers' Calls with Daily Balance," Computerworld, Oct. 22, 1984, p. 6.

Watt, Peggy, "Local Phone Companies Eyeing Market for Voice Mail Services," Computerworld, Mar. 24, 1986, p. 23.

Watt, Peggy, "Republicans Ready for High–Tech: GOP Convention will Feature Voice Message System," InfoWorld, Aug. 27, 1984.

Weinstein, Bob, "Stock Exchange Gets News by Phone," Inbound/Outbound, Oct. 1988. pp. 39–46.

Weinstein, Bob, "Stopping the Broker's Bottleneck," Inbound/Outbound, Nov. 1988, pp. 22–23.

West Interactive Settles with FDR: Patent Suit Settlement Could Have major Industry Impact, Enterprise Communications, Nov. 1994.

Whalen, Bernie, "Marketers Expand Applications of Dial–It 900 Technology," Marketing News, Nov. 26, 1982.

"What's An 'Automated' Attendant," Inbound/Outbound, Jul. 1989, pp. 40–42.

"Whether to Answer the Phone," The Washington Post, Dec. 7, 1986.

Whitten, W. B., "Advanced Interfaces Speed Delivery of Services," AT&T Techonologies, vol. 2, No. 3.

"Who Switches Data Along with Voice? PBX Users, Increasingly," Data Communications, Feb. 1987, p. 77.

Wilpon, Jay G. et al., "Speech Recognition: From the Laboratory to the Real World," AT&T Technical Journal, Sep.–Oct. 1990, pp. 14–24.

Wise, Deborah C. "This Computer Even Deciphers Noo Yawk Talk," Business Week, Sep. 23, 1985, pp. 40–42.

Witten, Ian H., "Making Computers Talk: An Introduction to Speech Synthesis," Prentice–Hall, 1986.

Witten, Ian H., "Principles of Computer Speech," Academic Press, 1982.

Wolfe, R. M., et al., "Telecommunications Data Base Application with the 3B™ 20 Processor," ISS '84 Florence, May 1984, Session 22 A, Paper 2.

Wollenberg, Skip, "American Express Affiliate Plans Interactive Phone Service," The Associated Press, Jan. 19, 1989.

Wood, Lamont, "Stretching the Workday; Corporate Users Find that Voice Mail Saves them Time in Transmitting Important Messages," Computer Decisions, vol. 18, Dec. 2, 1986, p. 44.

Wood, Lamont, "Will New Alliances Forge Better Links? Private Branch Exchange Vendors Merge with Computer Firms," Computer Decisions, vol. 18, Jul. 29, 1986, p. 40.

Worrall, D. P., "New Custom Calling Services," The Bell System Technical Journal, vol. 61, No. 5, May–Jun. 1982 pp. 821–839.

Youngs, E. A., "The Changing Role of Human Factors Work Supporting New Telecommunications Products and Service," Procedings of the Tenth International Symposium on Human Factors in Telecommunications, Jun. 1983.

Youngs, E. A., "Effects of Automating Operator Services on Customers and Operators," Proceedings of the Eighth International Symposium on Human Factors in Telecommunications, Sep. 1977, pp. 251–255.

"Zenith; Centel Plans Zenith Phonevision Pay–Per–View Cable TV System," Business Wire, Dec. 5, 1985.

Zuckerman, Steve, "Ogilvy & Mather/Dallas Looks for Partner to Go After Bigger Accounts," Dallas Business Courier, vol. 2, No. 21, Section 1, Sep. 8, 1986, p. 12.

Complete Issue of Bell Labs News, vol. 21, No. 40, Oct. 5, 1981.

Complete Issue of Bell Labs News, vol. 25, No. 36, Sep. 30, 1985.

Complete Issue of Bell Labs News, vol. 26, No. 31, Aug. 18, 1986.

Complete Issue of Bell Labs News, vol. 27, No. 33, Aug. 17, 1989.

Bell of Pennsylvania Press Release, Mar. 13, 1984.

Dorros, Irwin et al., "Reaching into the Future with Stored Program Control," Bell Laboratories Record, Dec. 1980, pp. 387–393.

Complete Issue of Voice News, vol. 4, No. 9, Oct. 1984.
Complete Issue of Voice News, vol. 6, No. 7, Jul./Aug. 1986.
Complete Issue of Voice News, vol. 7, No. 2, Feb. 1987.
Complete Issue of Voice News, vol. 7, No. 3, Mar. 1987.
Complete Issue of Voice News, vol. 7, No. 5, May 1987.
Complete Issue of Voice News, vol. 7, No. 10, Oct. 1987.

"Network Communication Applications and Services," AT&T Communication Consultant Liaison Program, Issue 1, Jun. 1984.

"DST DST Systems Inc. Mutual Fund System Audio Response System," DST Systems, Inc., 1985 (Manual).

"Tele–Account Voice Response System Enhancements Functional Specifications Mar. 18, 1985," Mar. 18, 1985 (Manual).

"Periphonics Project Management Review Meeting," Mar. 21, 1985 (Agenda).

Boni, D., "Call Coding Report," Apr. 11, 1985 (Memo).

Vollmer, H.D., "Periphonics Management Review," May 1, 1985 (Meeting Minutes).

"DST Conversion Flow," Apr. 12, 1985 (Chart).

"Tele–Accont Audit Report," Source Unknown, Jul. 26, 1984.

"Tele–Account Problem Report," Source Unknown, Jul. 26, 1984.

"100 Cool Call Things," Callcenter, Oct. 5, 2000.

Aisenberg, A., et al. ano., "A Distributed Control System For Public Telephones In Israel," *The 11th Convention of Electrical and Electronics Engineers In Israel*, Oct. 1979.

Aldrich, Nancy, "Choosing A Telecommunications Consultant," *Hospital Topics*, Mar./Apr. 1981, pp. 7–8.

An, Chungming, et al., "Helping The Stored Program Controlled Network Respond Quickly," *Bell Laboratories Record*, May/Jun. 1982, pp. 120–122.

Anderson, Lee, "French 'Smart Cards' Explained To Americans," *Telephony*, Apr. 19, 1982, pp. 100–101, 174.

Antelman, Leonard, "Hart Industries Files Bankruptcy," *Electronic News*, Dec. 7, 1981.

Arden, Bruce W., *What Can Be Automated?: The Computer Science And Engineering Research Study (COSERS)*, MIT Press, 1980.

Armstrong, Scott, "The 'Smart Card': Revolution In The Way You Pay Bills?," *The Christain Science Monitor*, Sep. 13, 1983.

Arnold, P.A., "Card Operated Payphones Can Simplify Service And Security," *Telephony*, Sep. 27, 1982, pp. 56–57.

"Autelca Proudly Introduces TelcaStar," (Advertisement), *Telecommunications Journal*, Sep. 1985.

Ayres, Paul, "One Bank's Approach," *Bank Administration*, Jan. 1980, vol. LVI, No. 1, pp. 30–32.

Baggott, A.J., "Token Meters," Telecommunications Journal, Apr. 1977, pp. 35–37.

Bagley, John, et al., "Impacts Of Calling Card Service (CCS) Implementation," *GTE Automatic Electric Journal*, May–Jun. 1982, pp. 99–108.

Berenyi, Ivan, "Telefax, Smart Phones Debut In Hungary, But Service Remains Limited," *Telephony*, Sep. 23, 1985, pp. 85–86.

Bertman, Lee A., "How To Make Your Communication System Less; Communication Are Integrally Related To Cost Containment, Employee Retention, And Increased Revenue," *Hospital Topics*, Jul./Aug. 1984, pp. 6–9.

Block, Victor, "FCC Rules Pay Phones Subject To Regulation," In the Nation's Capital, *Telephony*, Jun. 3, 1985, pp. 16–18.

Bowin, William F., "Understanding the Pay Station—Types Control, Terminology, Improvement (All In Simple English)," *Telephone Engineer & Management*, Jun. 15, 1972, pp. 54–60.

Brooks, A.P., "Operated Consistency Attendant: An Associative Solution To The Data Field Consistency Problem," *IBM Technical Disclosure Bulletin*, Jun. 1976, vol. 19, No. 1. pp. 222–224.

"Broward Man Charged in Phone Fraud," Nov. 24, 1981.

Caisperlein, Hermann, et ano., "Münzfunkfernsprecher Bei Der Deutschen Bundesbahn," *Die Bundesbahn*, 1980, pp. 551–554.

"Call Up The Future With The Phonocard. Pre–Paid Card Public Telephone Box.," (Advertisement), *Telecommunication Journal*, Aug. 1979.

Cane, Alan, "The 'Electronic Chequebook' Makes It Debut," *Financial Times*, Aug. 9, 1983.

Cariou, J., et ano., "The Freephone Service: A New Application For The E12 System," *Commutation and Transmission*, No. 5, 1982, pp. 63–73.

Chen, David D., et ano., "Approximating The Performance Of Two Phase Locking Using An Iteration Solution Model," *The University Of Michigan Computing Research Laboratory*, Apr. 1984.

"Coin–Operated Phones—Back to the Future," *TE&M*, Mar. 15, 1987, pp. 57–59, 61.

Crabbe, E., et al., "DMTM: A Data Management And Transmission Module," *GTE Automatic Electronic Journal*, Second Quarter 1983, pp. 51–56.

Curran, L., "Revisiting the Luddites," *Byte Publications, Inc.*, vol. 9, No. 1, Jan. 1984, p. 4.

Dickerson, Brian, "Bell Cuts WATS Service To Hart," *The Miami Herald*, 1981.

Dickerson, Brian, "Canadian Firm Could Get Hart Industries' Remaining Assets," *The Miami Herald*, Jan. 16, 1982.

Dickerson, Brian, "Credibility The First Hurdle For Discount Phone Call Firm," *The Miami Herald*, Mar. 9, 1981.

Dickerson, Brian, "FCC Delay Snarls Long–Distance Phone Plan," *The Miami Herald*, Dec. 1980.

Dickerson, Brian, "Hart Delays Long Distance Service Again," *The Miami Herald*, Jun. 3, 1981.

Dickerson, Brian, "Hart Gets Approval For Long–Distance Calls," *The Miami Herald*, Apr. 29, 1981, p. 6D.

Dickerson, Brian, "Hart Industries' Lines Still Clogged," *The Miami Herald*, Jul. 15, 1981.

"80 Years Of Public Telephones," *NTT Business*, vol. 32, No. 1, 1981, pp. 8–11.

Estes, Betty A., "Charge–A–Call Spreading Rapidly," *Telephone Engineer& Management*, Jan. 1, 1979, p. 89.

"FCC Approves World's First Smart Card Telephone," *Southwest Newswire*, Jul. 15, 1985.

"Fernsprechapparate," Einführung, *Electrisches Nachrichtenwesen*, Band 58, vol. 1, 1983 pp. 54–55, 58–59.

Finneran, Michael F., "Data Comm Focus—Packet Switching," *Business Communications Review*, Nov./Dec. 1985, pp. 35–40.

"Fire Destroys Hart Industries," *The Miami Herald*, 1981.

"For Every Telephone Call, Monoprint Records The Price, The Hour, The Date, The Length, The Number. And That's Not All . . . ," Advertisement, *Telecommunications Journal*, Dec. 1979.

"France: Poised To Deliver The Backbone For The Information Age," Special Advertising Section, *Data Communications*, Jun. 1983.

Freeman, Peter, *Software Systems Principles: A Survey*, 1975, pp. 136–137.

"French EFT Program Enters Its Final Phase," Newsfront, Dataletter, *Data Communications*, Jun. 1983.

"French Phone Booths Get Smarter", *Data Communications*, Oct. 20, 1982.

"The French 'Smart Card' Finally Arrives In The U.S.," *Data Communications*, Nov. 1984, pp. 263–265.

Fritz, Mark S., et ano., "Bloomington Hospital's Experience With Lifeline®," *Hospital Topic*, Sep./Oct. 1982, pp. 14–18.

Gechtman, V., et al., "Customer Line Usage Studies," *The 11th Convention of Electrical and Electronics Engineers In Israel*, Oct. 1979.

Grunig, R., "Halser Mailmaster F 204 Franking Machine," *Hasler Review*, vol. 11, No. 1, 1978.

Haberman, E., "Microcomputer Controlled Telephone Line Scanner," *The Tenth Convention of Electrical and Electronics Engineers In Israel*, Oct. 1977.

Haggerty, Maryann, "Firms Sell Varying Ways to Save," *The Miami News*, Aug. 8, 1981.

Haggerty, Maryann, "Talk is Cheaper Long–Distance Callers Have Alternatives To Bell," *The Miami News*, Aug. 8, 1981.

Harrop, Peter, "New Electronics For Payment," (source unknown), 1982, pp. 339–342.

"Hart Industries Settles," Jul. 28, 1981.

Harvey Dean, "This BOSS Works for Residence Customers" *Bell Laboratories Record*, Mar. 1980, pp. 81–86.

Higashiyama, Fukuo, et ano., "Credit Call Service," *Japan Telecommunications Review*, Oct. 1980, pp. 308–309.

"The History Of The Payphone," http://www.kitecom.co.uk/phone/histor1.html.

Hughes, Le A., "Busy . . . busy . . . busy . . . New Phone Service Faces First–Day Problems," *The Miami Herald*, Jul. 8, 1981.

"IC Cards Are On The Way," *TE& M*, May 15, 1987, pp. 71, 74–75.

Komatsu, Hiroyuki, "Station Message Detailed Accounting System KX–400," *IWATSU Gino*, vol. 21, No. 1, 1982.

Lannon, John F., "How To Save Money And Increase Your Telecommunications Capabilities," *Hospital Topics*, Sep./Oct. 1992, pp. 30–34.

Lawser, John J., et ano., "Realizing The Potential Of The Stored Program Controlled Network," *Bell Laboratories Record*, Mar. 1979, pp. 85–89.

Lessin, Arlen R., "Smart Card Technology and How It Can Be Used," *American Banker*, May 20, 1982.

Lipman, Andrew D., "Computer II And Coinless Pay Phones," *Telephony*, Sep. 16, 1985, pp. 53–57.

Lissandrello, George J., "Future's Bright For Smart Cards," Telephone *Engineer & Management*, Nov. 1, 1985.

Lucking, K.F.C., "Card Operated Pre–Payment Metering," Sangamo Electricity Metering, U.K., 1978.

Matsui, Hiroyuki, et al., "A Multi–Functional Telephone With Memory Cards Which Expand Talking Services," *IEEE Transactions On Consumer Electronics*, vol. 34, No. 3, Aug. 1988, pp. 749–758.

Merzer, Martin, "Cut–Rate Long Distance Calls Replace AT&T's Monopoly," *Miami Herald*, Sep. 29, 1980, Communications p. 6.

"Microprocessor–Controlled Telephone System," New Products, *Telecommunications Journal*, Mar. 1983, p. 151.

Mier, Edwin E., "Inside the Smart Card," *Data Communications*, Jun. 1982.

Mills, Mark, "Memory Cards: A New Concept In Personal Computing," *BYTE Publications, Inc.*, Jan. 1984, pp. 154–156, 159–160, 162, 164, 166, 168.

Peterson, Erlend D., "The Brigham Young University Touch–Tone Telephone Data Entry and Computer Voice Response Registration System: An Analysis of Student Acceptability," A Dissertation presented to the Department of Educational Administration Brigham Young University, Apr. 1985.

Schaffer, S., "'PCM' Switching System," *The Tenth Convention of Electrical and Electronics Engineers In Israel*, Oct. 1977.

"Smart Cards im Vormarsch: Elektronisches Geld," *Kommunikationstechnik*, Mar. 1985, pp. 39–41.

Walker Leigh, Vanya, "US Vanguard Visits France To Look At The Smart Card," *American Banker*, Aug. 11, 1982.

Webster's II New College Dictionary, Houghton Mifflin Company, 1995, pp. 401, 1134.

Yehoshua, Etkin, et. ano., "Design Principles And Implementation Of Business Communication Systems (TBA–62)," *The 11th Convention of Electrical and Electronics Engineers In Israel*, Oct. 1979.

Bonnell, Fraser, "Audio Response At Tymshare," Nov. 5, 1982.

Carroll, Bob, "Linking ACDs With Audio Response Units," *Telemarketing*, Sep. 1985, pp. 40–43.

"CLASS Feature: Calling Number Delivery," *Bell Communications Research*, Technical Reference, TR–TSY–000031, Issue 2, Jun. 1988.

Cloward, William H., "Sophisticated, High Speech Capacity Voice Response Applications For End Users," The Official Proceedings Of Speech Tech '86, Voice Input/Output Applications Show And Conference, Apr. 28–30, 1986, New York, NY, pp. 58–61.

Friedes, A., et al., "ISDN Opportunities For Large Business—800 Service Customers," IEEE International Conference on Communications '86, Toronto, Canada Jun. 22–25, 1986, pp. 28–32.

Grant, Steven C., et ano., "The Teleconnect Guide To Automatic Call Distributors," Bookcrafters, Chelsea, MI, 1985, pp. 4–16.

Hladik, William M., et al., "Mechanizing The Customer Access To Network Trouble Reporting Operations," Bell Communications Research, Inc., ISSLS 88, The International Symposium On Subscriber Loops And Services Proceedings, Boston, MA, Sep. 11–16, 1988, pp. 0262–0266.

Wang, Emil, "Intelligent Call Processing In Automatic Call Distributors," *Business Communications Review*, Jan.–Feb. 1988, pp. 22–26.

General Trading Co., Inc., VoiceStar Proposal Jan. 29, 1988 (Vz Cal 339367–339414).

Gitlin, Bob, "Impersonal Touch? Risk Management Resources' Bottom Line Outweighs Criticism of Voice Processing," Communications News, Feb. 1, 1990, vol. 27, No. 2.

Periphonics Corporation, Bank of American Versatel Home Banking System, Sep. 2, 1980 (Vz Cal 339415–339456).

Steven C. Grant and Yvonne Brooks Grant, *The Teleconnect Guide to Automatic Call Distributors*, $2^{nd}$ Ed. Jan. 1985, ("The Teleconnect Guide").

*Special Feature: The Automated Switchboard Attendant in the Telemanagement Report*, pp. 49–56, vol. 2, No. 5 (15), Jun. 1984 ("The Telemanagement Report").

Via Cable, vol. 2, No. 7 (Nov. 1982).

Via Cable, vol. 3, No. 1 (Dec./Jan. 1983).

CableData U.S. Computer System Annual Report (1982).

Letter from Douglas Semon, Director of Engineering, New Technology Development, Viacom Cable to Mr. Semir Serazi, CATV Division, Zenith Electronics Corp., dated Feb. 22, 1985.

Letter from Andrew Paff, Manager, New Business Development to Donna Brickell, Project Manager, Pacific Bell, dated May 21, 1985.

*A Trick of a National Pay–Per–view Ordering and Billing System*, published by the 1986 Convention Technical Program Committee of the National Cable Television Association (Mar. 1986).

Viacom Cable Memo dated May 30, 1986.

Customer Interface User Manual dated Oct. 18, 1986.

Viacom Memo dated Nov. 26, 1986.

The Yankee Group, "Cable and the Telcos: From Confrontation to Détente,"—Jun. 1983, pp. 162–167.

"The Voice," VCT Quarterly Newsletter, vol. 1, No. 2, Winter 1986, pp. 1–6 (Vz Cal 291279–291284).

"The Voice," VCT Quarterly Newsletter, vol. 2, No. 3, Winter 1987, pp. 1–6 (Vz Cal 291273–291278).

Reisman, Bert, "New IBM Audio Response Unit Enables Computer To Answer Information Inquiries With Voice Messages," IBM Technical Information, Jan. 24, 1964, pp. 1–3 (press release) (Vz Cal 114854–114856).

"IBM system/360 Component Description, IBM 7772 Audio Response Unit," IBM Systems Reference Library, File No. S360–09, Form A27–2711–0, 1966, pp. 5–29 (Vz Cal 92638–92669).

"The Mississauga Transit Demonstration of the Automatic Bus Passenger Information Concept," Prepared for the Urban Transportation Research Branch of Canadian Surface Transportation Administration Transport Canada, Montreal, Quebec, Mar. 1979, 10 pages (Vz Cal 114898–114906).

Oliver, G.P., "Architecture of System X, Part 3–Local Exchanges," *POEEJ*, vol. 73, Apr. 1980, pp. 27–34 (Vz Cal 92702–92709).

Letter from Murphy (ASI Teleprocessing) to Koprucu (International Tech) re ASI Teleprocessing and its SolidVoice System, May 27, 1980 (Vz Cal 134785).

Shepard, H., et al., "Functional Specification for Bank of America, EBR—Bank Card Systems, San Francisco, California, Aug. 8, 1980," Aug. 8, 1980 (Vz Cal 137696–137721).

"Calling Card Service Debuts in St. Louis, Marks a significant change in customer calling service," *Bell Labs News*, Oct. 5, 1961?, 2 pages (Vz Cal 134090–134091, and duplicate under Vz Cal 93043–93044).

"BT–II Data Entry/Voice Response Processor," PTC, Perception Technology Corporation, 6 pages (Vz Cal 133904–133909).

Special Edition: 1983 Buyer's Guide Issue, *Speech Technology*, Math/machine Voice Communications, vol. 1, No. Jan./Feb. 1983, 9 pages (introductory pages for the following articles) (Vz Cal 80988–80996).

Lea, Wayne, "Selecting the Best Speech Recognizer for the Job," *Speech Technology* Jan./Feb. 1983, pp. 10–29 (Vz Cal 80997–81016).

Voiers, William D., "Evaluating Processed Speech Using Using the Diagnostic Rhyme Test," *Speech Technology*, Jan./Feb. 1983, pp. 30–39 (Vz Cal 81017–81026).

Rubinchek, Benjamin, "Toward Standards for Speech I/O Systems," *Speech Technology*, Jan./Feb. 1983, pp. 40–42 (Vz Cal 81027–81031).

Sorace, R.E., et al., "Interactive Voice and Video Game Shows Off Speech Recognizer Advances," *Speech Technology*, Jan./Feb. 1983, pp. 45–53 (Vz Cal 81032–81041).

"Voice Leaders Speak Out," *Speech Technology*, Jan./Feb. 1983, pp. 55–69 (Vz Cal 81042–81056).

Bell, Donald, et al., "Designing Experiments to Evaluate Speech I/O Devices and Applications," *Speech Technology*, Jan./Feb. 1983, pp. 70–79 (Vz Cal 81057–81066).

Stoughton, Alan M., "Personal Computers Deliver Economical Speech Aids to the Handicapped," *Speech Technology*, Jan./Feb. 1983, pp. 80–88 (Vz Cal 81067–81075).

DeSipio, Richard G., et al., "Avionics System Plays 'Ask and Tell' with Its Operator," *Speech Technology*, Jan./Feb. 1983, pp. 89–93 (Vz Cal 81076–81080).

Baker, Janet M., et al., "Aspects of Stochastic Modeling for Speech Recognition," *Speech Technology*, Jan./Feb. 1983, pp. 94–97, 105–106 (Vz Cal 81081–81087).

Prull, Dale W., "Signal Squeezing Produces High–Quality Speech in PCM Systems," *Speech Technology*, Jan./Feb. 1983, pp. 107–115 (Vz Cal 81088–81096).

Chan, Chi Foon, et al., "A Total Approach to Speech Recognition," *Speech Technology*, Jan./Feb. 1983, pp. 116–118, 121–128, 130 (Vz Cal 81097–81109).

"What's The Best Way to Analyze Speech and Other Non–Stationary Signals?" "Digital Sound", *Speech Technology*, Jan./Feb. 1983, 2 pages (Vz Cal 81110–81111).

Datavoice Technology, Publication #3850201A, Jan. 1983, Periphonics (Vz Cal 140657–140678).

Shepard, H., et al., Functional Specification for First Hawaiian Bank, 165 South King Street, Honolulu, Hawaii 96847, Original: Sep. 26, 1980, First Revision: Sep. 13, 1982, Second Revision: Oct. 13, 1983, System No. 2010, Reference No. 12038 (Vz Cal137521–137564).

Computer System Proposal for Oceanic Cablevision, Honolulu, Hawaii, Nov. 17, 1983, by Business Systems, Inc., 2720 Wade Hampton Blvd., Greenville, S.C. 29615 (Vz Cal 92432–92436).

Touch Tone Data Entry/Voice Response Systems, The Perception Technology Corporation Marketing Agreement (Advance Copy), Prepared by: AT&T Information Systems, W. Gourtey, R. Fortin, J. Maynes, May 1984 (Vz Cal 79189–79238).
Special Feature, The Automated Switchboard Attendant, *The Telemanagement Report*, vol. 2, No. 5 (15)—Jun. 1984, pp. 50–56 (Vz Cal 114914–114921).
Uenohara, Michiyuki, "Speech Products and Their Applications in Japan," NEC Corporation, *Speech Tech '85*, pp. 273–276 (Vz Cal 92690–92693).
"The Automated Switchboard Attendant gives you . . . ", Dytel, 4 pages (handwritten date: Jun. 1986) (Vz Cal 85945–85948).
Kirvan, Paul F., "Centrax Positions Itself for Your Future," *Business Communications Review*, Jul.–Aug. 1985, vol. 15, No. 4, pp. 2–6 (Vz Cal87688–87694).
Hills, Michael T., "Does Equal Access Have a Place in Automatic Route Selection Patterns?" *Business Communications Review*, Jul.–Aug. 1985, vol. 15, No. 4, pp. 20–25 (Vz Cal 87695–87700).
McQuillan, John, "Office Automation Strategies," *Business Communications Review*, Jul.–Aug. 1985, vol. 15, No. 4, pp. 38–39 (Vz Cal 87701–87702).
AT&T Speech Response Service Product Description, (Advance Copy) Jul. 22, 1985 (Vz Cal 135020–135033).
Bank–By–Phone, Your most convenient way to bank and pay your bills, California First Bank, Form 2850–D, Rev. 9/85 (Vz Cal 92374–92386).
Kauffman, Marc, "Pay–per–view technologies: Real–time vs. store and forward," *Communications Technology*, Oct. 1985, pp. 36, 48, 50–52 (Vz Cal 92310–92314).
Ferber, Leon, "Voice response IPPV," *Communications Engineering & Design/The Magazine of*, Oct. 1985, 3 pages (Vz Cal 92729–92732).
Wienski, Robert M., et al., "Getting Ready for ISDN," *Business Communications Review*, Nov.–Dec. 1985, pp. 2–6 (Vz Cal 87731–87736).
Speech Response Service, Automated Course Registration for College Administrators, AT&T, 1986, 4 pages (Vz Cal 92352–92355), and duplicate under Vz Cal 134803–134806).
Toth, Victor J., "Washington Perspective, Computer III—The Challenge That could Be the FCC's Undoing," *Business Communications Review*, Jan.–Feb. 1986, pp. 25–30 (Vz Cal 140145–140150).
Toth, Victor, "Telecom Legislation: The Time Is Almost Ripe But this Time Let's Do It Right," *Business Communications Review*, Mar.–Apr. 1986, pp. 8–12 (Vz Cal 89987–89994).
Speech Response Servcie Marketing Guide, Prepared by: AT&T Information Systems, Speech Response Service Product Marketing, Apr. 1986 (Vz Cal 135971–136002).
Letter from Pollpeter (Rockwell International) to Scally (Perception Technology Corporation) re Rockwell's interest in offering an Audio Response Unit as part of the Galaxy ACD (Automatic Call Distributor) Product Line, May 27, 1986, 1 page (Vz Cal 93068).
Draft Baybanks Systems, Inc. Telephone Banking Requirements Report, Project No. 1816, Prepared by: Becca Ellis, Carol Bubilis, Larry Mariasis, Nov. 7, 1986, pp. 1–37, Exhibit A and Exhibit B (Vz Cal 137618–137655).
Voice News, vol. 7, No. 1, Jan. 1987, pp. 1–8 (Vz Cal 79725–79732).
Letter from Brown (CECORP) to Ferber (NUSC/CU) re request for information on CEVOICE (along with CEVOICE Demo Instructions), Apr. 29, 1987, 5 pages total including letter (Vz Cal 92408–92412).
The Aspect CallCenter, *Business Communications Review*, vol. 17, No. 3, May–Jun. 1987, pp. 43–45 (Vz Cal 90444–90472).
Letter from Glenn Appleyard (Phone Programs Inc.) to Scally (Perception Technology Corp.) re Request for Information for equipment to be used by Phone Programs Illinois, Inc. (1 page), Jul. 9, 1987 (Vz Cal 92389).
The Complete Guide to the "Dial–It" Business, by InfoText Magazine, 1988, pp. 1–81 (Vz Cal 92202–92288).
Gordon, James R., "PBX Vendors Jockey for Position," *Business Communications Review*, vol. 18, No. 1, Jan.–Feb. 1988, pp. 7–10 (Vz Cal 90163–90168).
Wallace, Bob, "Amex details experience with ISDN at user meeting; First PRI user cites better productivity, service" *Network World, Inc.*, Oct. 3, 1988, 3 pages (Vz Cal 89844–89846).
Sharma, Ranjana, "On the ACD cutting edge," *Network World, Inc.*, Oct. 17, 1988, 2 pages (Vz Cal 89842–89843).
"Phone–Based System Reduces Registration Frustration and Costs," T.H.E. (Technological Horizons in Education) Journal, Dec./Jan. 1988/1989, 1 page + cover (Vz Cal 92970–92971).
Toader, Adrian, "'900': Image the opportunities," *Voice Processing Magazine*, $3^{rd}$ quarter 1989, 1 page (Vz Cal 92413).
"A Load of Technology and Know–How," *Inbound/Outbound Magazine*, Oct. 1989, 4 pages (Vz Cal 92414–92417).
"Data Entry/Voice Response, Today's simplest, most cost–effective approach to data entry and retrieval," by Perception Technology, 8 pages, May 1985 (Vz cal 92344–92351).
Urix Corporation Product Data, 5 pages, 1984 (Vz Cal 134815–134819).
Field, Rebecca R., "SMDR—Designing A Resource Management Tool," *Business Communications Review*, Jan.–Feb. 1985, pp. 19–27 (Vz Cal 87590–87598).
"Voice response systems offer many benefits," *Telecommunication Technology*, vol. 4, No. 4, Apr. 1986, 4 pages (Vz Cal 79092–79095).
Addendum for Colombia: The ANI Feature, Oct. 1986, pp. 1–11 (Vz Cal 96113–96123).
"Getting the Vendor's Attention", "Northern Announces ISDN for SL–1s and SL–100S", "Who Will Play in AT&Ts UNMA Game?" *Business Communications Review*, Nov.–Dec. 1987, 2 pages (Vz Cal 90550–90551).
"Lo–Ad Comunications, Preliminary Functional Specification," by: Ken Teagan (Software Engineer), May 19, 1989, Lo–Ad Communications, pp. 1–14 (Vz Cal 92418–92431).
"Turning the Clock Back to a Good Idea," *Communication & Computer Product & Software News*, Mar./Apr. 1990, reprint by Periphonics, 1 page (Vz Cal 133903).
Letter from Steinhoff (Dytel Corporation) to Pavelle (Symbolics Inc.) re The Automated Switchboard Attendant, enclosing brochure (The Automated Switchboard Attendant Product Notes, Issue 2—Nov. 1983 (1 page letter and 4 page brochure), Dec. 9, 1985 (Vz Cal 92317–92321).
Toth, Victor J., "Washington Perspective, The AT&T and GTE Consent Decress—One Decree Too Many," *Business Communications Review*, (handwritten date: 1985), 1 page (Vc Cal 87599).

Wallace, Bob, "Call It Telethievery," ComputerWorld, Jul. 4, 1984, pp. 31–33, 35–36.

S. Sirazi, C. Bestler, T. Rossen and G. Reichard, Jr.,"Comparative Study of Hybrid–IPPV Implementations," *NCTA Technical Papers*, 1985, pp. 27–33, presented Jun. 3, 1985 to Cable 85, in Las Vegas, NV.

Pfeiffer, Eric W., "Setting Patent Traps," Forbes, Jun. 24, 2002.

US–Sprint; "US Sprint unveils fiber optic 800 service," Business Wire, May 20, 1987.

New Telnet Contracts, "US Sprint to launch 800 service in Sept.," Communication Daily, May 21, 1987.

Powers, Pam, "Toll–Free Fracas; US Sprint enter 800 service fray," Network World, May 25, 1987.

Wallace, Bob, "Marketing team banks on DEC–Rockwell link; Software blends power of VAX and Galaxy ACD," Network World, Feb. 1, 1988.

"Destination Wichita," Wichita Business, May 1988.

*Alaska–Airlines; (ALK) Alaska Airlines offers a Christmas gift to lift any occasion*, Business Wire, Nov. 10, 1986.

*The Teleconnect Dictionary*, (Harry Newton ed., Bookcrafters, Chelsea, MI 1987).

Access Series Hospitality System Manual, Boston Technology Par No. 801–0013–00 Rev. C, Issue 3, Mar. 1992).

Basso, Richard J. et al., "OSPS System Architecture," AT&T Technical Journal, vol. 68, No. 6, Nov./Dec. 1989, pp. 9–24 (Reviewing Editor: Robert C. Borg).

"Galaxy Switching Products Integrated Switching System (ISS) Call Processing Functional Description," Rockwell International, Aug. 1984, Bates Nos.: Rockwell 03891–03934.

"PABX, Interconnect and the Future Office Controller," International Resource Development, Inc., Aug. 1980, Report #139.

"Common Channel Interoffice Signaling," Bell System Technical Journal (series of articles), Feb. 1978, vol. 57, No. 2, pp. 255–282 [table of contents only].

Kettley, A.W. et al., "TSPS No. 1; Operational Programs," Bell System Technical Journal, Nov. 1970, vol. 49, No. 9, pp. 2625–2623.

Helsey, G., et al., "Building Blocks, D–MUMS Delphi Multi–Media Universal Messaging System, The Building Block Concept, An Overview," Sep. 21, 1981 [Lotito Supplemental Materials 2, Bates Nos. TMOB_360–0010615 to TMOB_360–0010733].

Delphi Communications Corporation, Delta 2 System Concepts and Facilities, vol. 1, System Architecture, Jul. 1981 [Lotito Supplemental Materials 4, Bates Nos. TMOB_360–0010791 to TMOB_360–0010990].

"Store 7 Forward Voice Switching," Report 145, International Resource Development Inc., Jan. 1980 [Lotito Supplemental Materials 6, Bates Nos. TMOB_360–0018165 to TMOB_360–0018177].

Hattori, Shimmi et al., "A Design Model for a Real–Time Voice Storage System," IEEE Transactions on Communications, vol. COM–30, No. 1, Jan. 1982 [Lotito Supplemental Materials 7, Bates Nos. TMOB_360–0018181 to TMOB_360–0018181].

"BOC Notes on the LEC Networks—1990, Special Report SR–TSV–002275," Bell Communication Research, Issue 1, Mar. 1991 [TMOB_360–0020693 to TMOB_360–0021747].

Molotsky, Irvin, et al., "Briefing; Play It Again, On Hold," The New York Times, Aug. 25, 1985.

Bruns, Don, "Agency service review: phone system cross–sells customers," National Underwriter (Property & Casualty/Employee Benefits Ed.). Cincinnati, Issue 43, pp. 38, Oct. 26, 1987.

Hitchings, B., "It's really daylight robbery—or is it?" Nationwide News Pty Limited Herald, Aug. 26, 1987.

Lee, Gordon, "Jingles and Radio Spots Make Hits for Seattle Sound Studio Puget Sound B," Scripps–Howard Business Publications 1985; Business Dateline; Puget Sound Business Journal, Sep. 2, 1985.

Gillespie, Jon, "Hold 'Em Maximizes Phone Time, Prevents Costly Lawsuits," San Antonio Business Journal, San Antonio, vol. 2, Issue 6; Sec. 1, p. 13, Feb. 29, 1988.

Jim Brown, *Sterling Service*, Network World, Jun. 5, 1989.

Robert Self, *AT&T Kills 800 Service*, Inbound/Outbound, May 1988.

Bruce Kushnick, *"Turnkey" 900 service bureaus*, Inbound/Outbound, Aug. 1989.

Voice Response System for Telephone Betting, Kanichro Yoshizawa et al., Hitachi Review vol. 26 (1997), No. 6.

Bank–From–Home® Product Description, Publication #3000002, Periphonics Corporation, Jan. 7, 1980.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 4, 7, 12 are cancelled.
Claims 3, 5, 6, 8-11 were not reexamined.

* * * * *